(12) United States Patent
Kurita et al.

(10) Patent No.: US 7,061,652 B2
(45) Date of Patent: Jun. 13, 2006

(54) IMAGE PROCESSING APPARATUS AND METHOD USING IMAGE INFORMATION AND ADDITIONAL INFORMATION OR AN ADDITIONAL PATTERN ADDED THERETO OR SUPERPOSED THEREON

(75) Inventors: Mitsuru Kurita, Tokyo (JP); Katsuyoshi Maeshima, Kanagawa-ken (JP); Masahiro Funada, Kanagawa-ken (JP); Yasumichi Suzuki, Kanagawa-ken (JP); Yoichi Takaragi, Kanagawa-ken (JP); Akiko Kanno, Kanagawa-ken (JP); Koichi Ishimoto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 09/993,725

(22) Filed: Nov. 27, 2001

(65) Prior Publication Data

US 2002/0054356 A1 May 9, 2002

Related U.S. Application Data

(60) Division of application No. 08/863,468, filed on May 27, 1997, now Pat. No. 6,421,145, which is a continuation of application No. 08/126,710, filed on Sep. 27, 1993, now abandoned.

(30) Foreign Application Priority Data

| Sep. 28, 1992 | (JP) | 4-258694 |
| Sep. 28, 1992 | (JP) | 4-258701 |
| Sep. 28, 1992 | (JP) | 4-258702 |
| Sep. 28, 1992 | (JP) | 4-282526 |
| Sep. 28, 1992 | (JP) | 4-282527 |

(51) Int. Cl.
*H04N 1/40* (2006.01)

(52) U.S. Cl. .................. 358/3.28; 358/3.24
(58) Field of Classification Search ............. 358/3.28, 358/1.9, 2.1, 3.24; 382/237
See application file for complete search history.

(56) References Cited

U.S. PATENT DOCUMENTS

| 4,310,180 A | 1/1982 | Mowry, Jr. et al. ......... 283/8 |
| 4,459,020 A | 7/1984 | May et al. ............... 355/132 |
| 4,579,370 A | 4/1986 | Corwin et al. ............ 283/72 |
| 4,637,051 A | 1/1987 | Clark ...................... 382/1 |
| 4,728,984 A | 3/1988 | Daniele .................... 355/6 |
| 4,739,377 A | 4/1988 | Allen ..................... 355/133 |
| 4,796,921 A | 1/1989 | Neiman ................... 283/91 |
| 5,021,876 A | 6/1991 | Kurita et al. .............. 358/75 |
| 5,216,724 A | 6/1993 | Suzuki et al. ............. 382/7 |

(Continued)

FOREIGN PATENT DOCUMENTS

DE          A-3229616          2/1984

(Continued)

OTHER PUBLICATIONS

"American Heritage Dictionary" Houghton Mifflien Co., 1982, p. 806.

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

Predetermined additional information is superposed as a dot pattern on image information read by an image scanner, and the image information superposed with the additional information is modulated. The modulated information is demodulated and recorded on a recording medium to perform a series of operations, i.e., to simultaneously satisfy both pattern addition and modulation/demodulation.

10 Claims, 48 Drawing Sheets

U.S. PATENT DOCUMENTS

| | | | |
|---|---|---|---|
| 5,227,871 A | 7/1993 | Funada et al. | 358/75 |
| 5,231,663 A | 7/1993 | Earl et al. | 380/18 |
| 5,257,119 A | 10/1993 | Funada et al. | 358/438 |
| 5,311,336 A | 5/1994 | Kurita et al. | 358/80 |
| 5,321,470 A | 6/1994 | Hasuo et al. | 355/201 |
| 5,363,202 A | 11/1994 | Udagawa et al. | 358/501 |
| 5,363,454 A | 11/1994 | Udagawa et al. | 382/17 |
| 5,418,602 A | 5/1995 | Nishikawa | 355/201 |
| 5,424,807 A | 6/1995 | Ohmura | 355/201 |
| 5,426,710 A | 6/1995 | Suzuki et al. | 382/135 |
| 5,430,525 A | 7/1995 | Ohta et al. | 355/201 |
| 5,436,469 A | 7/1995 | Moll | 358/296 |
| 5,446,715 A | 8/1995 | Satomura | 369/49 |
| 5,457,540 A | 10/1995 | Kajita | 358/296 |
| 5,463,469 A | 10/1995 | Funada et al. | 358/296 |
| 5,465,161 A | 11/1995 | Funda et al. | 358/438 |
| 5,521,722 A * | 5/1996 | Colvill et al. | 358/500 |
| 5,530,759 A | 6/1996 | Braudaway et al. | |
| 5,541,741 A | 7/1996 | Suzuki | 358/450 |
| 5,581,613 A | 12/1996 | Nagashima et al. | 380/21 |
| 5,621,503 A | 4/1997 | Komaki et al. | 399/366 |
| 5,633,952 A | 5/1997 | Outa et al. | 382/165 |
| 5,661,574 A | 8/1997 | Kawana | |
| 5,668,881 A | 9/1997 | Kurita et al. | 380/51 |
| 5,757,926 A | 5/1998 | Nagashima et al. | 380/51 |
| 5,832,186 A | 11/1998 | Kawana | |
| 5,847,849 A | 12/1998 | Funada et al. | 358/530 |
| 6,166,750 A | 12/2000 | Negishi | 347/131 |
| 6,192,127 B1 | 2/2001 | Nagashima et al. | 380/201 |
| 6,346,989 B1 | 2/2002 | Funada et al. | 358/1.14 |
| 2001/0010733 A1 | 8/2001 | Tomomatsu | |
| 2002/0163671 A1 | 11/2002 | Takaragi | |

FOREIGN PATENT DOCUMENTS

| | | |
|---|---|---|
| EP | A-0342060 | 11/1989 |
| JP | 55-36873 | 3/1980 |
| JP | 55-076480 | 6/1980 |
| JP | 56-65285 | 6/1981 |
| JP | 59-170865 | 9/1984 |
| JP | 59-171252 | 9/1984 |
| JP | 60-87380 | 5/1985 |
| JP | 60-229472 | 11/1985 |
| JP | 60-229572 | 11/1985 |
| JP | 61-285578 | 12/1986 |
| JP | 63-256980 | 10/1988 |
| JP | 01028792 | 1/1989 |
| JP | 64-82783 | 3/1989 |
| JP | 1-141464 | 6/1989 |
| JP | 1-264069 | 10/1989 |
| JP | 1-295567 | 11/1989 |
| JP | 01-302958 | 12/1989 |
| JP | 1-316782 | 12/1989 |
| JP | 1-316783 | 12/1989 |
| JP | 2-266390 | 10/1990 |
| JP | 2-284189 | 11/1990 |
| JP | 02-294882 | 12/1990 |
| JP | 2-297496 | 12/1990 |
| JP | 3-188766 | 8/1991 |
| JP | 3-230975 | 10/1991 |
| JP | 4-220077 | 8/1992 |
| JP | 4-227365 | 8/1992 |
| JP | 4-245860 | 9/1992 |
| JP | 05-130348 | 5/1993 |
| JP | 6-70134 | 3/1994 |

* cited by examiner

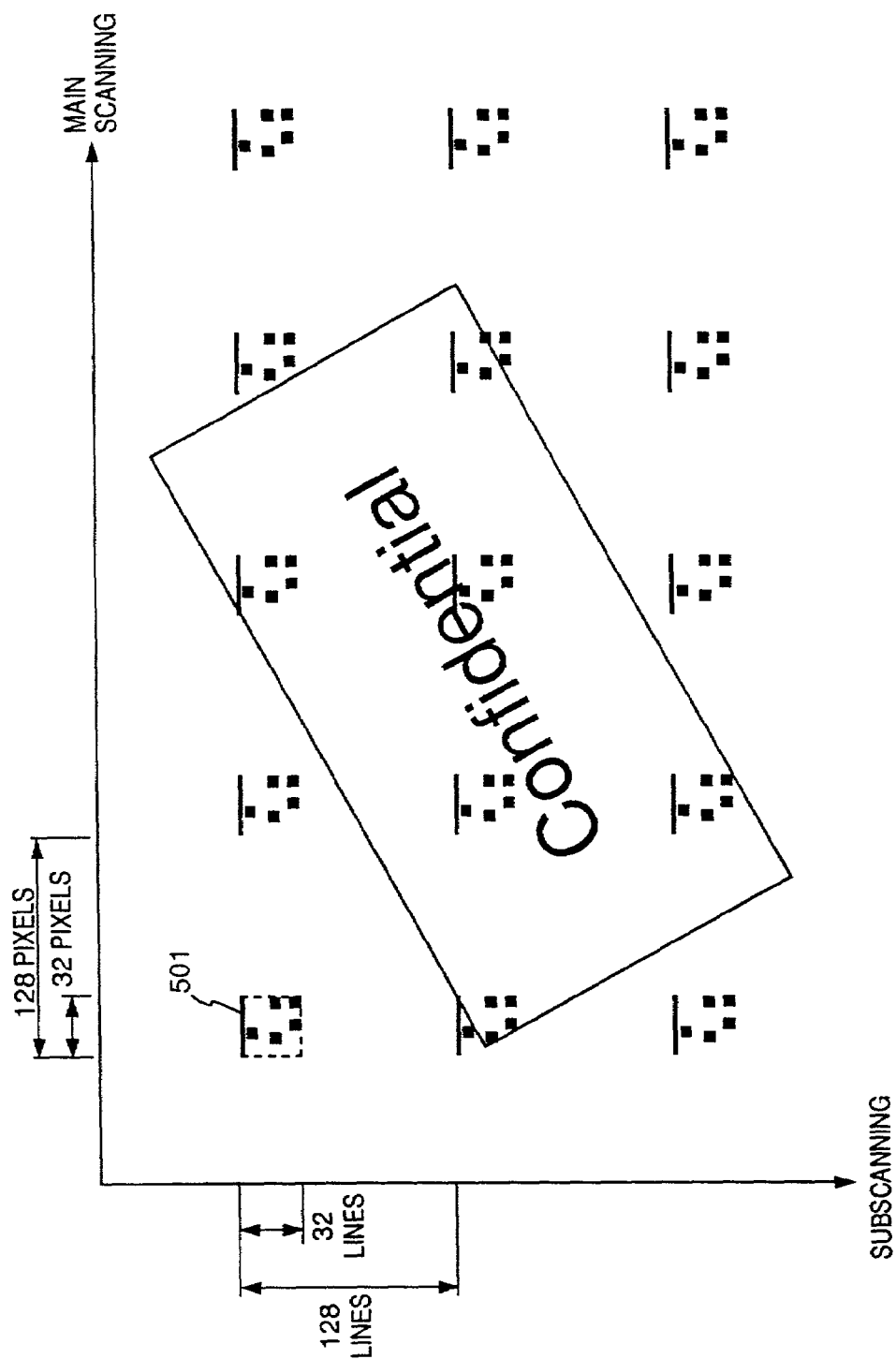

EACH FOR S = 0 → Y = A AND S = 1 → Y = B $J = (I < a) \cap (I < b) \cap (I < c) \cap (I < d) \cap (I < e) \cap (I < f) \cap (I < g) \cap (I < h)$

| CNO SIGNAL | PRINT OUTPUT |
|---|---|
| 0 | MAGENTA (M) |
| 1 | CYAN (C) |
| 2 | YELLOW (Y) |
| 3 | BLACK (Bk) |

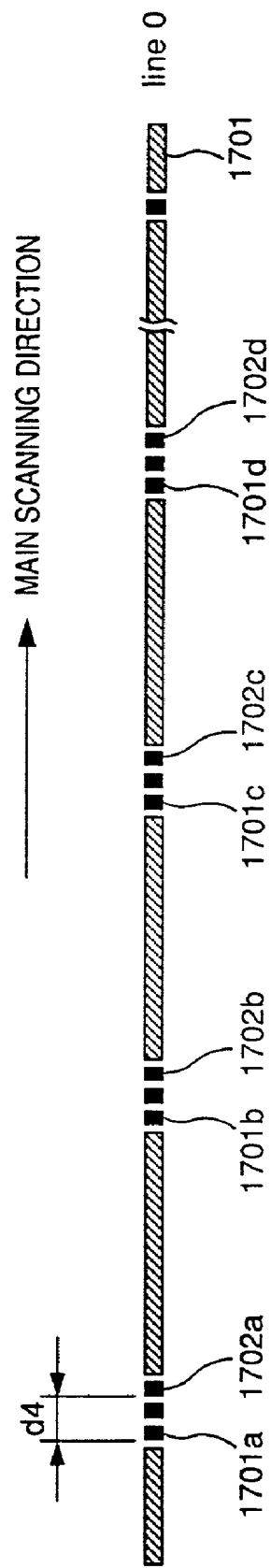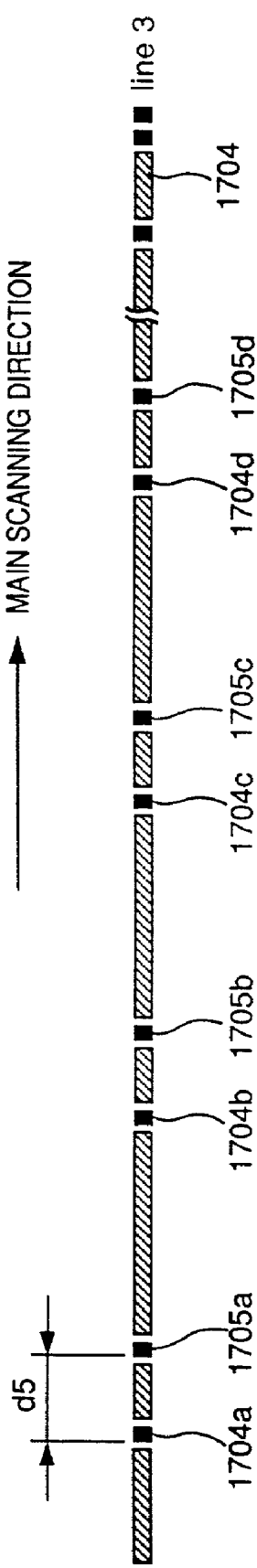

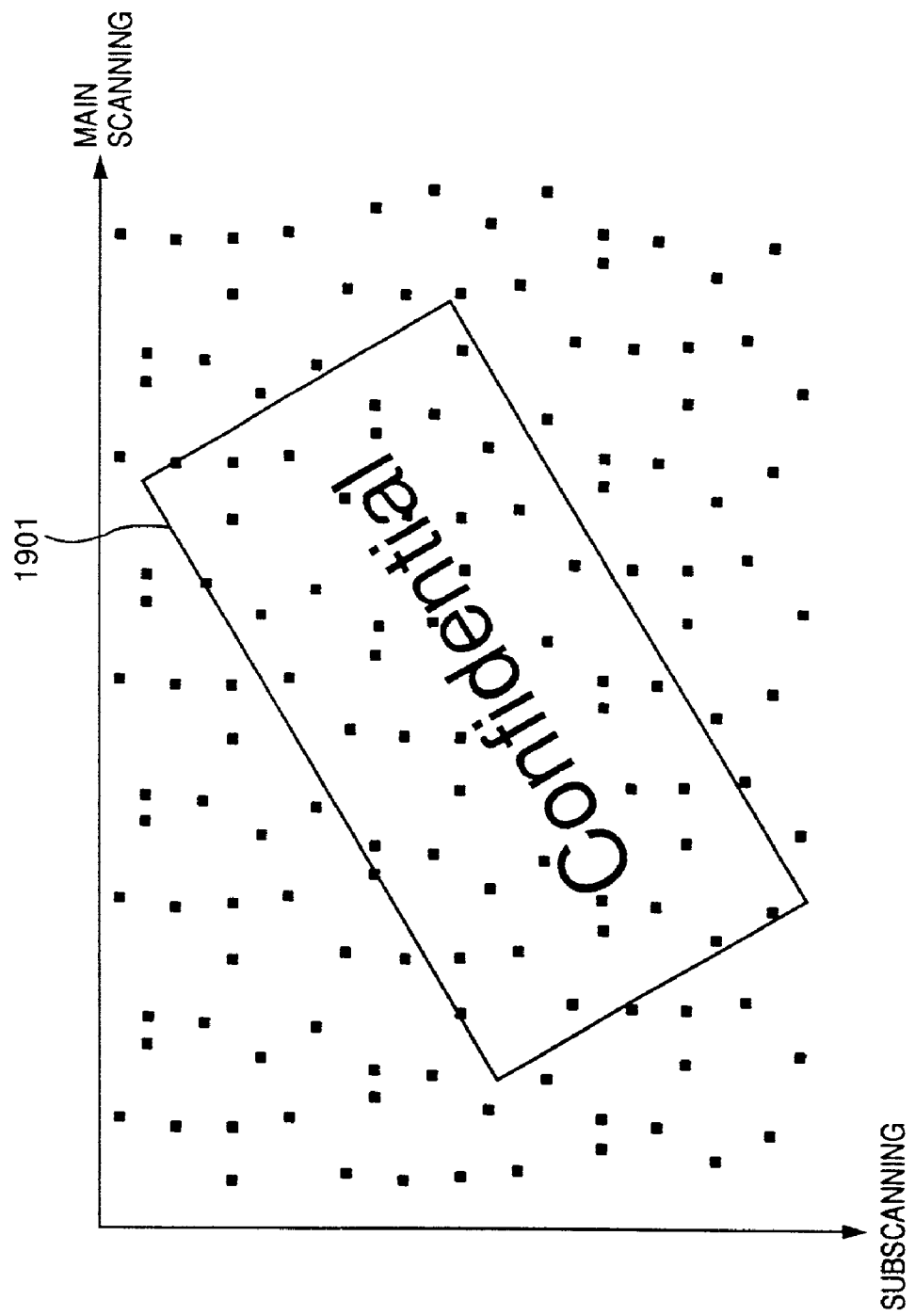

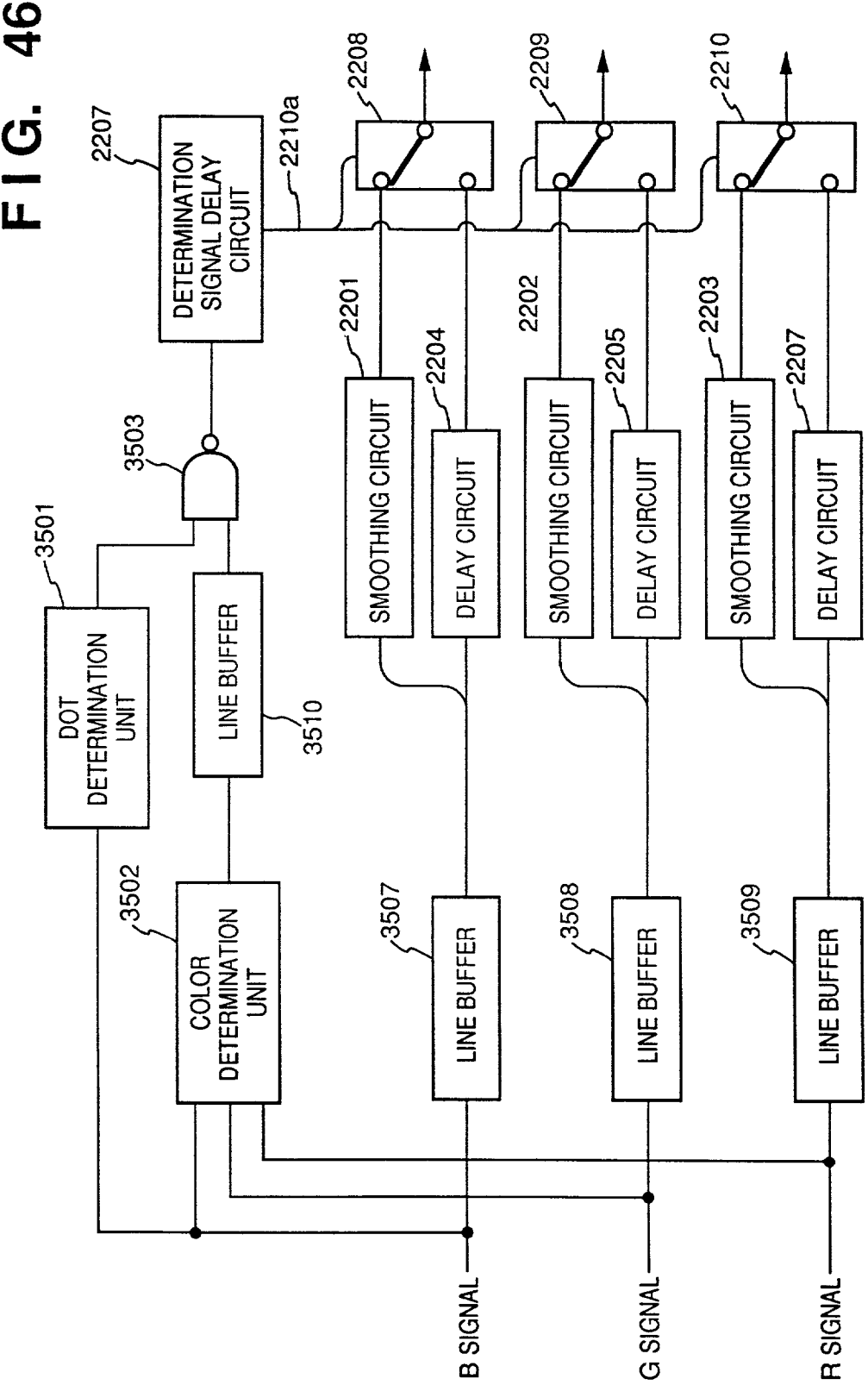

IMAGE PROCESSING APPARATUS AND METHOD USING IMAGE INFORMATION AND ADDITIONAL INFORMATION OR AN ADDITIONAL PATTERN ADDED THERETO OR SUPERPOSED THEREON

This application is a division of application Ser. No. 08/863,468 filed May 27, 1997, now U.S. Pat. No. 6,421,145 which is a continuation of application Ser. No. 08/126,710, filed Sep. 27, 1993, now abandoned.

BACKGROUND OF THE INVENTION

The present invention relates to an image processing apparatus for adding specific information to an input image and outputting the resultant image.

In recent years, the improvements in the performance of color copying machines and color printers have been so great that, they may be successfully used in illegal applications. It is almost impossible to trace an illegally used copying apparatus or its operator from the illegal copies made therefrom.

To prevent illegal copying, the following countermeasure has been attempted. A specific image pattern is registered in a color copying machine or a color printer itself beforehand, and when the pattern on an original is identified by the copying machine or printer, copying is inhibited.

In this case, a circuit for identifying a specific original is used in the color copying machine or color printer. The number of image patterns to be registrable in this circuit is limited. It is, therefore, impossible to register all kinds of originals to be discriminated.

Moreover, in a color copying machine or printer having an external interface, such a circuit for determining a specific original, may not properly function. For example, when image data on the external interface are simultaneously sent as three primary data, i.e., red, green, and blue data, the above determination circuit can be properly operated. However, if image data on the external interface are data such as cyan, magenta, yellow, and black data corresponding to the individual characteristics of a printer, different color-reproducible combinations are present, and a plurality of the types of image patterns for identifying specific originals are required. It is very difficult to even identify and detect a specific original, and the number of images of determinable specific originals is limited. In addition, when image data for expressing the respective color components are surface-sequentially sent in units of colors, image data must be stored in a memory to perform the identification, which results in the use of a high cost memory, thereby requiring a high cost for identifying a specific original.

Assume that the above problem relating to the image data sent from the external interface is solved. Even if the number if specific originals as target objects is limited to the number of recognizable objects, a picture very similar to a registered specific original may be erroneously determined, or a stained specific original may be erroneously determined not to be a specific original. It is impossible to avoid such an error.

It is important to add a means for detecting a specific original in the color copying machine or printer. When an original which is not supposed to be copied is copied, it is important to specify the illegally used copying machine or its operator because the detection capability for identifying specific originals is limited.

Under there circumstances, a technique for adding, to an original image, information which can identify an illegally used copying machine or its operator, has been developed. According to this technique as disclosed in U.S. patent application Ser. No. 07/799,608, of all output color components (e.g., magenta, cyan, yellow, and black) of a copying machine, the output color component (e.g., yellow) which is least noticeable to the human eye is used to modulate (e.g., addition of a predetermined value) the image signal of this output color component. A numeric value or code representing the manufacturing number of the copying machine is formed repeatedly on a reproduced image to every predetermined interval.

In a system proposed along with the developments of performance of color copying machines, and particularly, color readers and configured such that a reader is arranged independently of a printer so that a third party can easily disconnect the reader from the printer, decoding an interface between the reader and the printer with a memory unit and its architecture (e.g., a communication method), fetching an image from the reader, and outputting the decoded data and the fetched image to another printer or computer has been developed to obtain an illegal benefit in practice.

With the above technique, however, although yellow is the output color component which is least noticeable to the human eye, modulation of the corresponding image signal must be minimized. In particular, for example, in a color copying machine used in the fields of design, a problem is posed when a pattern which is not present in an original is noticeable on a reproduced image.

In copying an original, image signals are not necessarily uniform due to variations in sensitivities of a CCD sensor even if a uniform color original is used. When an image in a host computer is printed out using the external interface of a color copying machine, CG (computer graphics) data can be directly output, and a uniform range of image signal levels is necessarily present. At this time, when the yellow component is modulated, an additional pattern undesirably tends to be noticed in a uniform light gray or blue portion or the image.

In a method of defining a numeric value or code representing additional information as a unit pattern and forming an additional pattern by repeating the unit pattern every predetermined interval, the unit pattern is regularly localized and tends to be notice with the human because the human eye can more easily recognize a regular pattern than a random pattern. When the unit pattern is arranged in a matrix form, it tends to be noticed with the human eye. For this reason, the degree of modulation of the image signal must be inevitably reduced, and additional information may not be read depending on the types of specific originals.

Modulation and a pattern which satisfy contradictory conditions, i.e., a condition in which a pattern is unnoticeable in the entire output image and a condition in which the pattern can be properly identified by any method in the copy of a specific original as a target object must be proposed.

SUMMARY OF THE INVENTION

It is an object of the present invention to provide an image processing apparatus capable of adding a least noticeable pattern when information for specifying a copying machine or person is to be added to a reproduced image of an original image.

It is another object of the present invention to provide an image processing apparatus capable of providing a countermeasure for the trend of the supply of the above-mentioned memory unit in such a manner that image information is modulated by an image input means such as an image reader and the image information is demodulated (to be referred to as encryption hereinafter) by an image output means such as a printer or display.

It is still another object of the present invention to provide an image processing apparatus capable of realizing an arrangement which satisfies both modulation/demodulation and pattern addition.

On the other hand, there is an apparatus in which a pattern is not added in a pattern added unless a main controller of the apparatus accesses the pattern adder during initialization of the apparatus when apparatus detection is to be performed by adding the pattern to a reproduced image, so that an image (video) flows without any addition. In this case, assume that a copying machine of a new model is realized by assigning a pattern addition function to a copying machine of an old model. If the program of the copying machine of the old model, i.e., a program ROM, is mounted in the copying machine of the new model, and this copying machine is started, pattern addition is not performed. That is, only a normal image is output, i.e., a so-called loophole is formed.

It is still another object of the present invention to provide an image processing apparatus capable of preventing the above loophole.

In an image processing apparatus such as a copying machine, environmental conditions such as an indoor temperature and an indoor humidity generally adversely affect the density of an output image. When an image is output upon the above process (pattern addition), the added pattern may be visually noticed depending on the current environments.

It is still another object of the present invention to provide an image processing apparatus capable of adding a pattern regardless of changes in environmental recording conditions.

As color copying machines, digital color copying machines for color-separating a color original, reading information in units of pixels, digitally processing the read image data, and outputting the digital image data to a color LBP (laser beam printer), thereby obtaining a digital color copy, have become popular. In the copying machine of this type, various image processes such as a shift in an image output position (FIG. 27A), extraction of a desired area (FIG. 27B), color conversion of only a specific color within a desired area (FIG. 27C), and pasting of the characters and images stored in a memory to a reflective original can be performed because the image data can be digitally processed. These functions are assigned to commercially available machines in practice.

In a copying machine or this type, when an a pattern, which represents the manufacturing number of the machine and the like is added to the image before the above processes are performed, the pattern is affected by the processes. As a result, the pattern may not be read. It is, therefore, still another object of the present invention to provide an image processing apparatus capable of performing pattern addition free from the influences of these processes.

When the pattern is added to an original, and if a pattern similar to the additional pattern is present in the original, the already added pattern on the original is mixed with the newly added pattern to make it difficult to discriminate an identification code such as a machine number.

It is still another object of the present invention to provide an image processing apparatus capable of easily detecting a pattern representing a machine number or the like.

In order to achieve the above objects of the present invention, there is provided an image processing apparatus including a recording unit for visibly recording, on a recording medium, image information obtained by reading an original image, comprising superposing means for superposing predetermined additional information on the image information and means for performing modulation of the image information superposed with the additional information, wherein the recording unit visibly records the image information obtained by performing demodulation of the modulated image information.

In order to achieve the above objects of the present invention, there is also provided an image processing apparatus including a recording unit for visibly recording, on a recording medium, image information obtained by reading an original image, comprising means for performing modulation of the image information, means for performing demodulation of the modulated image information, and superposing means for superposing predetermined additional information on the demodulated image information, wherein the recording unit visibly records the image information superposed with the additional information.

In order to achieve the above objects of the present invention, there is further provided an image processing apparatus including a recording unit for visibly recording, on a recording medium, image information obtained by reading an original image, comprising means for performing a predetermined process of the image information and means for superposing predetermined additional information on the processed image information, wherein the recording unit visibly records the image information superposed with the additional information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view showing a copying result according to the first embodiment;

FIGS. 43A and 43B are views for explaining a method of expressing information using the add-on lines according to the third embodiment;

FIG. 45 is a view showing a copying result according to the third embodiment;

FIG. 46 is a block diagram showing the arrangement of an additional pattern image correction circuit according to modification 1 of the third embodiment;

DETAILED DESCRIPTION OF THE PREFERRED EMBODIMENTS

Preferred embodiments of the present invention will be described in detail with reference to the accompanying drawings. The following embodiments exemplify copying machines. However, the present invention is not limited to this, but is applicable to other various apparatuses such as an image scanner and a printer. Each apparatus to which the present invention is applied processes as a target object a specific original such as banknotes and securities to prevent counterfeits.

<First Embodiment>

[General Description of Apparatus]

Figure 1:
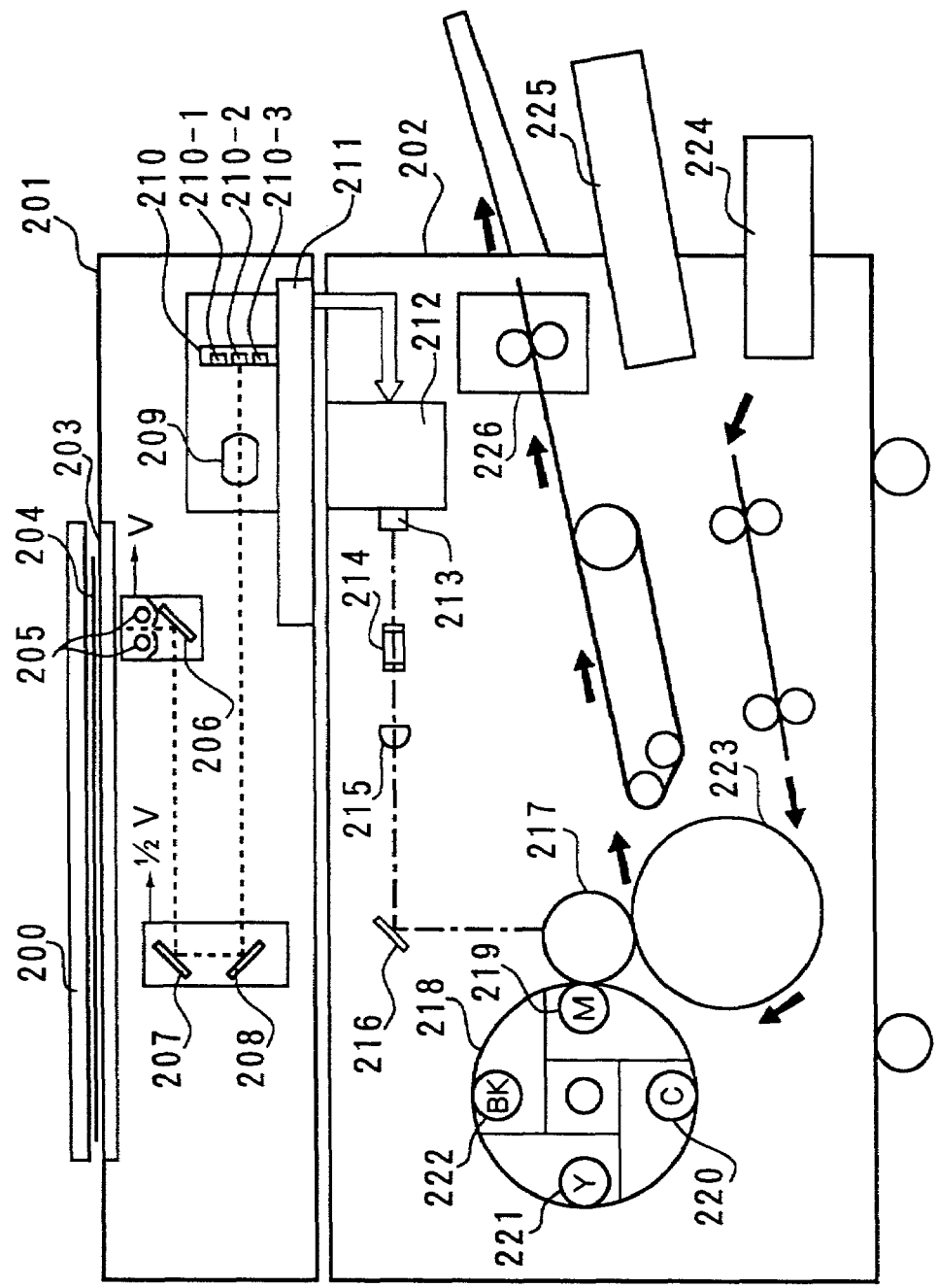
FIG. 1 is a side sectional view showing the internal arrangement of a color copying machine according to the first embodiment of the present invention.

FIG. 1 is a side sectional view showing the internal arrangement of a color copying machine according to the first embodiment of the present invention. Referring to FIG. 1, reference numeral 201 denotes an image scanner for reading an original at a resolution of 400 dpi (dots/inch) and processing digital signals. Reference numeral 202 denotes a printer for printing out a full color image, corresponding to the original image read by the image scanner 201, on a sheet at a resolution of 400 dpi.

In the image scanner 201, reference numeral 200 denotes a mirror surface press plate. An original 204 on an original glass table (to be referred to as a platen hereinafter) 203 is irradiated with a lamp 205. Light reflected by the original 204 is guided to mirrors 206, 207, and 208 and is focused by a lens 209 on a three-line sensor (to be referred to as a CCD hereinafter) 210. The read image signals are sent as full color information, i.e., red (R), green (G), and blue (B) components to a signal processor 211. Note that the lamp 205 and the mirror 206 are mechanically moved at a speed v and the mirrors 207 and 208 are mechanically moved at a speed (½)v in a direction perpendicular to an electrical scanning (main scanning) direction of the line sensor, thereby scanning (subscanning) the entire surface of the original.

The signal processor 211 electrically processes the read image signals and separates the image signals into magenta (M), cyan (C), yellow (Y), and black (Bk) components. These components are then sent to the printer 202. One of the M, C, Y, and Bk components is sent to the printer 202 every original scanning cycle of the image scanner 201. One full color print is obtained by four original scanning cycles.

The M, C, Y, and Bk image signals sent from the image scanner 201 are sent to a printer video processor 212. The printer video processor 212 modulates and drives a semiconductor laser 213 in accordance with the input image signals. A laser beam scans a photosensitive drum 217 through a polygon mirror 214, an f-T lens 215, and a mirror 216.

Reference numeral 218 denotes a rotary developing assembly constituted by a magenta developing unit 219, a cyan developing unit 220, a yellow developing unit 221, and a black developing unit 222. The four developing units are sequentially brought into contact with the photosensitive drum 217 to develop latent images on the photosensitive drum with toners.

Reference numeral 223 denotes a transfer drum for winding a paper sheet fed from a paper cassette 224 or 225 around the outer circumferential surface thereof to transfer the image developed on the photosensitive drum to the paper sheet.

In this manner, when the four colors, i.e., M, C, Y, and Bk are sequentially transferred to the paper sheet, the paper sheet passes through a fixing unit 226. The toners are fixed on the paper sheet, and then the sheet is exhausted outside the copying machine.

[Image Scanner]

Figure 2:
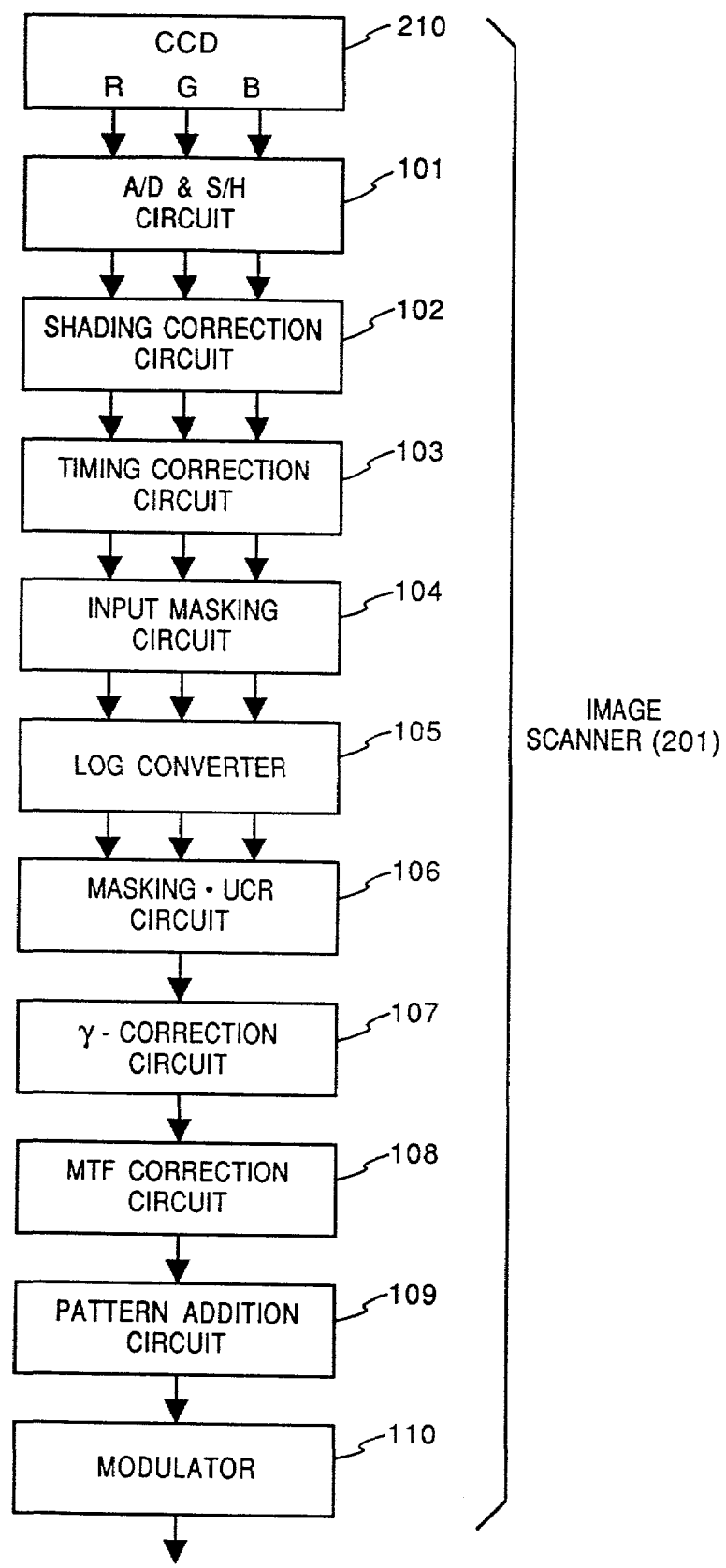
FIG. 2 is a block diagram showing the circuit arrangement of an image scanner 201 according to the first embodiment of the present invention.

FIG. 2 is a block diagram showing the circuit arrangement of the image scanner 201 according to the first embodiment. Referring to FIG. 2, the CCD line sensor 210 has R, G, and B spectral sensitivity characteristics. Reference numeral 101 denotes an A/D & S/H circuit for performing A/D conversion and a sample/hold operation. Reference numeral 102 denotes a shading correction circuit; 103 denotes a timing correction circuit; 104 denotes an input masking circuit; 105 denotes a LOG converter; 106 denotes a masking•UCR (undercolor removal) circuit; 107 denotes a γ-correction circuit; 108 denotes an MTF correction circuit; 109 denotes a pattern addition circuit; and 110 denotes a modulator.

With the above arrangement, an image signal input from the CCD line sensor 210 is A/D-converted and sampled/held by the A/D & S/H circuit 101. Each signal is output as an 8-bit signal representing a value of 0 to 255. Shading correction and black correction are performed in the shading correction circuit 102. The timing correction circuit 103 performs timing correction. That is, the timing correction circuit 103 delays R and G signals to correct the spatial shift because the CCD line sensor 210 (210-1 to 210-3) is arranged such that its elements are arranged at a predetermined interval. The input masking circuit 104 corrects an NTSC signal. The LOG converter 105 converts a luminance signal into a density signal.

The masking•UCR circuit 106 outputs magenta (M), cyan (C), yellow (Y), and black (Bk) signals each having a predetermined length (e.g., 8 bits) in accordance with a surface sequential scheme using the input three signals (R, G, and B). The γ-correction circuit 107 is realized by a ROM or RAM and its peripheral circuits. The MTF correction circuit 108 performs edge emphasis or smoothing.

The pattern addition circuit 109 performs a process for adding, to a copy image, a pattern which is difficult to identify with a human eye and representing the number such as the manufacturing number, assigned to the machine. The modulator 110 is a circuit for encryption and is constituted by, e.g., a ROM or RAM and its peripheral circuits. The memory contents of the ROM or the RAM can be obtained by a one-to-one correspondence function generated by a known random generation formula in the input range of 0 to 255 and the output range of 0 to 255 if the length of a video signal is defined as 8 bits. Modulation by the modulator 110 may be performed by a so-called texture process which is disclosed in U.S. Pat. No. 5,021,876.

[Printer Video Processor]

Figure 7:
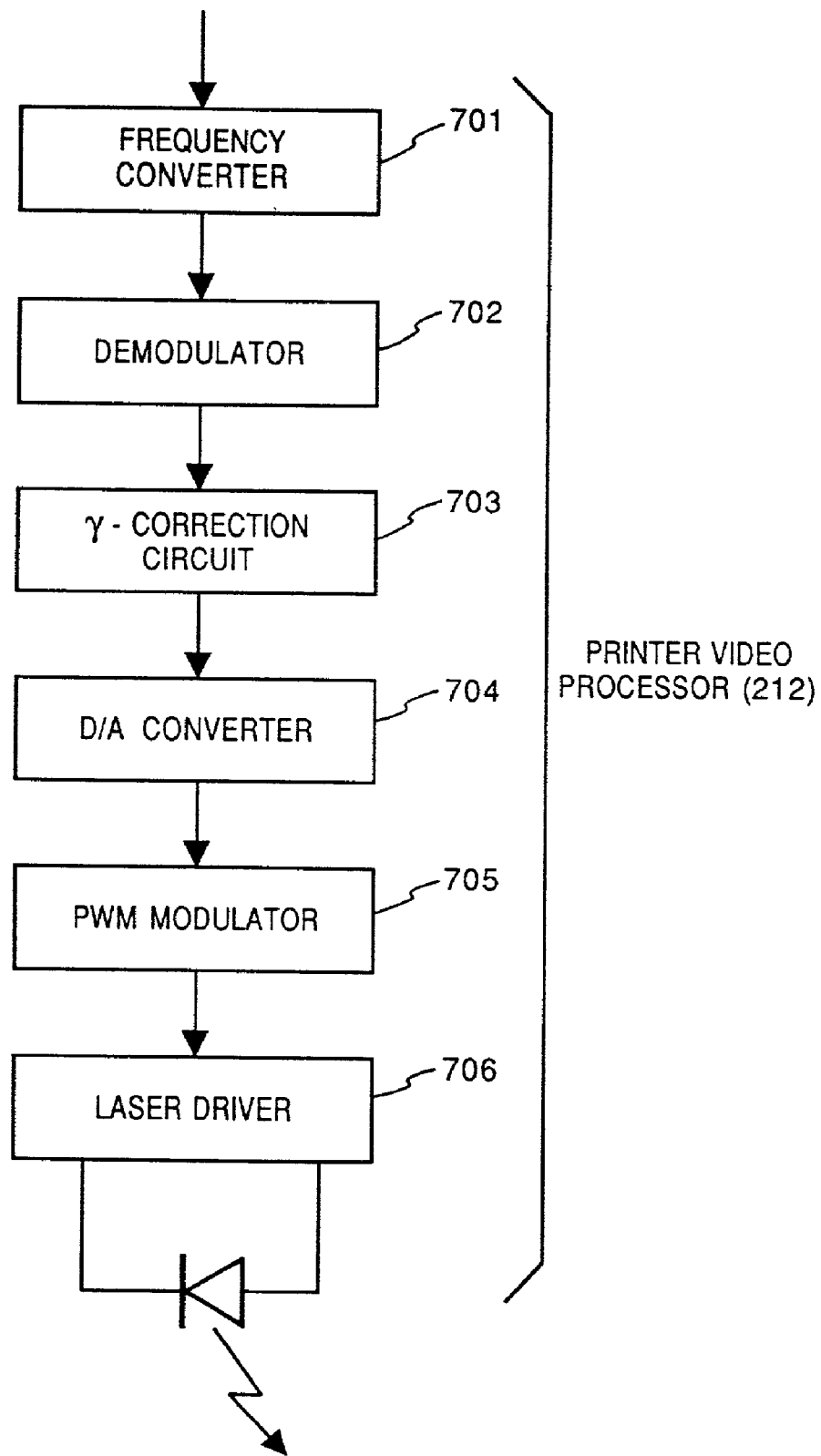
FIG. 7 is a block diagram showing the circuit arrangement of a printer video processor 212 according to the first embodiment.

FIG. 7 is a block diagram showing the arrangement of the printer video processor 212 according to the first embodiment. Referring to FIG. 7, reference numeral 701 denotes a frequency converter for converting the frequency of a video signal sent from the reader 201 into the frequency of a printer image clock. The frequency converter 701 comprises a so-called FIFO circuit. Reference numeral 702 denotes a demodulator for demodulating image data encrypted by the modulator 110 and is constituted by a ROM or RAM and its peripheral circuits. The memory contents of the ROM or RAM has an inverse function of the function used in the modulator 110. A demodulation result, i.e., an output from the demodulator 702 represents a video image in the print-out mode.

Reference numeral 703 denotes a γ-correction circuit in the printer and is constituted by a ROM or RAM and its peripheral circuits. The γ-correction circuit 703 corrects a change in density at the printer, which is caused by an environmental variation. By this correction control, a constant output can be obtained regardless of the environmental variation. An output having a dot pattern which can be properly read by a given technique can be obtained although this pattern cannot be generally discriminated with the human eye. A D/A converter 704 converts a video signal into an analog signal. Reference numeral 705 denotes a PWM (pulse width modulation) modulator for PWM-modulating the analog signal and sending the modulated signal to a laser drier 706. The laser driver 706 drives the semiconductor laser 213 in accordance with the M, C, Y, and Bk video signals sent from the PWM modulator 705.

Figure 3:
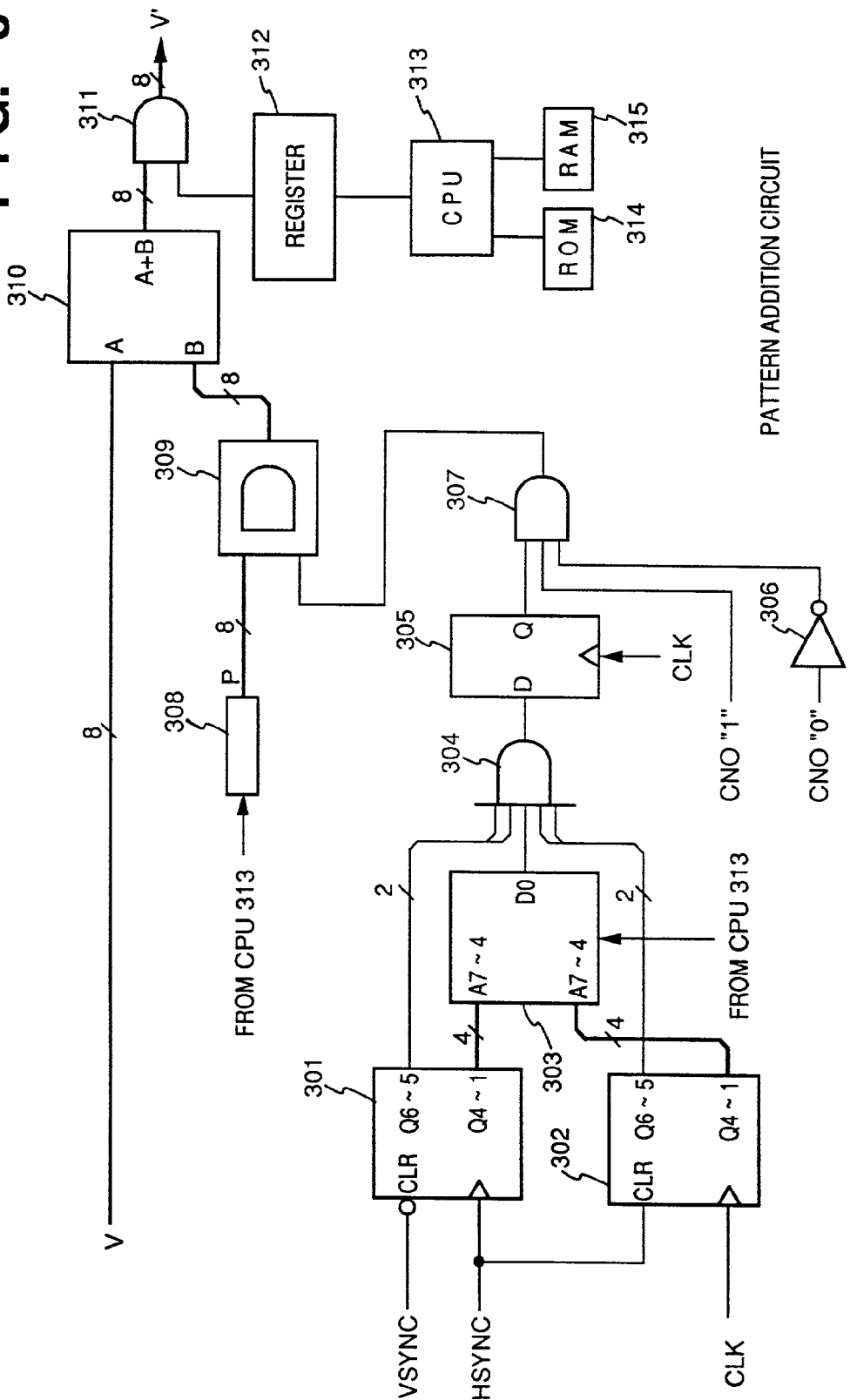
FIG. 3 is a block diagram showing the arrangement of a pattern addition circuit 109 of the first embodiment.

FIG. 3 is a block diagram showing the arrangement of the pattern addition circuit 109 according to the first embodiment. Referring to FIG. 3, reference numeral 301 denotes a subscanning counter; 302 denotes a main scanning counter; 303 denotes a look-up table RAM (to be referred to as an LUT hereinafter); 304 denotes an AND gate; 305 denotes a flip-flop; 306 denotes an inverter; 307 denotes an AND gate; 308 denotes a register; 309 denotes and an AND gate; and 310 denotes an adder.

The subscanning counter 301 or the main scanning counter 302 counts a main scanning sync signal HSYNC or a pixel sync signal CLK every 7-bit width, i.e., every period of 128 lines or pixels, respectively. The LUT 303 is a random access memory (to be referred to as a RAM hereinafter) for holding a pattern to be added. Four bits except for bits from the lower 5th bit to the least significant bit of each of the subscanning and main scanning counters 301 and 302 are input to the LUT 303. Only one bit of the output from the LUT 303 is looked up. This one bit is logically ANDed with upper two bits each of the main scanning and subscanning counters 302 and 301 by the AND gate 304.

An output from the AND gate 304 is synchronized with a CLK signal by the flip-flop 305. The synchronized signal is logically ANDed with a CNO signal of logic "0" and a CNO signal of logic "1" by the AND gate 307. The resultant signals are output to the AND gate 309. The CNO signal of logic "0" and the CNO signal of logic "1" are set by a CPU 313, so that M→0, 0, C→0, 1, Y→1, 0, and K→1, 1 are set in these signals. In this case, the CNO signal is enabled only when the CNO value represents 2, i.e., printing in yellow at present.

The level (modulation amount) of a pattern to be added is stored in the register 308 set by the CPU 313. The AND gate 309 validates this level only when CNO is 2 (printing in yellow). The pattern is then added to image data V by the adder 310. Reference numeral 311 denotes an AND gate; and 312 denotes a resister set by the CPU 313. The register 312 becomes 0 when it is reset. Therefore, unless the pattern addition circuit is accessed by the CPU 313, an input video signal is modulated and is output with a fixed value of "0".

The additional pattern is added using a yellow toner which can hardly be identified with the human eye. This utilizes the low discrimination capability of the human eye for a pattern drawn with the yellow toner.

Figure 4:
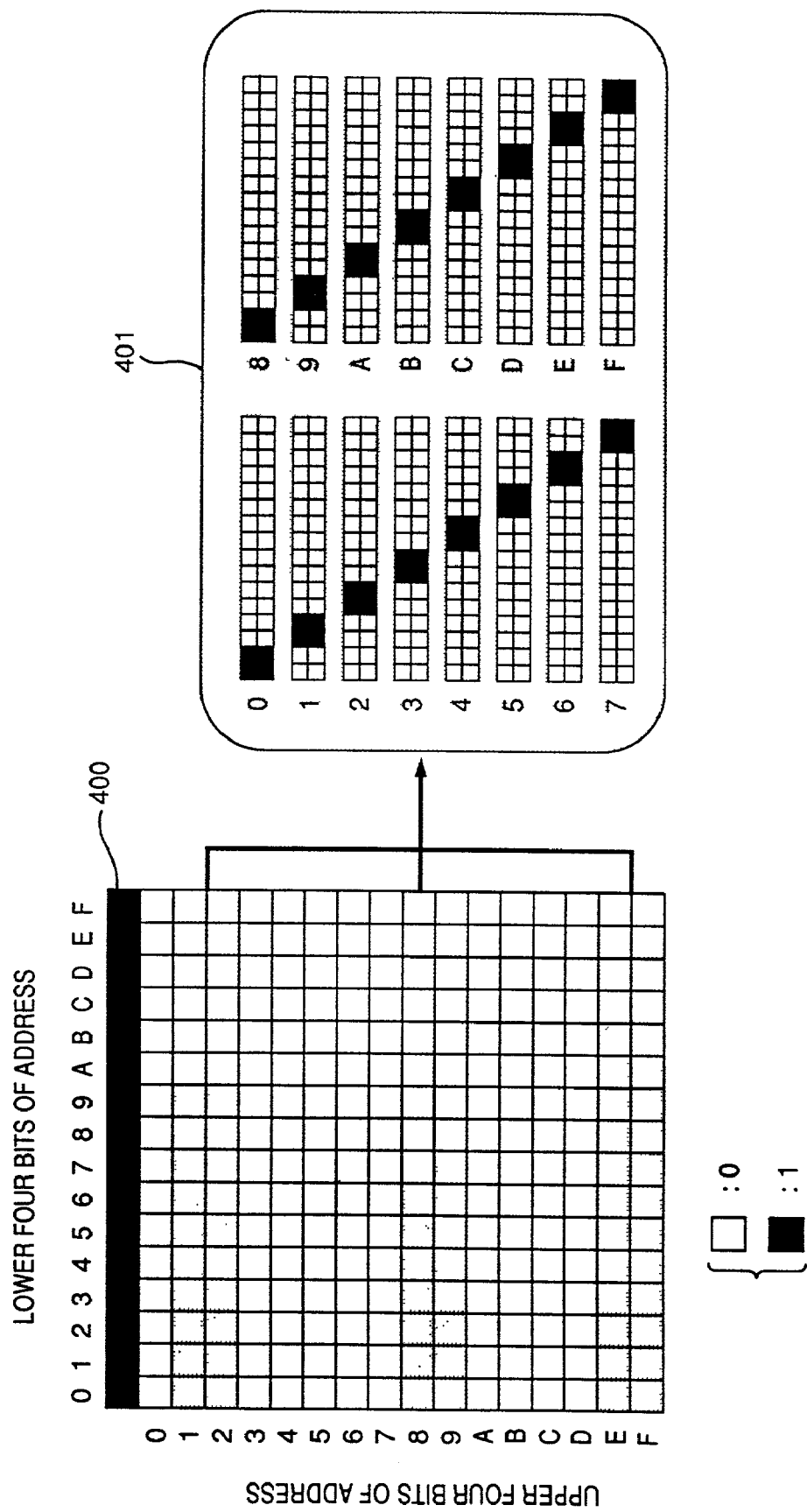
FIG. 4 is a view for explaining an additional pattern according to the first embodiment.

FIG. 4 is a view for explaining an additional pattern according to the first embodiment.

A dot pattern 400 shown in FIG. 4, i.e., an additional pattern is held in the LUT 303. One square in FIG. 4 corresponds to one bit held in the LUT 303. A white square represents "0", and a black square represents "1". The horizontal direction corresponds to lower four bits of the address, and the vertical direction corresponds to upper four bits of the address, thereby forming the additional pattern using a total 256 bits. A line having the address upper bits of 0 (i.e., the uppermost line) in FIG. 4 is a mark representing a reference position. Meshed portions in FIG. 4, i.e., six lines having the address upper bits of 2, 3, 8, 9, E, and F are used every two lines representing dots.

One or two dots each consisting of 2×2 bits represented by reference numeral 401 in FIG. 4 are formed on each pair of lines to represent 16 pieces of information. That is, each pair of lines represent 4-bit information. Since three pairs of lines are present under the mark, a total of 12-bit information can be represented. The pairs of lines do not come close to each other but are separated from each other due to the following reason. If the pairs of lines are continuous as in "BBB" or "123", the dots are connected in the vertical or oblique direction. Therefore, the additional pattern is noticed with the human eye.

The pattern addition circuit according to this embodiment is arranged to write an additional pattern from the CPU 313 to the LUT 303 shown in FIG. 3. Information for specifying a copied original source, such as the number dedicated to the copying machine, is written in the form of data converted into an additional pattern.

Data except for the least significant bit of each of the main scanning counter 302 and the subscanning counter 301 in FIG. 3 is input to the LUT 303. For this reason, one bit in the LUT 303 corresponds to four pixels, i.e., 2×2 pixels on a copy because the printer 202 in this embodiment performs a known 200-line process in an image area and makes it difficult to read each pattern consisting of one pixel.

[Description of Copying Result]

FIG. 5 shows a copying result according to the first embodiment, and FIG. 6 is a view for explaining the effect of the first embodiment.

Referring to FIG. 5, reference materials 501 denote added patterns. The content of the additional pattern stored in the LUT 303 are added as an image. In the pattern shown in FIG. 5, each pattern representing "3FC" is added in a pattern of 32 pixels×32 pixels so as to make it difficult for the human eye to identify the pattern. This pattern is repeated every 128 pixels in the main scanning direction and 128 lines in the subscanning direction. If each pattern represents the manufacturing number assigned to a specific apparatus or represents a code representing the manufacturing number, the apparatus used can be identified by checking the copy.

In this embodiment, the pitch of patterns is given as 128 pixels (or lines) in the main scanning direction (or subscanning direction). The apparatus of this embodiment has a resolution of 400 dpi (dots/inch), so that patterns are added about every 8 mm. This pitch makes it possible to properly print additional patterns on a watermark portion or a blank portion of a banknote.

Figure 6B:
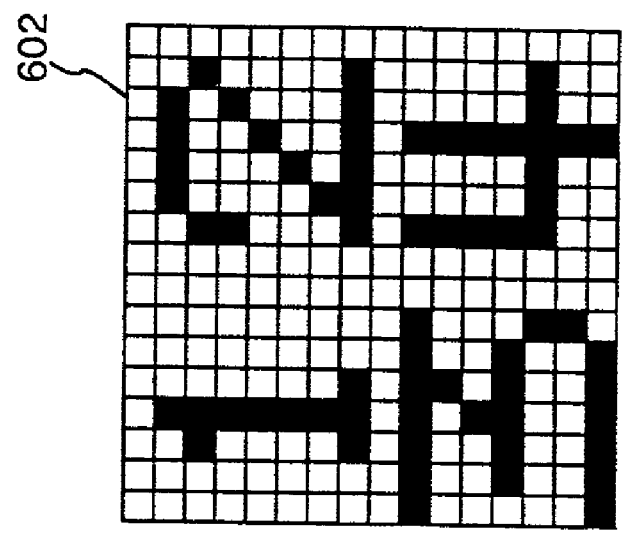
FIGS. 6A and 6B are views for explaining an effect of pattern addition according to the first embodiment.
Figure 6A:
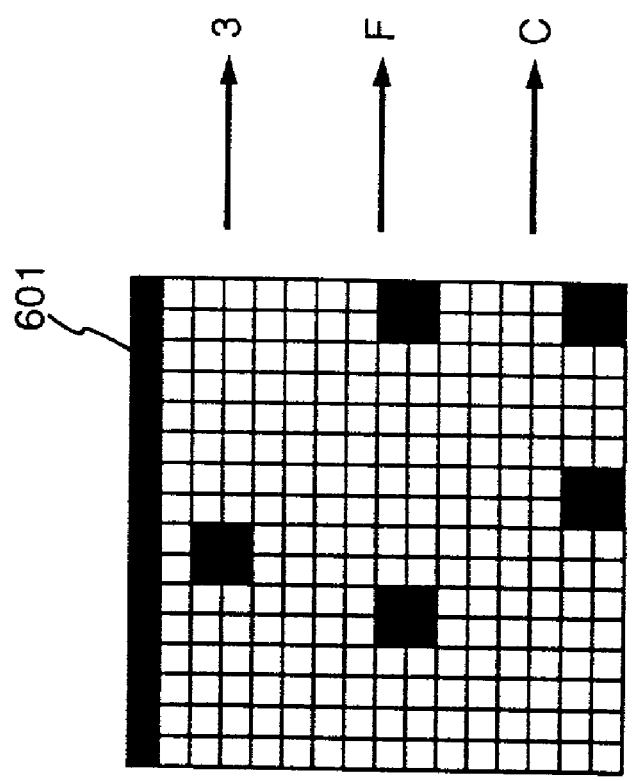

According to a method using the above-mentioned additional pattern, a method of using a pattern shown in FIG. 6A makes it possible to further reduce the number of pixels subjected to modulation and to cause the human eye to notice the pattern less than a method of modulating an image signal directly using numerical values, as shown in FIG. 6B.

As described above, a prescribed additional pattern for identifying an apparatus used is recorded on a copy in a combination of a mark representing the positional reference and a pattern consisting of at least one dot. The number of pixels subjected to modulation can be reduced, and the additional pattern becomes unnoticeable. For this reason, degradation of image quality of the copy can be prevented. In addition, since conversion of an additional pattern into a dot arrangement pattern is a kind of encryption, this patten can hardly be intentionally manipulated by a third party.

Another feature of the apparatus according to this embodiment lies in the fact that the modulator 110 and the frequency converter 701 which constitute the encryption circuit are connected to the output of the pattern addition circuit. Pattern addition independent of encryption can be realized.

More specifically, the modulator is connected to the output of the pattern addition circuit, the disturbance of pixels of a portion added with the pattern can be prevented. In addition, a sufficient encryption function can be realized because the modulator and the demodulator are connected to the output of the pattern addition circuit.

Encryption is performed after the pattern is added as described above, so that pattern addition free from encryption can be realized.

A specific pattern added on a copy to identify an apparatus is represented in the form of distributed dots and is set unnoticeable, thereby minimizing degradation of image quality. Conversion of this additional information into a dot arrangement pattern is a kind of encryption, and the pattern can hardly be intentionally manipulated. In addition, a pattern free from an environmental variation can be added. Since the printer has a gradation process section, pattern addition free from the environmental variation can be realized without performing a cumbersome operation such as communication between the reader and the printer.

<Modification 1>

Figure 8:
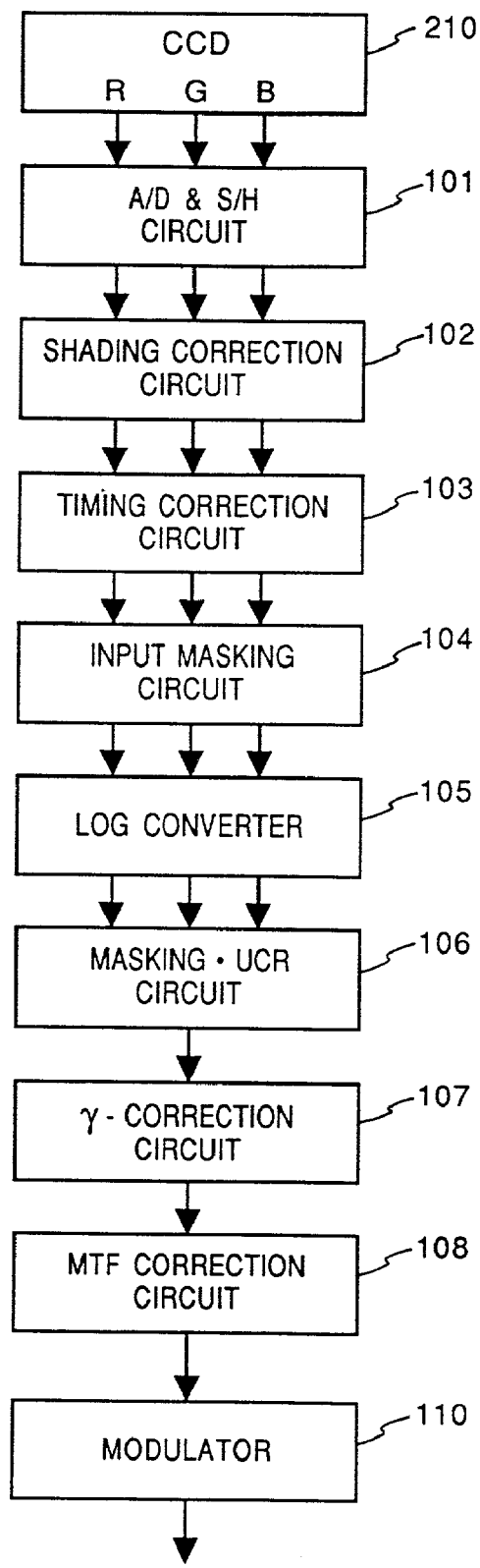
FIG. 8 is a block diagram showing the circuit arrangement of an image scanner according to modification 1.
Figure 9:
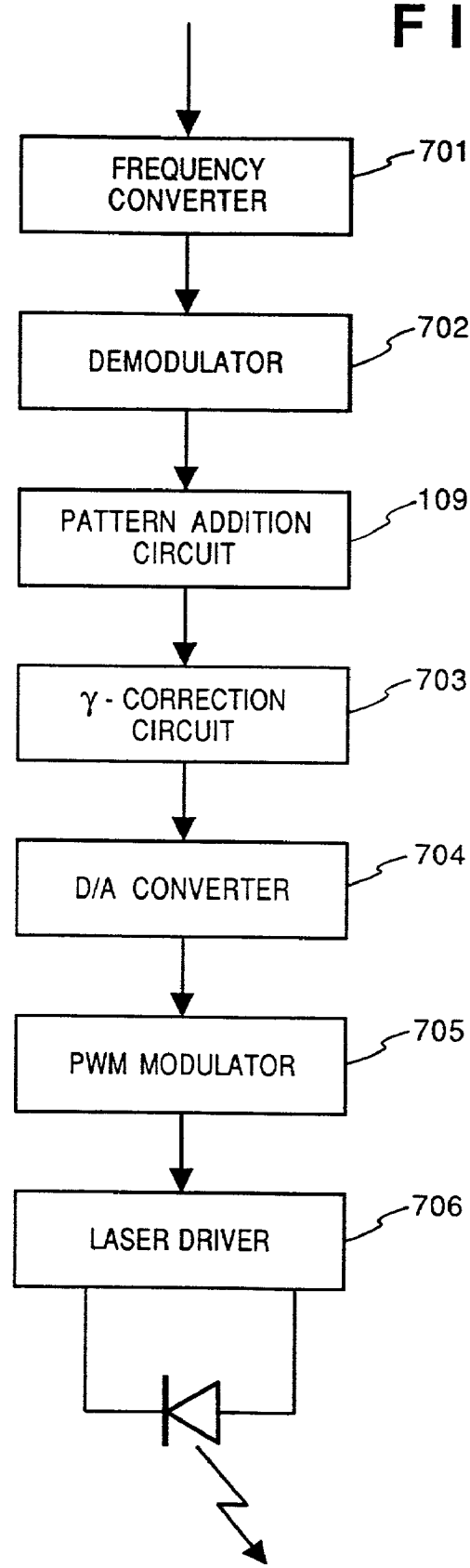
FIG. 9 is a block diagram showing the circuit arrangement of a printer video processor according to modification 1.

FIG. 8 is a block diagram showing the circuit arrangement of the image scanner 201 according to a modification of the first embodiment, and FIG. 9 is a block diagram showing the printer video processor 212 according to this modification.

The image scanner shown in FIG. 8 is different from the image scanner of the first embodiment (FIG. 1) in that the pattern addition circuit 109 is omitted. Any other process in FIG. 8 is substantially the same as that of the first embodiment, and a detailed description thereof will be omitted.

The printer vide processor of this modification in FIG. 9 is different from that of the first embodiment in FIG. 2 in that the pattern addition circuit 109 is located between the modulator 702 and the γ-correction circuit 703. Any other process in FIG. 9 is substantially the same as that of the first embodiment, and a detailed description thereof will be omitted.

Both encryption and an add-on process (superposition process) can be simultaneously satisfied with this architecture, i.e., the add-on process of an additional pattern upon demodulation.

<Modification 2>

In the pattern addition circuit 109 comprising the CPU 313 for performing pattern addition and any other control, the ROM 314 for storing programs, and the RAM 315 used as a work area, the ROM 314 may be replaced with another ROM.

Consider a ROM of an old model and a ROM of a new model. A program stored in the ROM of the old model does not include a sequence of the pattern addition described above. No sequence for setting "1" in the register 312 is available. To the contrary, a program stored in the ROM of the new model has a sequence of the pattern addition described above. When the system is powered on, "1" is set in the register 312.

During a ROM replacement or power-ON operation, if the register 312 is reset, blank paper reproduction is performed by the ROM of the old model, while normal pattern addition is performed by the ROM of the new model.

<Modification 3>

In the first embodiment, modulation is performed by the modulator 110 having a predetermined function, and demodulation is performed by the demodulator 702 having the inverse function of the function of the modulator 110. In this modification, this demodulation function is realized by another circuit.

Figure 10:
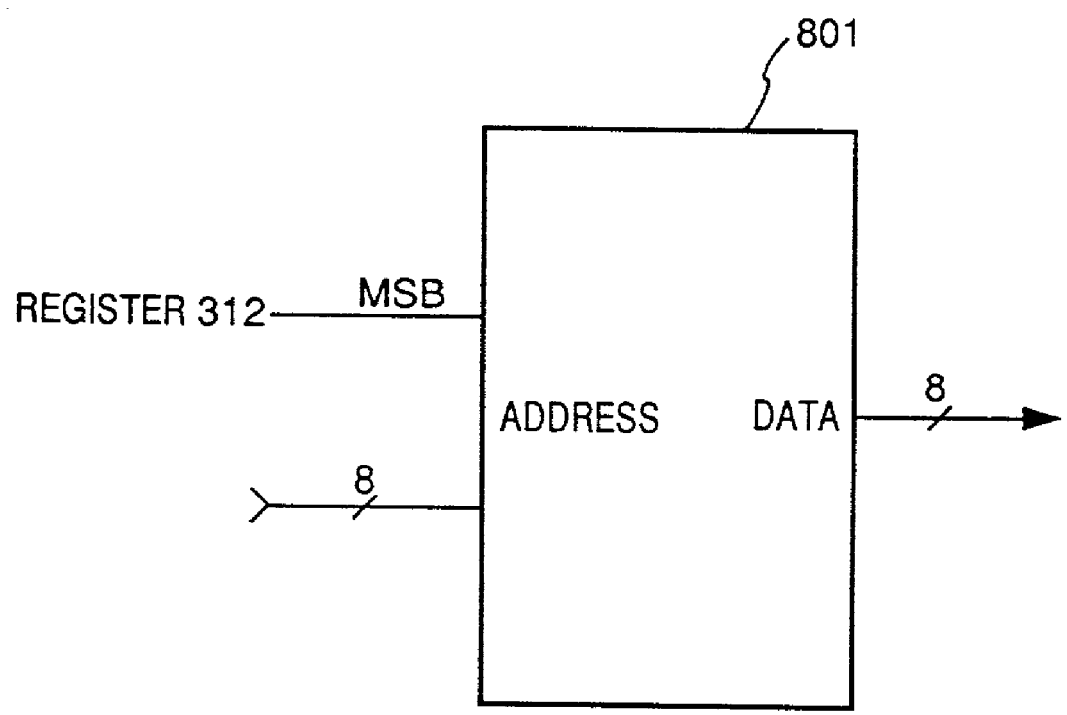
FIG. 10 is a block diagram showing the arrangement of the main part of modification 3.

FIG. 10 is a block diagram showing the arrangement of the main part of this modification. Reference numeral 801 denotes a ROM which has the same function as the ROM constituting the modulator 110. That is, an inverse function table of the demodulator 702 is written in an area corresponding to an address of an MSB of "1" of the address of the ROM 801. A table entirely different from the inverse function table is written in the area corresponding to the address of the MSB of "0". With this arrangement, a meaningless image is output unless "1" is written in the register 312. In this modification, the AND gate 311 in FIG. 3 can be omitted.

<Modification 4>

An output is fixed to "0" unless a predetermined value is written in a register in which a fixed value is to be written.

Figure 11:
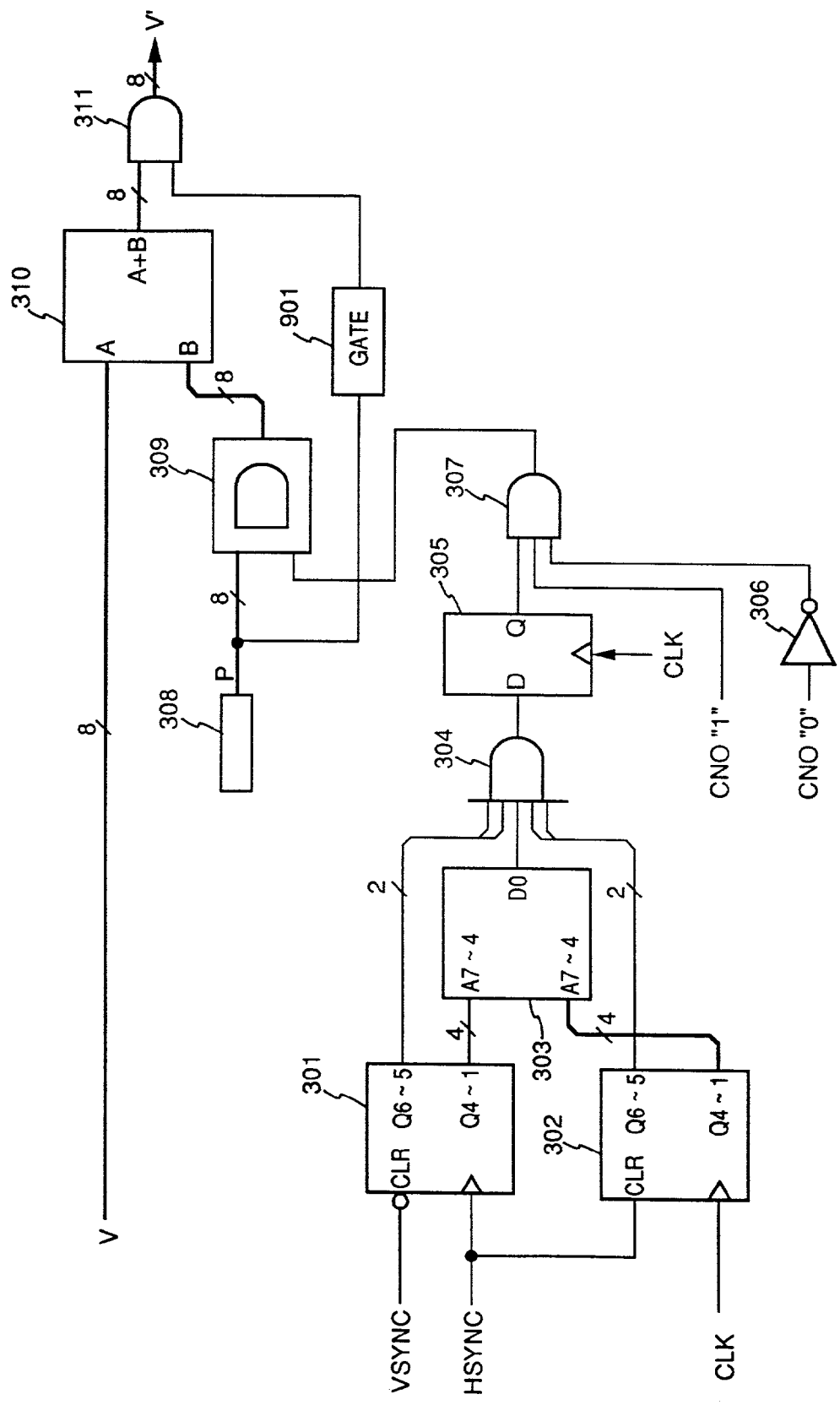
FIG. 11 is a block diagram showing a pattern addition circuit according to modification 4.

FIG. 11 is a block diagram showing the pattern addition circuit of this modification.

This pattern addition circuit is different from the pattern addition circuit (FIG. 3) of the first embodiment in that the AND gate 311 is not controlled by the register 312, but by a value written in the register 308 through a gate 901. The modulation value is normally a fixed value and 8-bit data. This modification exemplifies one of the effective methods because a possibility of accessing a predetermined value at a predetermined address is low.

<Modification 5>

An improvement of the γ-correction circuit 703 will be described below.

Figure 12:
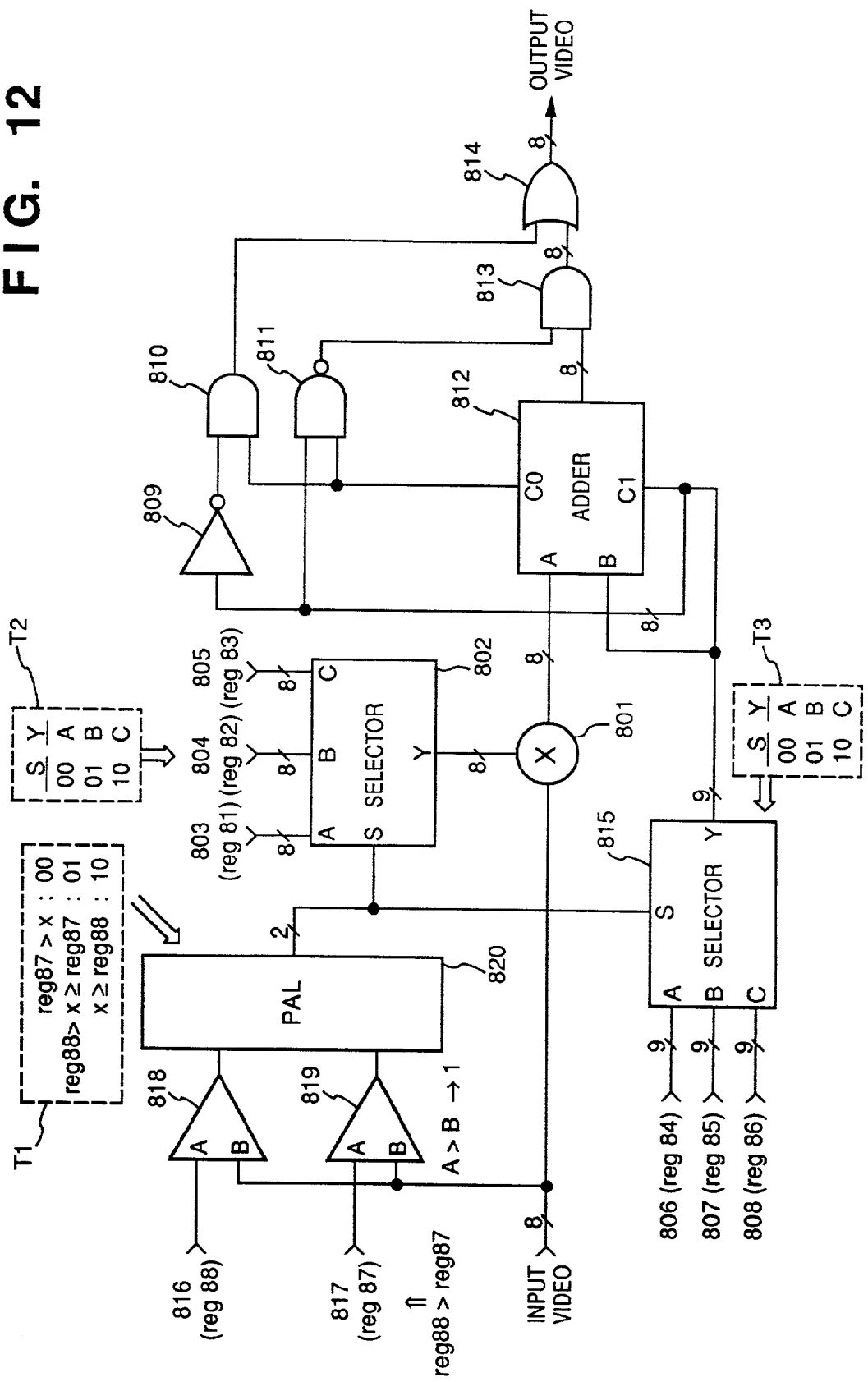
FIG. 12 is a block diagram showing the arrangement of a γ-correction circuit according to modification 5.
Figure 13:
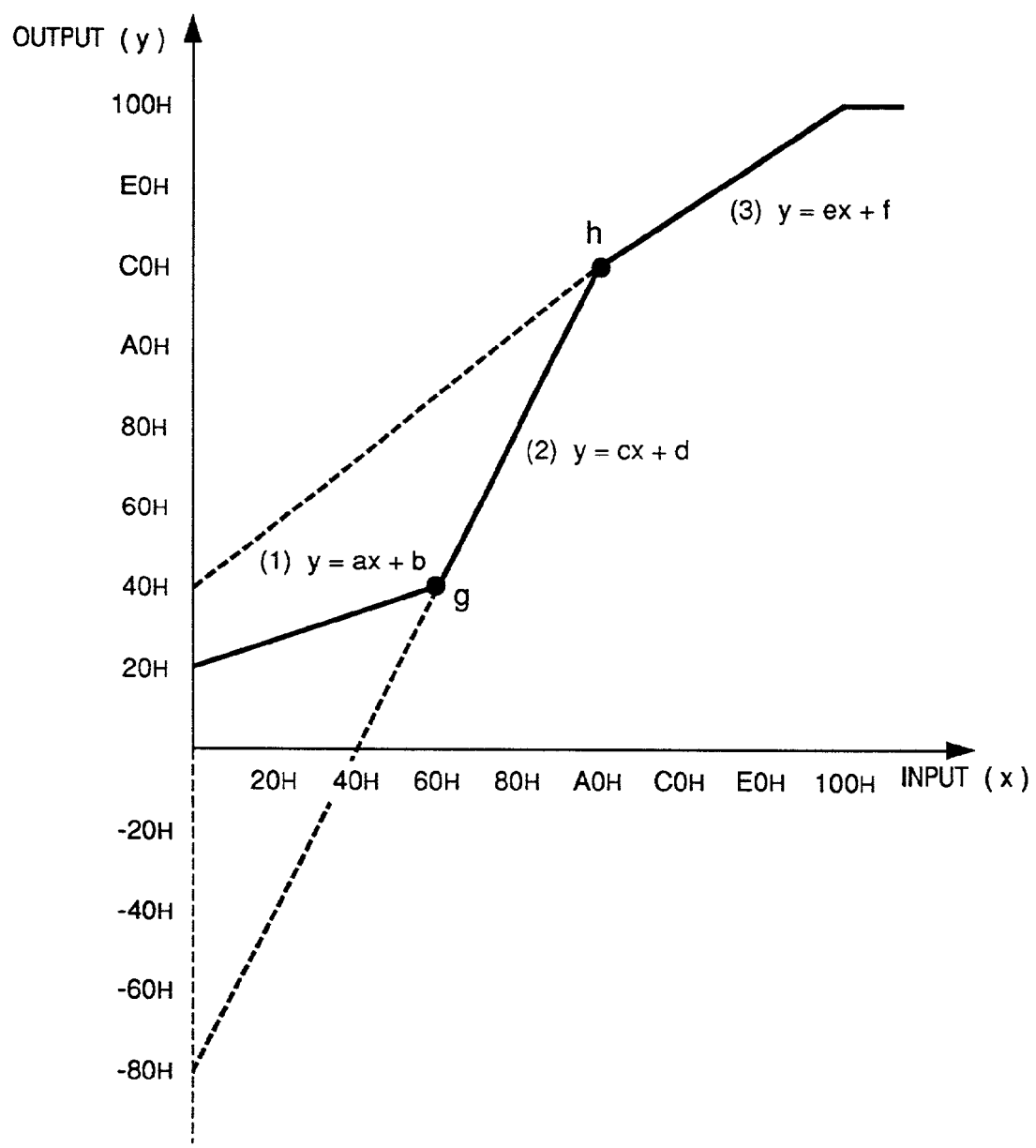
FIG. 13 is a graph for explaining the characteristics of the γ-correction circuit according to modification 5.

FIG. 12 is a block diagram showing the arrangement of the γ-correction circuit according to this modification, and FIG. 13 is a graph for explaining the characteristics of the γ-correction circuit shown in FIG. 12.

In this modification, as shown in FIG. 12, the γ-correction circuit is realized by hardware. As shown in FIG. 12, the γ-correction circuit comprises selectors 802 and 815, registers 803 to 808, 816, and 817 set by a CPU (not shown), a multiplier 801, an adder 812, comparators 818 and 819, a PAL (programmable array logic) 820, an inverter 809, AND gates 810 and 813, a NAND gate 811, and an OR gate 814.

In this γ-correction circuit, γ-correction characteristics can be selected in accordance with three linear expressions (1) to (3) in accordance with an input video signal. The registers 803 to 805 can set a gradient of 0 to 8 times every 1/32 step.

The registers 806 to 808 represent a y-intercept falling within the range of −100H to +FFH. Reference numeral 813 denotes a 0-limiter; and 814 denotes an FF-limiter. An area to which input data belongs is determined by the registers 816 and 817, the comparators 818 and 819, and the PAL 820.

In this hardware arrangement, to obtain the characteristic curve represented by the solid line in FIG. 13, the following settings are performed: reg81←0AH, reg82←80H, reg83←1AH, reg84←20H, reg85←−80H, reg86←40H, reg87←60H, and reg88H←A0H.

Referring to FIG. 12, the PAL 820 outputs a value based on a table T1 in accordance with comparison of the magnitudes of the values of the registers 816 and 817, and the selectors 802 and 815 receive an output from the PAL 820 and output signals based on tables T2 and T3.

Another improved modification of the γ-correction circuit 703 will be described below.

Figure 14:
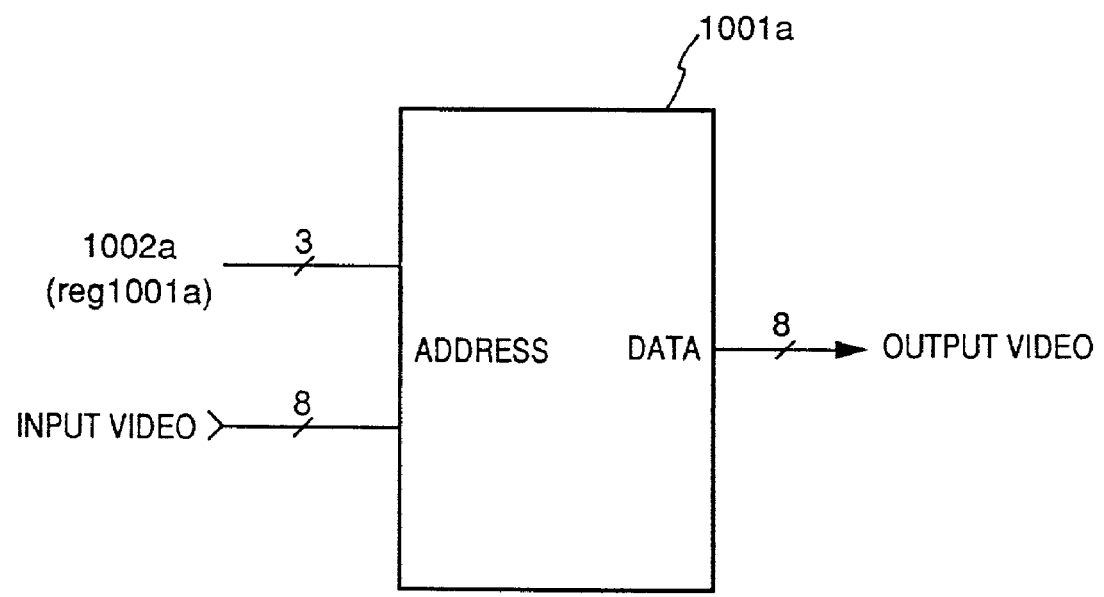
FIG. 14 is a block diagram showing the arrangement of a γ-correction circuit according to modification 6.

FIG. 14 is a block diagram showing the arrangement of the γ-correction circuit according to another modification. Reference numeral 1001a denotes a γ-correction ROM.

In this case, a plurality of tables for density correction based on the respective environmental conditions are obtained in advance and stored in the ROM 1001a. These tables are selectively used in accordance with the environmental condition to realize γ-correction. In FIG. 14, the upper three bits are switched by a CPU in accordance with a given environment.

<Modification 7>

Figure 15:
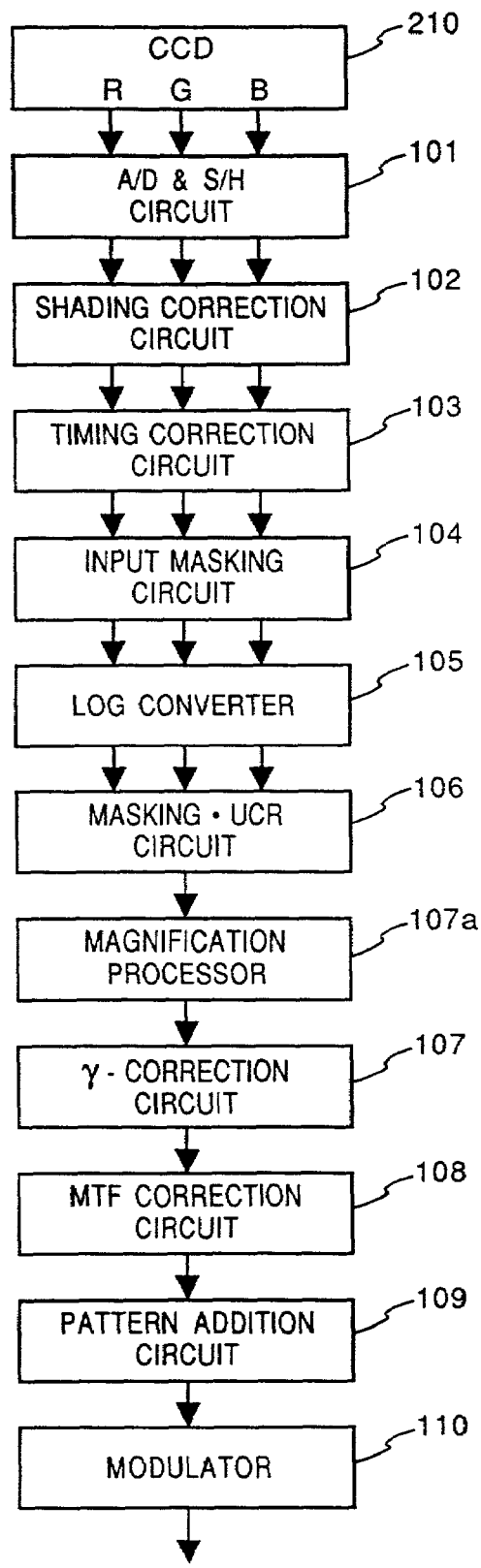
FIG. 15 is a block diagram showing the arrangement of an image scanner according to modification 7.

FIG. 15 is a block diagram showing the arrangement of the image scanner according to this modification. Referring to FIG. 15, reference numeral 107a denotes a known magnification processor for performing a magnification operation in the main scanning direction. As a detailed hardware arrangement, write enable signals of the FIFO circuit are thinned to perform a reduction process, and read clock pulses are thinned to perform an enlargement process. A magnification operation in the subscanning direction is optically performed.

The γ-correction circuit 107 can be realized by a ROM or RAM and its peripheral circuits as in the above embodiment. The MTF correction circuit 108 performs edge emphasis or smoothing. The pattern addition circuit 109 adds, to a copied image, a pattern which cannot be identified with a human eye.

According to this modification, the magnification circuit is connected to the input of the pattern addition circuit, and pattern addition independent of a magnification process, i.e., pattern generation independent of a magnification factor can be realized. By this arrangement, the following problems can be solved.

(1) When copying is performed at a magnification factor close to a one-to-one size, a possibility of erroneously reading information becomes high. If this information particularly represents a specific original, the purpose of pattern addition cannot be achieved.

(2) If a magnification factor is, e.g., 400%, the dot area becomes 16 times larger to cause a user to visually notice the pattern.

<Modification 8>

Modification 8 exemplifies a copying machine capable of performing a texture process as an incorporated process.

Figure 17:
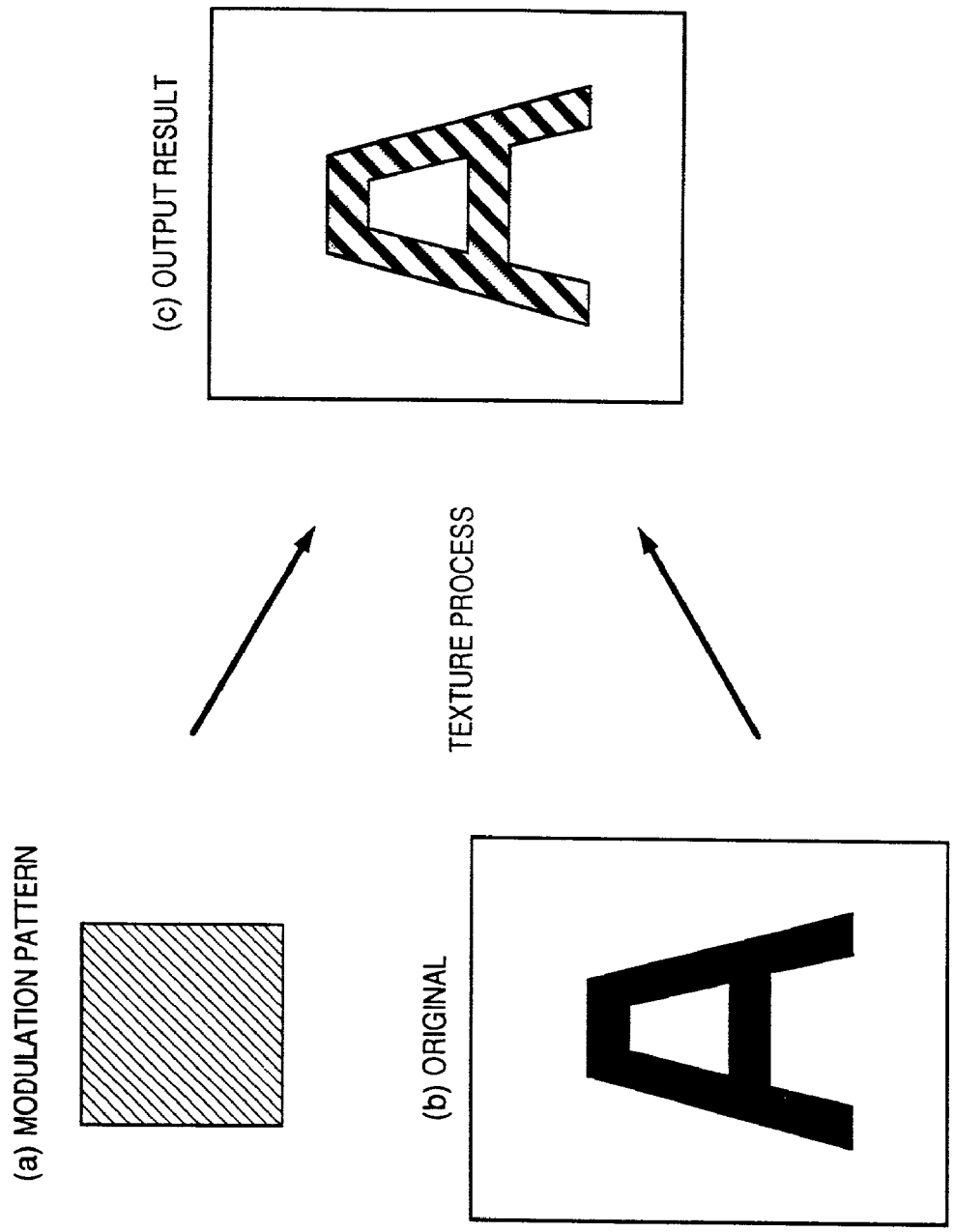
FIG. 17 is a view for explaining the texture process.

As shown in FIG. 17, the texture process is a process in which a signal of a pattern ((a) in FIG. 17) stored in a memory in advance is added to, subtracted from, or multiplied with an original image ((b) in FIG. 17) to obtain an output image ((c) in FIG. 17).

Figure 16:
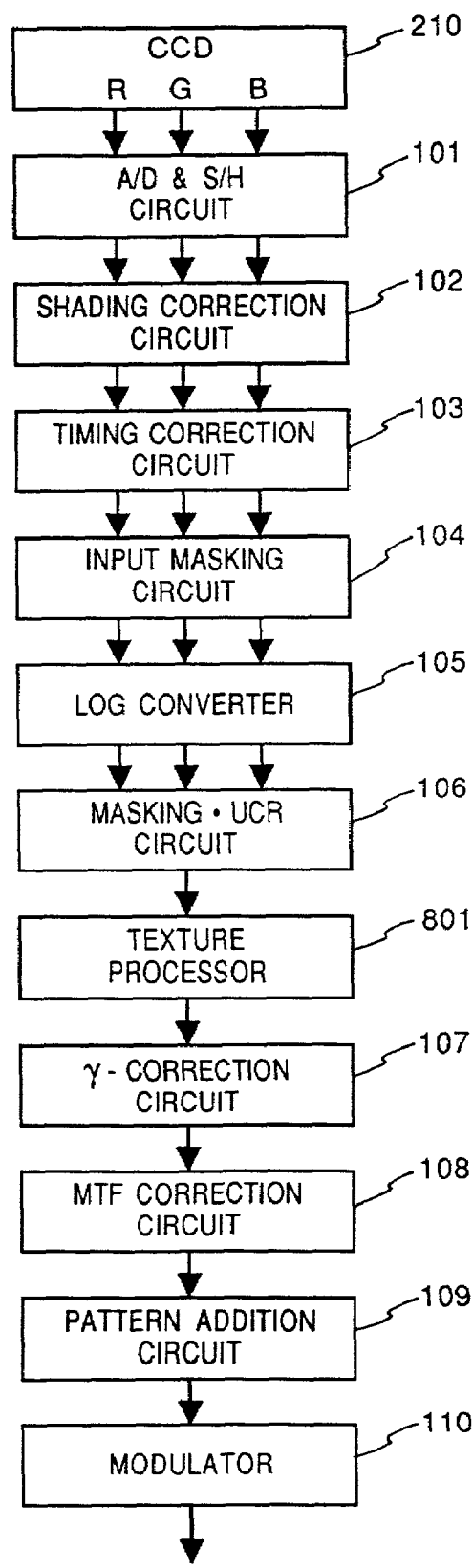
FIG. 16 is a block diagram showing the arrangement of an image scanner in a copying machine capable of performing a texture process according to modification 8.

FIG. 16 is a block diagram showing the image scanner of the copying machine capable of performing the texture process according to this modification. The same reference numerals as in modification 7 of FIG. 15 denote the same parts in FIG. 16, and a detailed description thereof will be omitted.

Referring to FIG. 16, a texture processor 801 is connected to the output of the masking•UCR circuit 106 for performing known masking and UCR (undercolor removal). This texture processor 801 is constituted by a memory and an arithmetic unit (not shown) for the memory and a video signal and outputs the image (c) in FIG. 17.

With the above arrangement, in the copying machine of this modification, a pattern can be added independently of the texture process. That is, a drawback caused by modulating and emphasizing an additional pattern in the texture process and causing the user to notice the emphasized pattern can be prevented.

<Modification 9>

This modification exemplifies a copying machine capable of performing a color conversion process as a data process.

Figure 18:
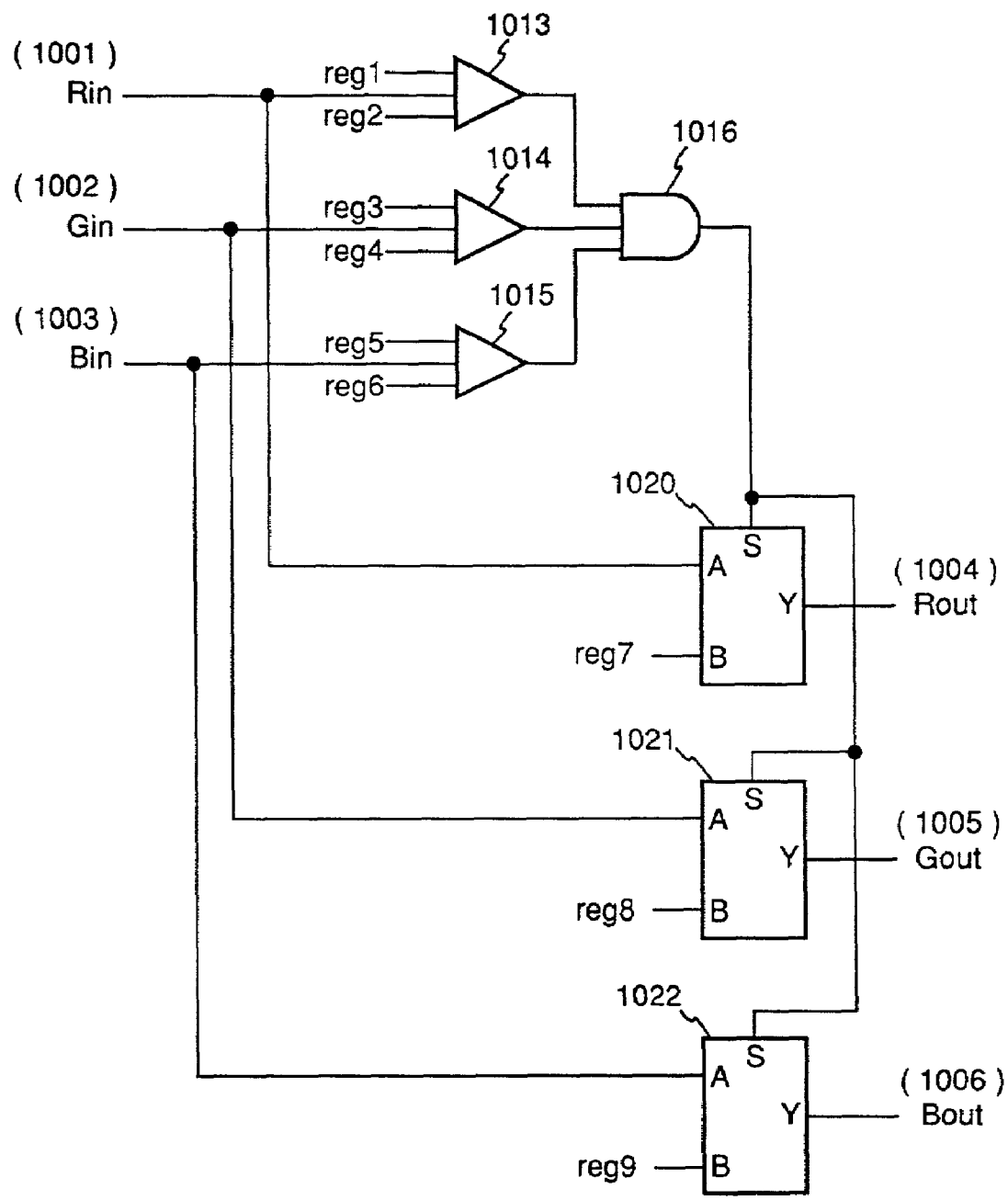
FIG. 18 is a block diagram showing a color conversion process according to modification 9.

The color conversion process is performed by a circuit shown in FIG. 18. Referring to FIG. 18, this circuit comprises window comparators 1013, 1014, and 1015, an AND gate 1016, and selectors 1020, 1021, and 1022. The window comparator 1013 receives a red input signal Rin reg1 (upper limit value) and reg2 (lower limit value). When the value of the red input signal Rin falls within the range between reg1 and reg2, an output from the window comparator 1013 is set at logic "1".

Similarly, when the value of a green input signal Gin input to the window comparator 1014 falls within the range between reg3 (upper limit value) and reg4 (lower limit value), and when the value of a blue input signal Bin input to the window comparator 1015 falls within the range of reg5 (upper limit value) and reg6 (lower limit value), outputs from the window comparators 1014 and 1015 are set at logic "1", respectively.

As a result, reg7 (converted color R), reg8 (converted color G), and reg9 (converted color B) are output as outputs Rout, Gout, and Bout (1004, 1005, and 1006) from the selectors 1020, 1021, and 1022, respectively. In this case, reg1 to reg9 are values set in registers 1 to 9 (not shown) set by a CPU (not shown).

Figure 19:
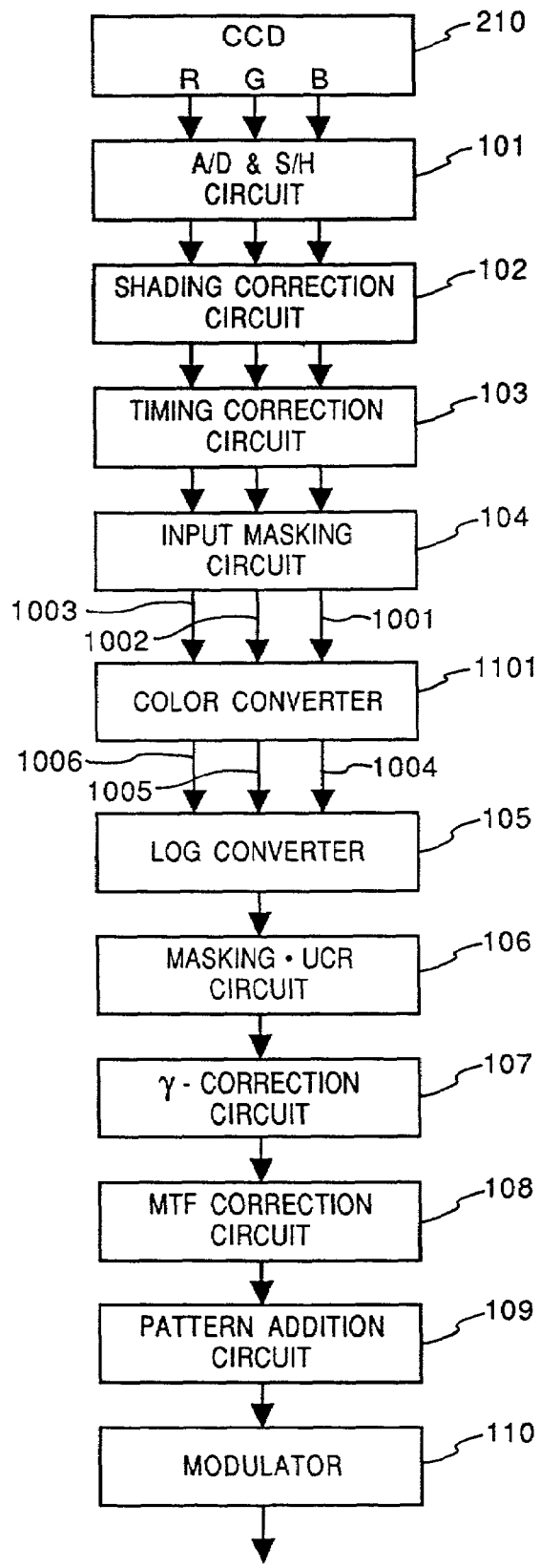
FIG. 19 is a block diagram showing a scanner for performing a color conversion process in a copying machine according to modification 9.

FIG. 19 is a block diagram showing the scanner for performing the color conversion process in the copying machine of this modification. The same reference numerals as in the scanner (FIG. 2) of the first embodiment denote the same parts of the scanner shown in FIG. 19.

A color converter 1101 in FIG. 19 is operated to perform the above color conversion process with reference to FIG. 18. As a result, a pattern can be added independently of the color conversion process. For example, a drawback caused such that color detection cannot be performed due to pattern addition to emphasize dots can be prevented.

[Second Embodiment]

The second embodiment of the present invention will be described below.

Figure 20:
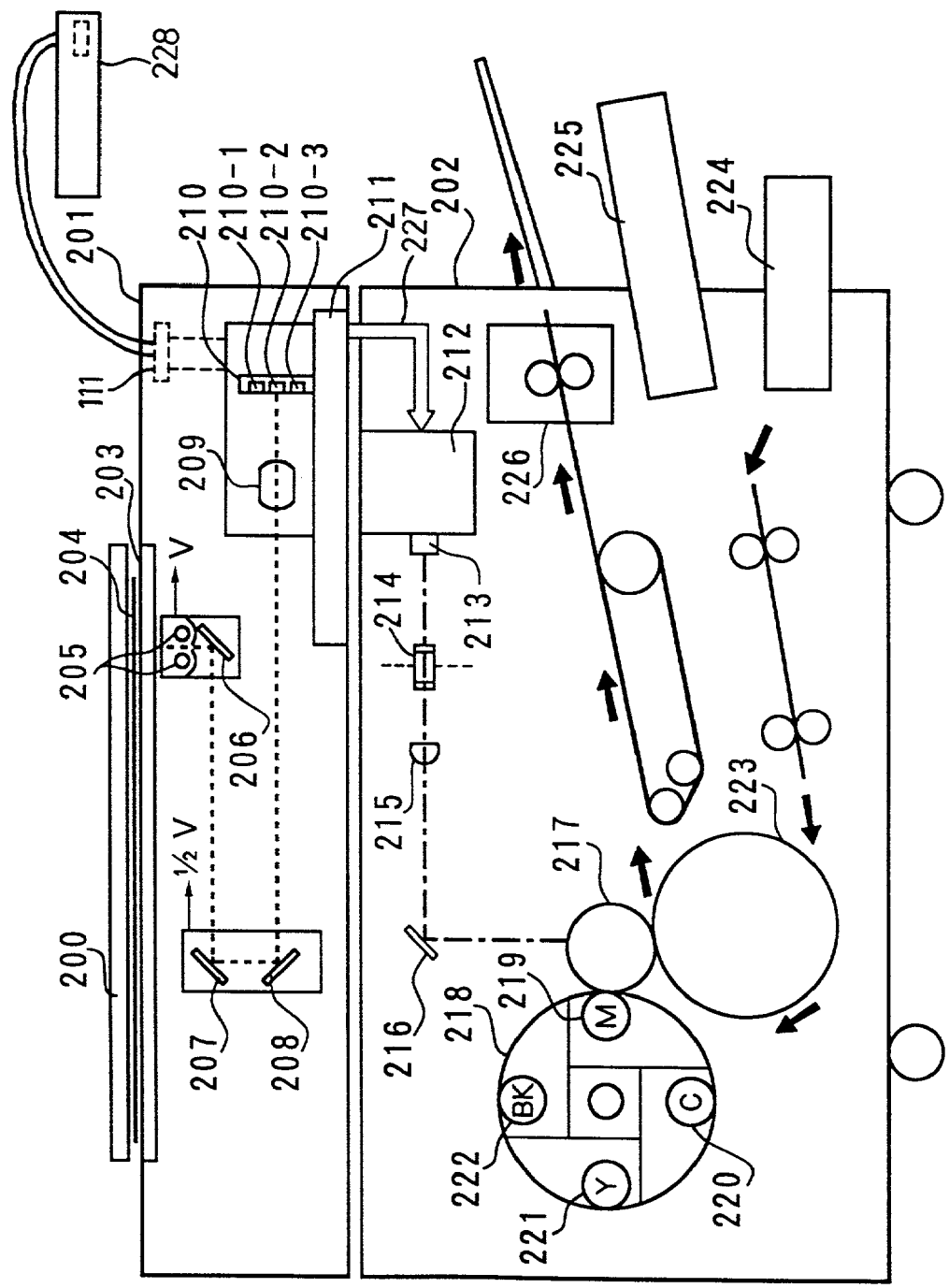
FIG. 20 is a view showing the outer appearance of a copying machine according to the second embodiment.

FIG. 20 is a view showing the outer appearance of a copying machine according to the second embodiment. The same reference numerals as in the copying machine of the first embodiment denote the same parts in the copying machine of the second embodiment, and a detailed description thereof will be omitted.

Referring to FIG. 20, reference numeral 111 denotes an interface with an external equipment 228. The interface 111 performs interfacing for a video signal, a sync signal, and a signal used in communication. This interface 111 is connected to the external equipment 228 (e.g., a reader) having the same function as that of an image scanner 201. The interface 111 is also connected to a signal processor 211 through a cable or the like.

Figure 21:
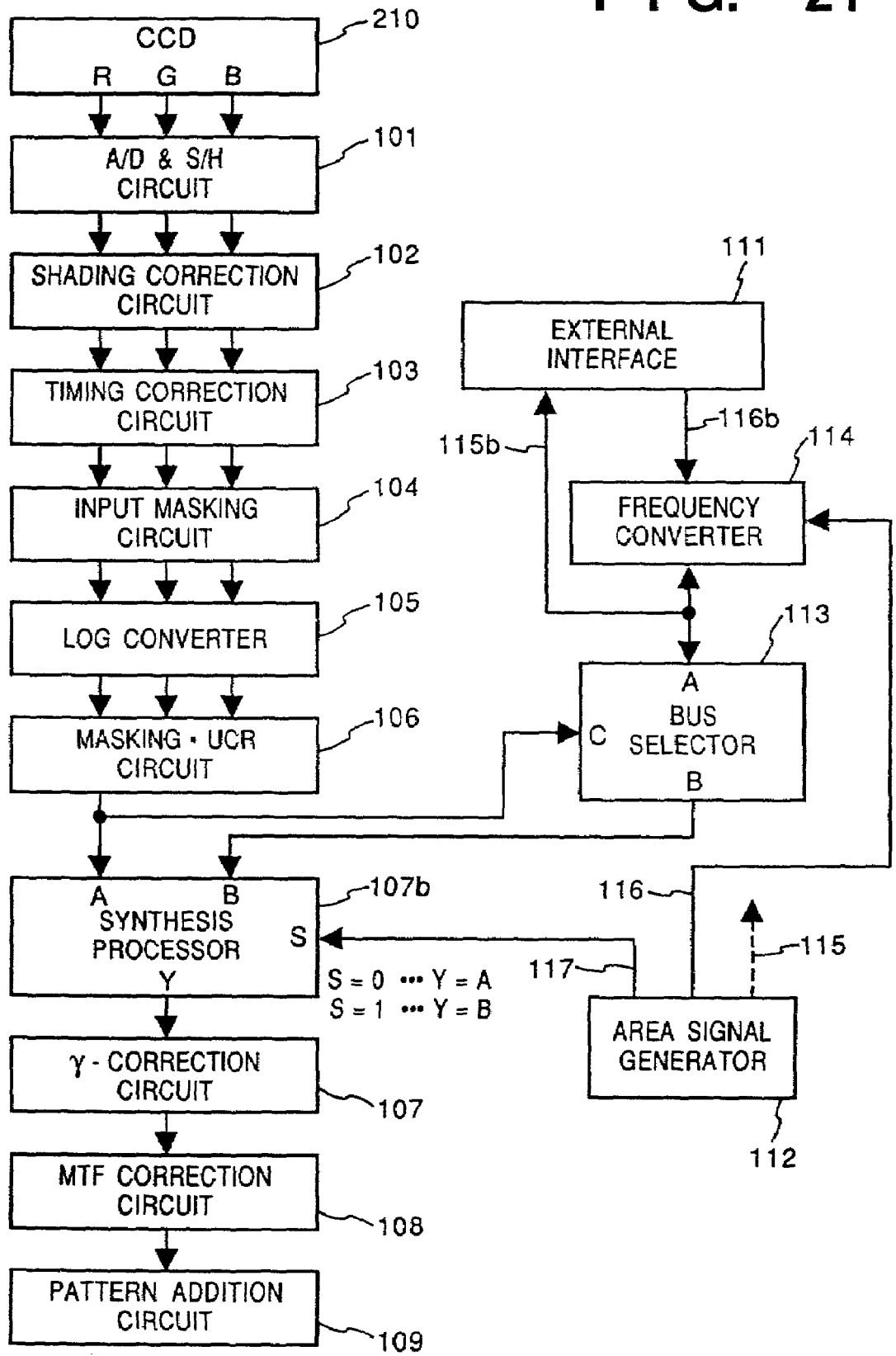
FIG. 21 is a block diagram of an image scanner 201 constituting the copying machine according to the second embodiment.

FIG. 21 is a block diagram of the image scanner 201 constituting the copying machine according to this embodiment. The same reference numerals as in the image scanner of the first embodiment shown in FIG. 2 denote the same parts in the image scanner in FIG. 21, and a detailed description thereof will be omitted.

Referring to FIG. 21, a synthesis processor 107b selects an input signal A (i.e., an input from the reader 201) or an input signal (i.e., an input from the reader 228) on the basis of a signal 117 generated by an area signal generator 112. The selected signal is output from a terminal Y. In this case, if a selection signal S=0, then Y=A; if S=1, then Y=B.

[Description of Image Signal Output to External Equipment]

A signal flow for supplying an image signal to the external equipment (the image scanner in this case) 228 is shown.

A signal read by the CCD 210 is A/D-converted and sampled/held by an A/D & S/H circuit 101. The converted signals are output as R, G, and B 8-bit signals each representing a value falling within the range of 0 to 255. Shading of these signals is corrected by a shading correction circuit 102. The signals are then subjected to correction operations in a timing correction circuit 103 and an input masking circuit 104. A LOG converter 105 then converts a luminance signal into a density signal.

A masking•UCR circuit 106 generates magenta (M), cyan (C), yellow (Y), and black (Bk) signals in accordance with a surface sequential scheme. These C, M, Y, and Bk signals are input to a terminal C of a bus selector 113. A mode of output from the terminal C to a terminal A is set in a register in the bus selector 113 by a CPU (not shown). An output from the terminal A is supplied to the external interface 111 through a signal line 115b in this output mode. At this time, a frequency converter 114 is fixed in a disable state in accordance with a read enable signal 116 generated by the area signal generator 112.

[Description of Image Signal Input from External Equipment]

The surface-sequential C, M, Y, and Bk signals input from the external interface 111 set in the input mode are input to the frequency converter 114 through a signal line 116b and are synchronized with a main scanning sync signal and an image clock in the image scanner 201.

These signals are input to the terminal A of the bus selector 113 and then to the synthesis processor 107b after they are output from a terminal B in the mode set in the register in the bus selector by a CPU (not shown).

[Operation of System in Synthesis Mode]

The main scanning sync signal and a subscanning sync signal which are output from a printer 202 are supplied to a scanner printer interface 227 and to another image scanner 228 through the image scanner 201 and the external interface 111, thereby synchronizing the system and hence obtaining a color-in-color composite image.

A pattern addition circuit and a copying result of this embodiment are the same as those of the first embodiment, and a detailed description thereof will be omitted.

As described above, the synthesis processor is connected to the input of the pattern addition circuit. A drawback in which a pattern is not added to an image signal from an external equipment due to connection of the pattern addition circuit to the output of the synthesis processor can be eliminated. Therefore, the synthesis process can be smoothly performed.

<Modification 1>

Figure 22:
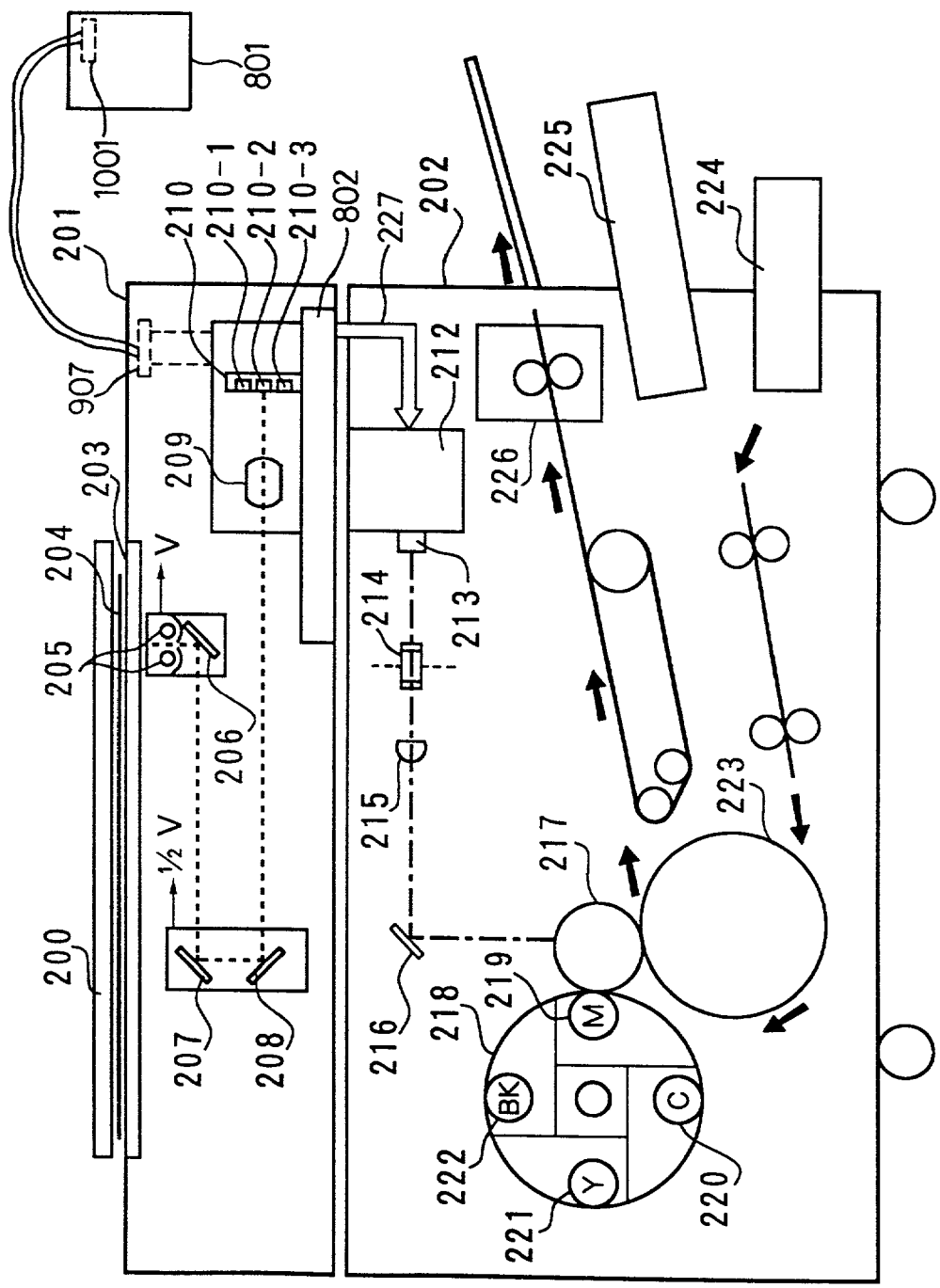
FIG. 22 is a view showing the outer appearance of a copying machine according to modification 1 of the second embodiment.

FIG. 22 is a view showing the outer appearance of the copying machine of this modification. The same reference numerals as in the copying machine of the second embodiment shown in FIG. 20 denote the same parts in the copying machine of this modification. A memory unit 801 comprising an image memory is connected to a signal processor 802 through an external interface 907 in place of the image scanner as the external equipment.

[Image Scanner]

Figure 23:
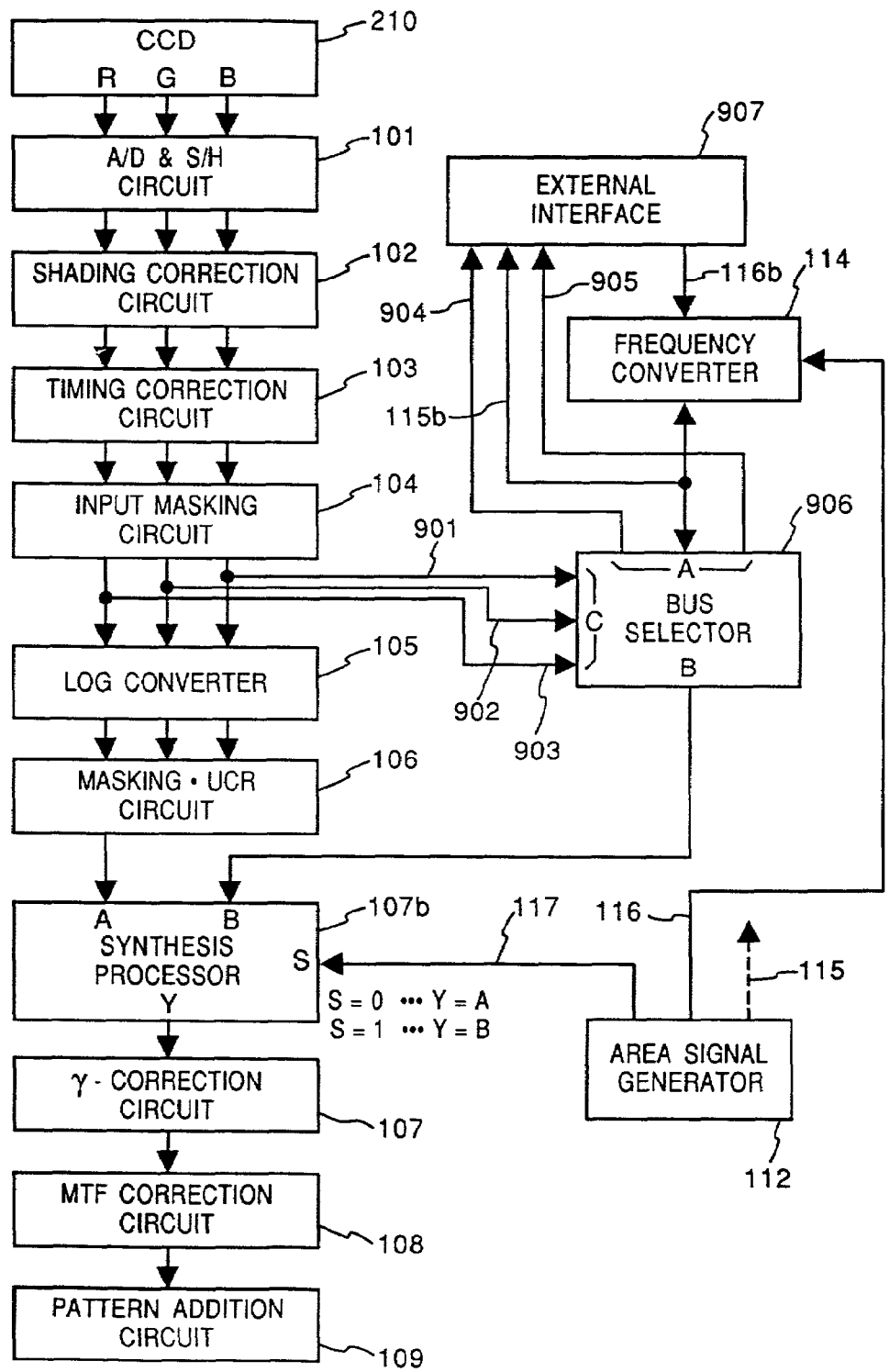
FIG. 23 is a block diagram of an image scanner 201 shown in FIG. 22.

FIG. 23 is a block diagram of the image scanner 201 shown in FIG. 22. The same reference numerals as in the image scanner in FIG. 21 denote the same parts in the image scanner in FIG. 23, and a detailed description thereof will be omitted. In the image scanner shown in FIG. 23, outputs to the external equipment (memory unit 801) are not synchronized with the surface-sequential C, M, Y, and Bk signals, but with R, G, and B signals (R, G and B in parallel).

The flow of an image signal to the external equipment in this modification will be described below.

Signals read by the CCD 210 are A/D-converted and sampled/held by the A/D & S/H circuit 101 and are output as R, G, and B 8-bit signals each representing a value falling within the range of 0 to 255. Shading of these signals is corrected by the shading correction circuit 102, and these signals are then subjected to correction operations in the timing correction circuit 103 and the input masking circuit 104. The resultant signals are input to a terminal C of a bus selector 906 through signal lines 901 to 903. Since a mode of output from the terminal C to a terminal A is set in the bus selector 906 by a CPU (not shown), the signals input to the terminal C are output to an external interface 907 through the signal line 115b, and signal lines 904 and 905.

The masking•UCR circuit 106 generates magenta (M), cyan (C), yellow (Y), and black (Bk) signals in accordance with a surface sequential scheme. These C, M, Y, and Bk signals are input to the terminal C of the bus selector 113 and the mode of output from the terminal C to the terminal A is set in a register in the bus selector 113 by a CPU (not shown). The signals are output from the terminal A to the external interface 907 through the signal line 115b in this output mode. At this time, the frequency converter 114 is fixed to a disable state by the read enable signal 116 generated by the area signal generator 112.

Figure 24:
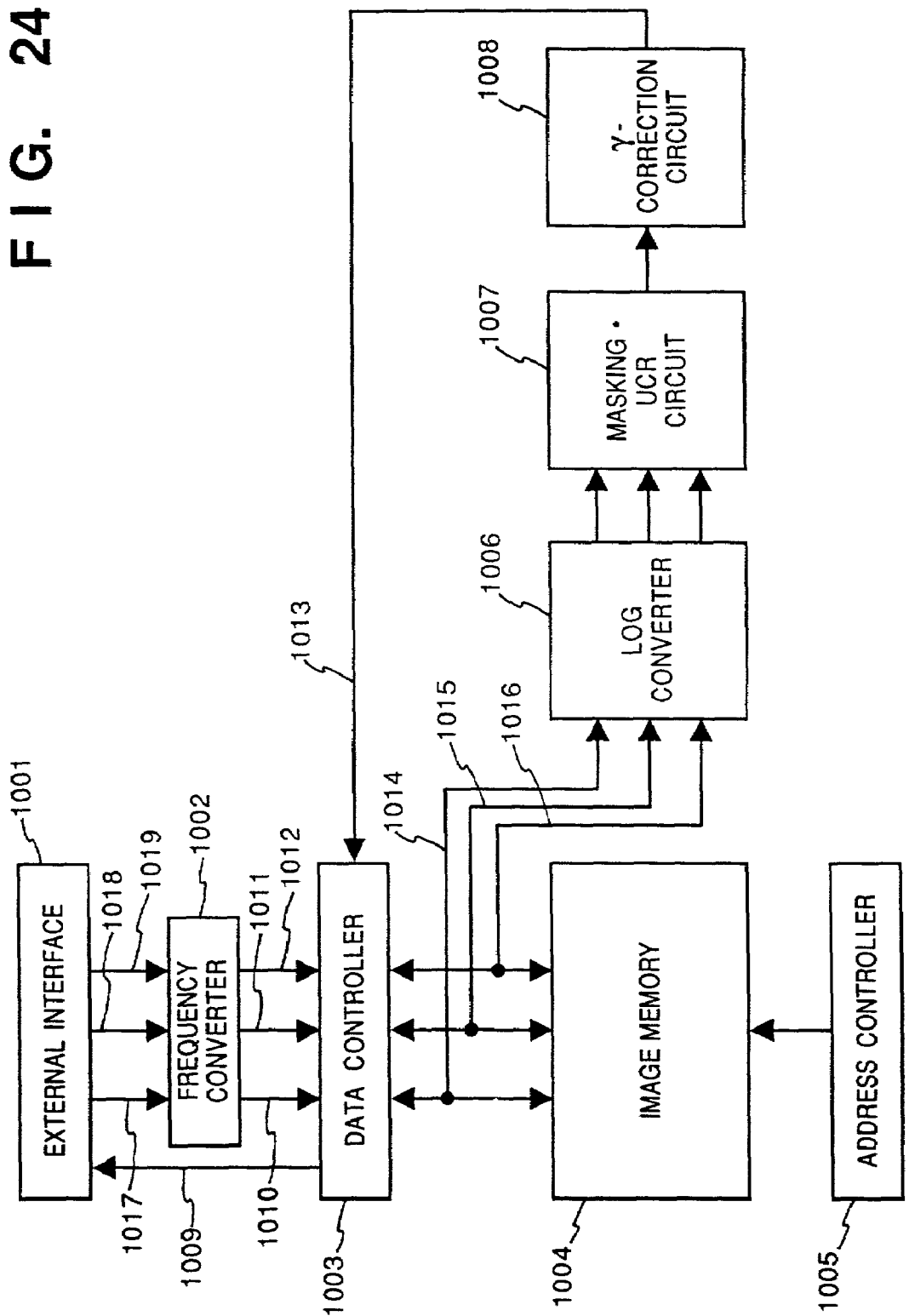
FIG. 24 is a block diagram showing the internal arrangement of a memory unit 801 according to modification 2 of the second embodiment.

FIG. 24 is a block diagram showing the internal arrangement of the memory unit 801. This unit has a function of storing an external image signal in an image memory 1004 and a function of outputting data stored in the image memory to the external equipment in synchronism with the external equipment (the image scanner 201 in this case).

[Write Access to Image Memory]

R, G, and B signals input from an external interface 1001 set in the input mode are sent to a frequency converter 1002 through signal lines 1017 to 1019. In this frequency converter, the input signals are synchronized with an image clock in the memory unit 801 (a main scanning signal for the image scanner 201 is used). Output signals 1010 to 1012 from the memory unit 801 are written in the image memory 1004 through a data controller 1003. Note that the image memory 1004 has a total capacity of 24 bits for the R, G, and B components. At this time, address and memory control signals are controlled by an address controller 1005.

[Image Output to External Equipment]

The R, G, and B data generated by the printer 202 are read out from the image memory 1004 through the reader-printer interface 227 and the external interface 907 in accordance with an address generated by the address controller 1005 on the basis of the main scanning and subscanning sync signals input from the external interface 1001.

The readout R, G, and B signals are converted from a luminance signal to a density signal by a LOG converter 1006 through signal lines 1014 to 1016. A masking•UCR circuit 1007 performs known masking•UCR. Signals γ-corrected by a γ-correction circuit 1008 are output from the external interface 1001 set in the output mode through the data controller 1003 and a signal line 1009.

To obtain one composite image, four colors, i.e., C, M, Y, and Bk are required. Four read access cycles of the image memory 1004 are performed in the memory unit 801, and the C, M, Y, and Bk data are sent to the image scanner 201 in accordance with a surface sequential scheme.

<Modification 2>

Figure 25:
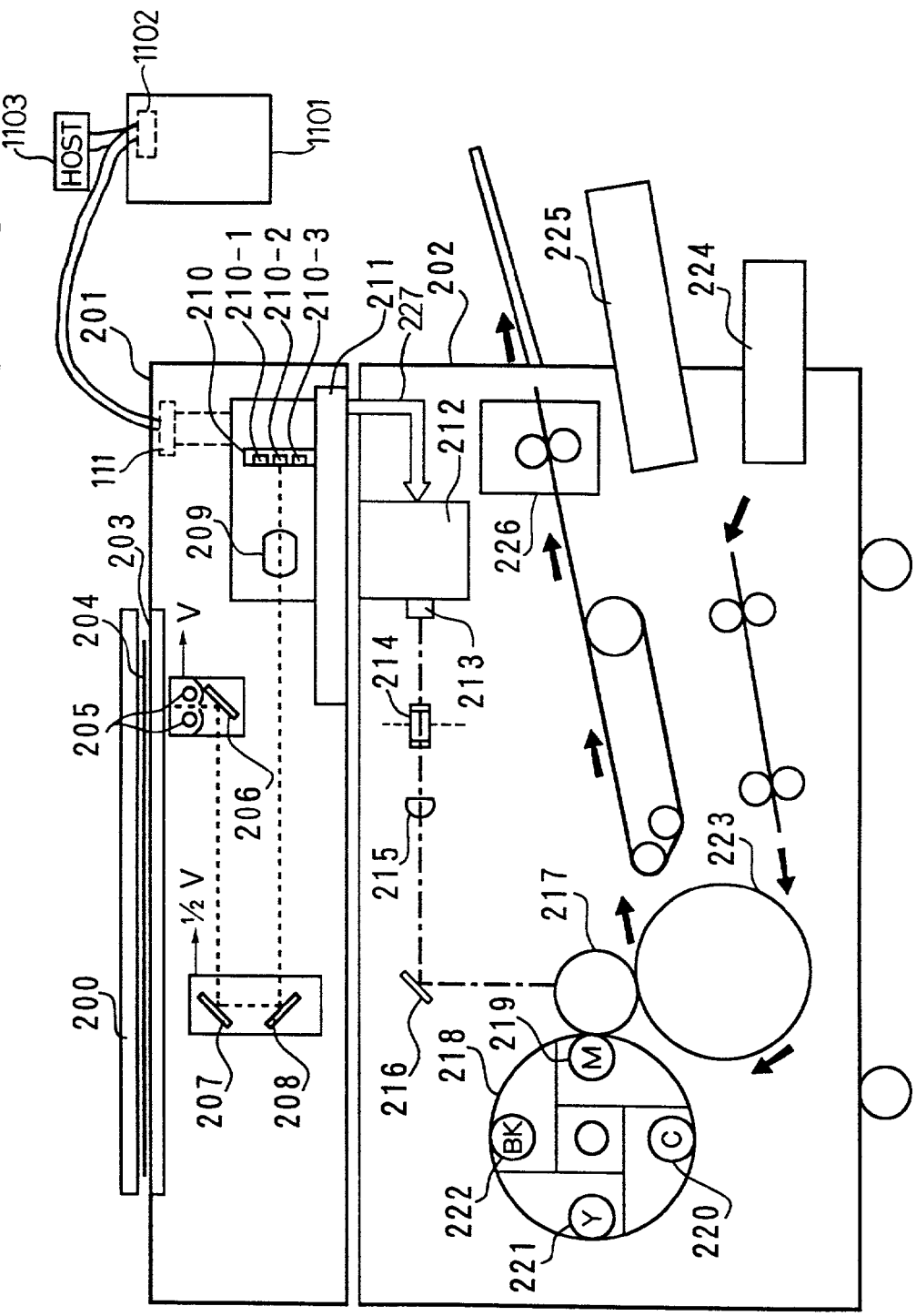
FIG. 25 is a view showing the outer appearance of a copying machine according to modification 2.

FIG. 25 is a view showing the outer appearance of the copying machine of this modification. The copying machine shown in FIG. 25 is different from the copying machine shown in FIG. 22 in that the copying machine comprises a memory unit 1101 and a host computer 1103 connected to the memory unit 1101 through a GPIB cable.

Figure 26:
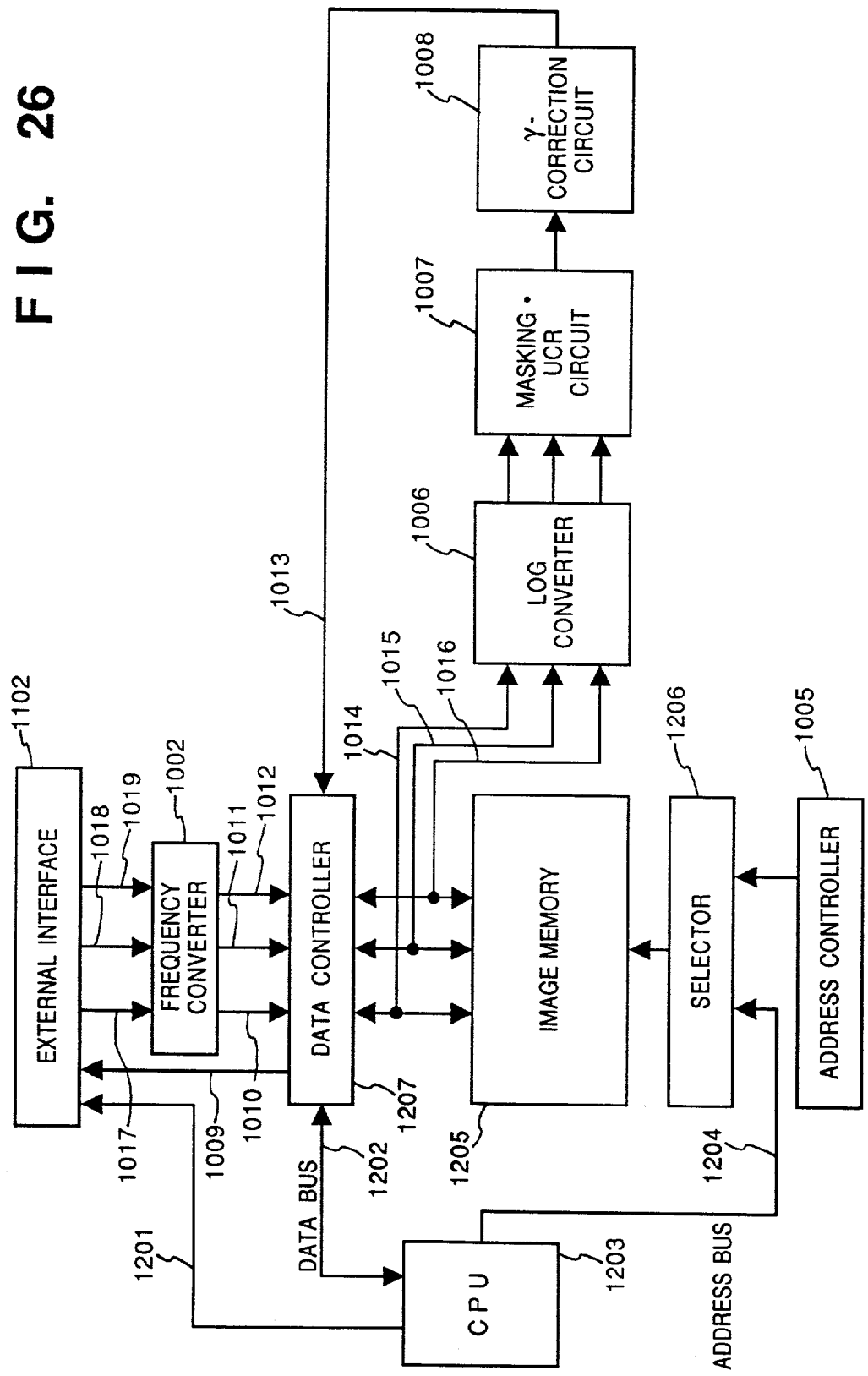
FIG. 26 is a block diagram showing the arrangement of a memory unit 1101 according to modification 2.
Figure 27A:
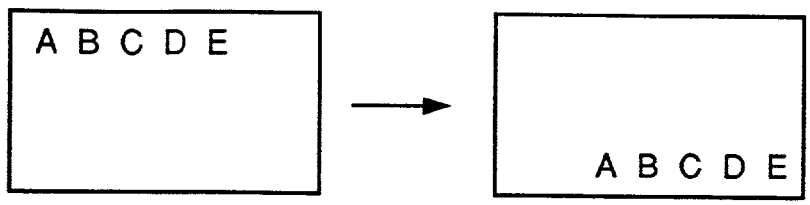
FIGS. 27A, 27B, 27C, and 27D are views showing an image process in a conventional color copying machine.
Figure 27B:
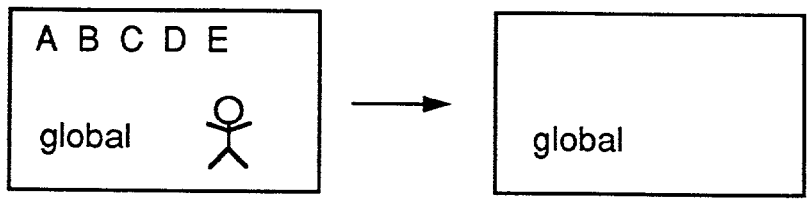
Figure 27C:
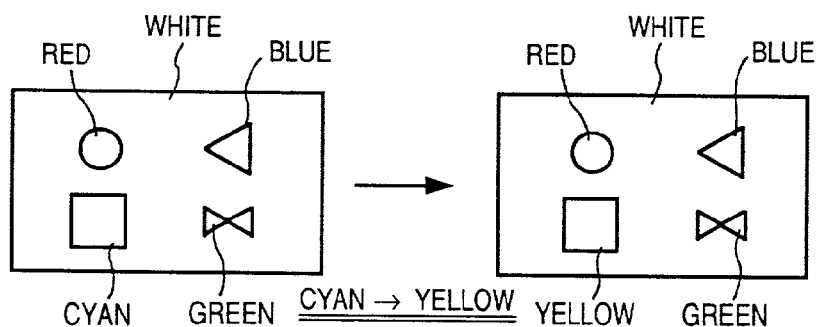
Figure 27D:
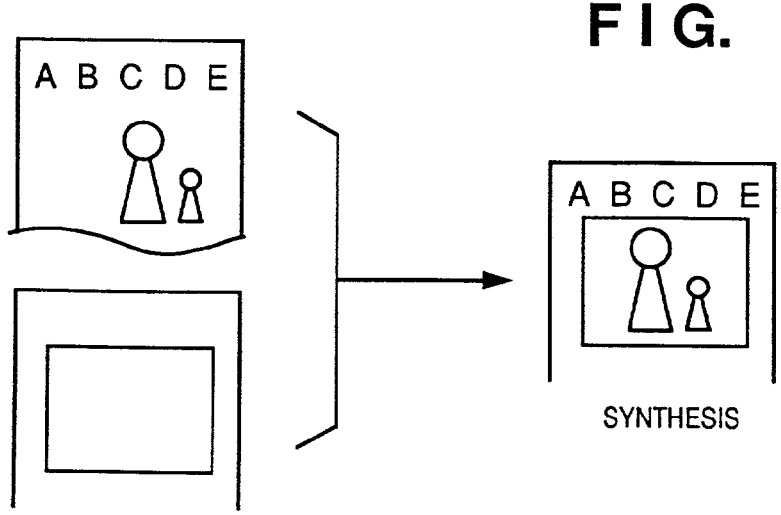

FIG. 26 is a block diagram showing the arrangement of the memory unit 1101. In this case, the memory unit 1101 is different from the memory unit shown in FIG. 24 in that the memory unit 1101 additionally has a function of receiving image data from the host computer 1103 to an image memory 1205.

[Data Write Access from Host to Image Memory]

Image data from the host computer 1103 to a CPU 1203, e.g., image data sent through the GPIB cable, are stored in a memory (not shown) in the CPU through an external interface 1102 and a signal line 1201. An address controller 1005, a data controller 1207, and a selector 1206 are controlled to write data from the host computer 1103 in the image memory 1205.

The above operation is repeated for all the C, M, Y, and Bk data (in this case, the image memory 1205 has a 32-bit capacity per pixel for all the C, M, Y, and Bk components having 8 bits each).

The above write access may be performed by a DMA process.

[Image Data Output to Image Scanner]

The C, M, Y, and Bk data generated by the printer 202 are read out from the image memory 1205 through the reader-printer interface 227 and an external interface 111 in accordance with an address generated by the address controller 1005 on the basis of the main scanning and subscanning sync signals input from the memory unit 1101. These C, M, Y, and Bk data are output to the external interface 1102 through, e.g., the data controller 1207 in accordance with a surface sequential scheme.

As described above, the image signals are processed and synthesized, and a specific pattern expressed in the form of distributed dots is added to the image signal. Therefore, the specific pattern is not adversely affected by the data and synthesis processes.

[Third Embodiment]

The third embodiment of the present invention will be described below. A copying machine of this embodiment has the same arrangement as that of the first embodiment shown in FIG. 1, and a detailed description thereof will be omitted.

Figure 28:
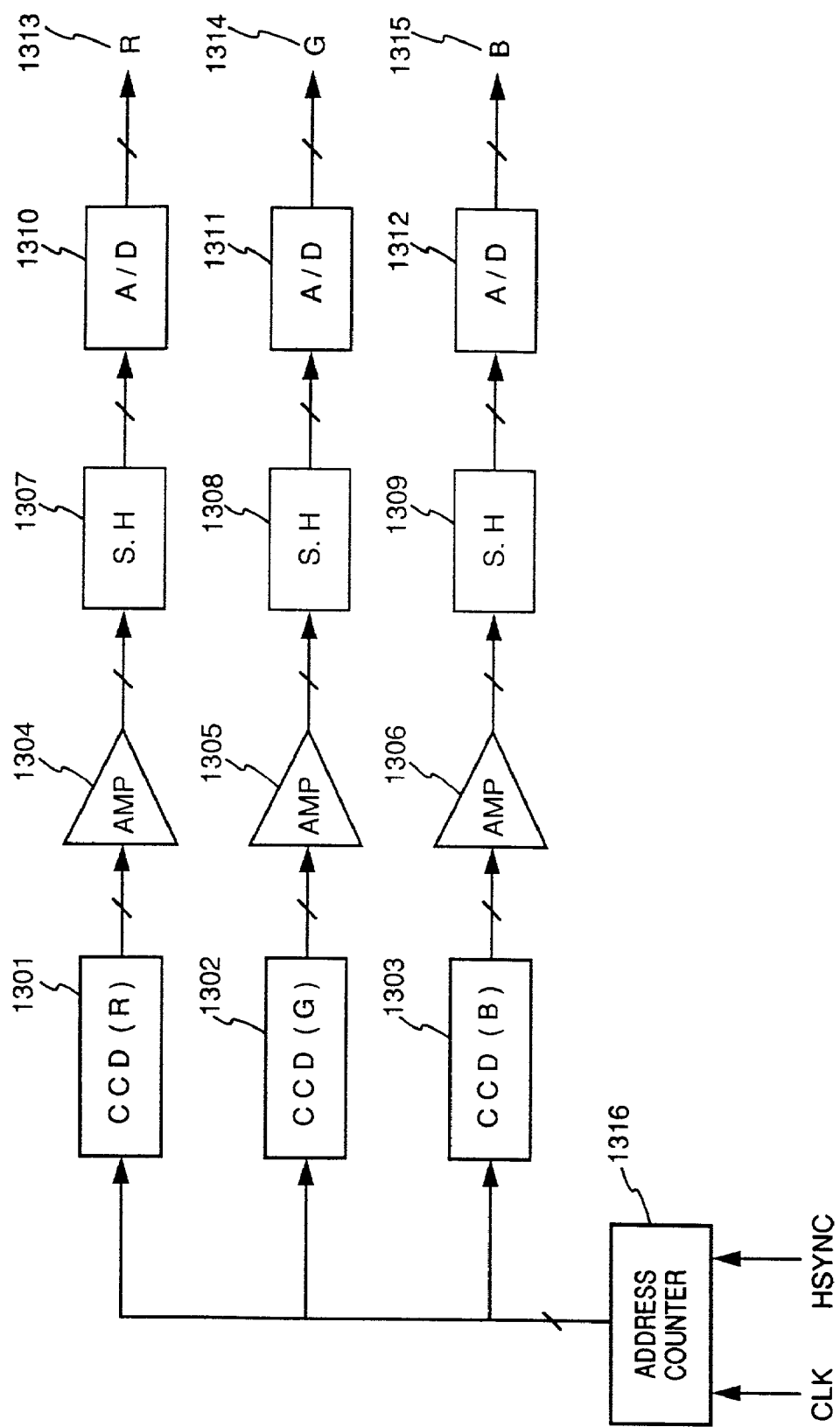
FIG. 28 is a block diagram showing the arrangement of an image scanner according to the third embodiment.

FIG. 28 is a block diagram for explaining the arrangement of an image scanner 201 according to this embodiment. Referring to FIG. 28, reference numeral 1316 denotes a counter for outputting a main scanning address for designating main scanning positions of line sensors 1301 to 1303 constituting a line sensor 210. That is, if a horizontal sync signal HSYNC is set at logic "1", the count of the counter 1316 is set to a predetermined value by a CPU (not shown) and is incremented by an image clock signal CLK.

An image formed on the line sensor 210 is photoelectrically converted by the three line sensors 1301 to 1303 and is extracted as R, G, and B component read signals. These signals are processed through amplifiers (AMPs) 1304 to 1306, sample•hold circuits (S/H) 1307 to 1309, and A/D converters 1310 to 1312 and are output as an 8-bit digital image signal 1313 (corresponding to R), an 8-bit digital image signal 1314 (corresponding to G), and an 8-bit digital image signal 1315 (corresponding to B).

Figure 29:
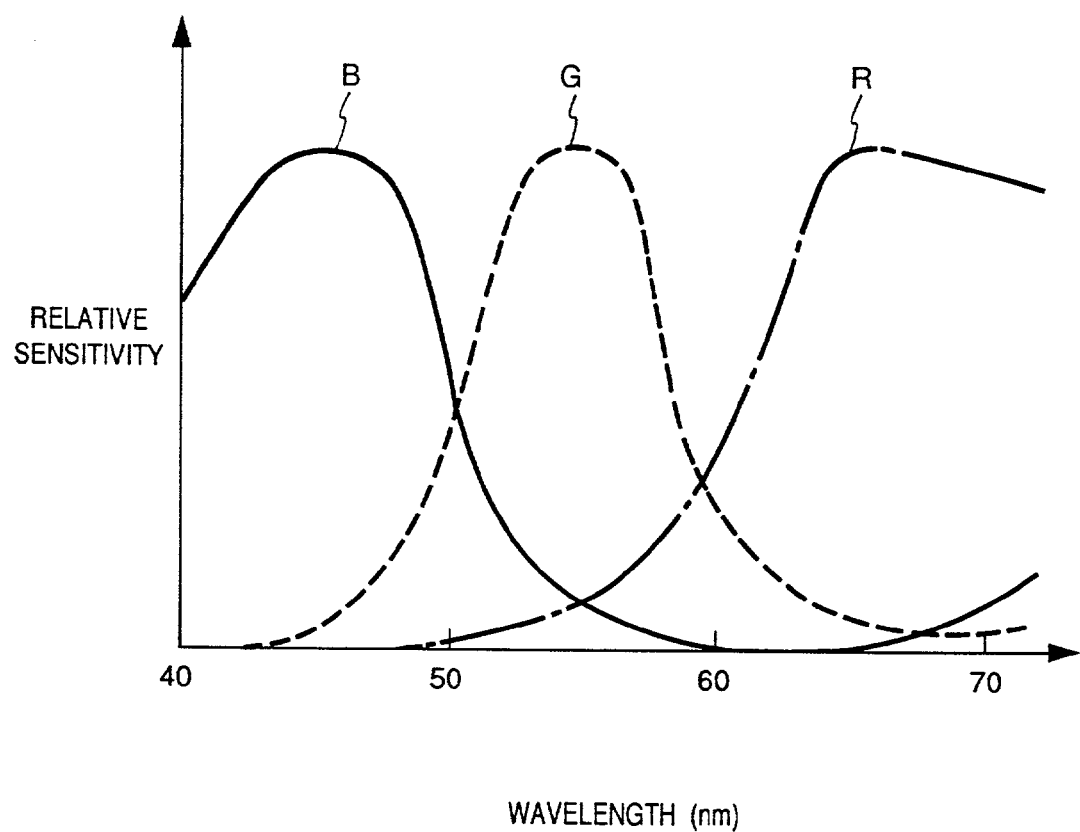
FIG. 29 is a graph showing a relative sensitivity corresponding to the wavelength of light on a CCD.

FIG. 29 is a view showing the relative sensitivities corresponding to the wavelengths of light beams on the CCD(R) 1301, the CCD(G) 1302, and the CCD(B) 1303.

Figure 30:
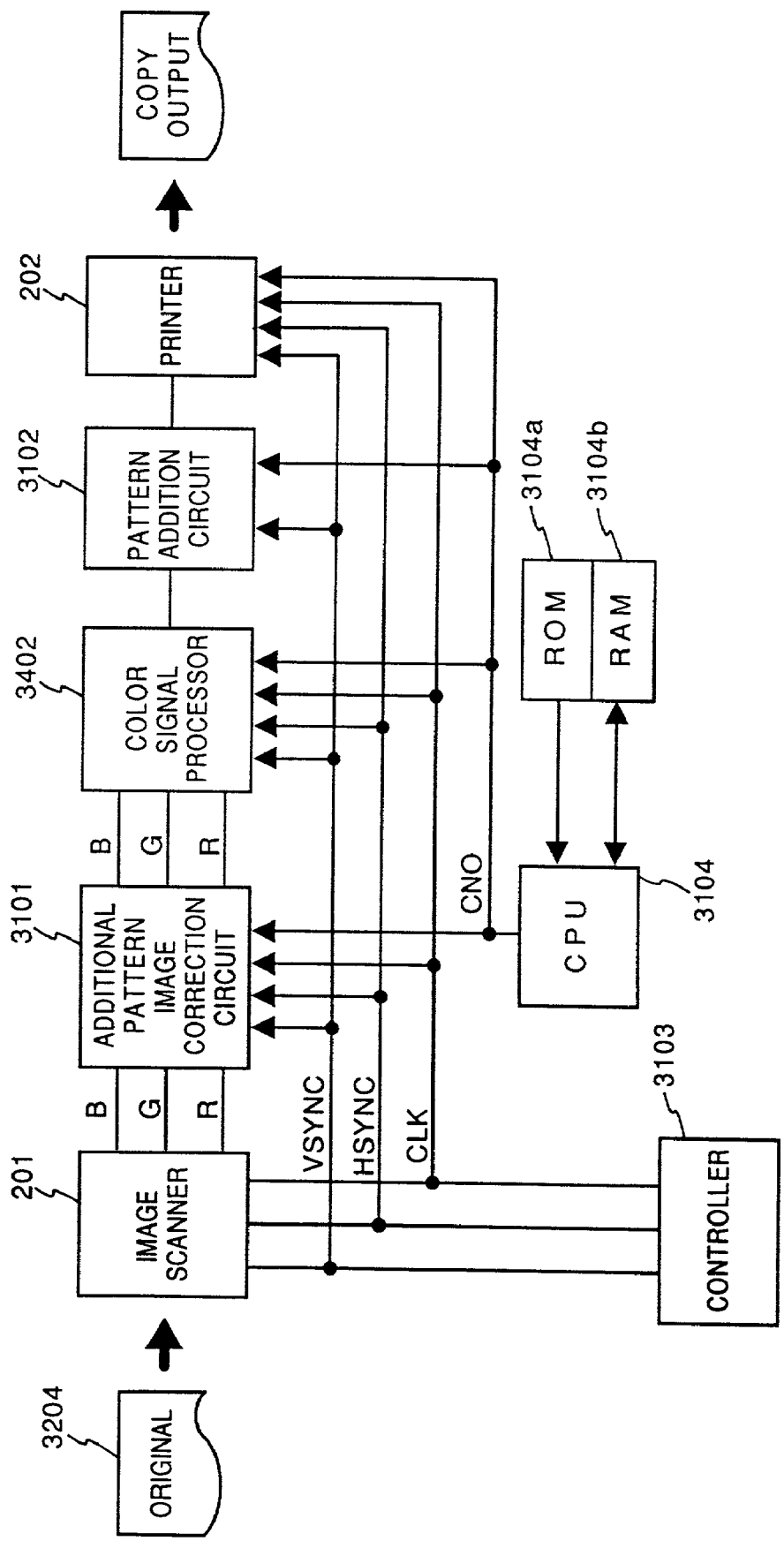
FIG. 30 is a block diagram showing the arrangement of an image processing unit according to the third embodiment.

FIG. 30 is a block diagram showing the arrangement of a signal processor (image processing unit) 211. Referring to FIG. 30, reference numeral 3204 denotes an original; 3101 denotes an additional pattern image correction circuit; 3102 denotes a pattern addition circuit; 3103 denotes a controller for generating and outputting a vertical sync signal (VSYNC), a horizontal sync signal (HSYNC), and a clock (CLK) signal; 3402 denotes a color signal processor; 3104 denotes a CPU for controlling the overall apparatus; 3104a denotes a ROM for storing programs for operating the CPU 3104; and 3104b denotes a RAM serving as a work area of each block in the ROM.

The operation of the signal processor 211 will be described below.

Color image signals (R, G, and B) read by the image scanner 201 are input to the additional pattern image correction circuit 3101. The additional pattern image correction circuit 3101 determines a light yellow character and removes it from an image signal. In the color signal processor 3402, print color signals (Y, M, C, and K) are generated from input color signals (R, G, and B).

The pattern addition circuit 3102 adds a machine number serving as the number unique to the apparatus to the image signal during printing in yellow. The controller 3103 is a circuit for generating the sync signals. The VSYNC signal is a subscanning interval signal, i.e., a signal representing a subscanning image output interval. The HSYNC signal is a main scanning sync signal, i.e., a signal for synchronizing the start of main scanning. The CLK signal is a fundamental clock for an image process.

Figures 37, 38:
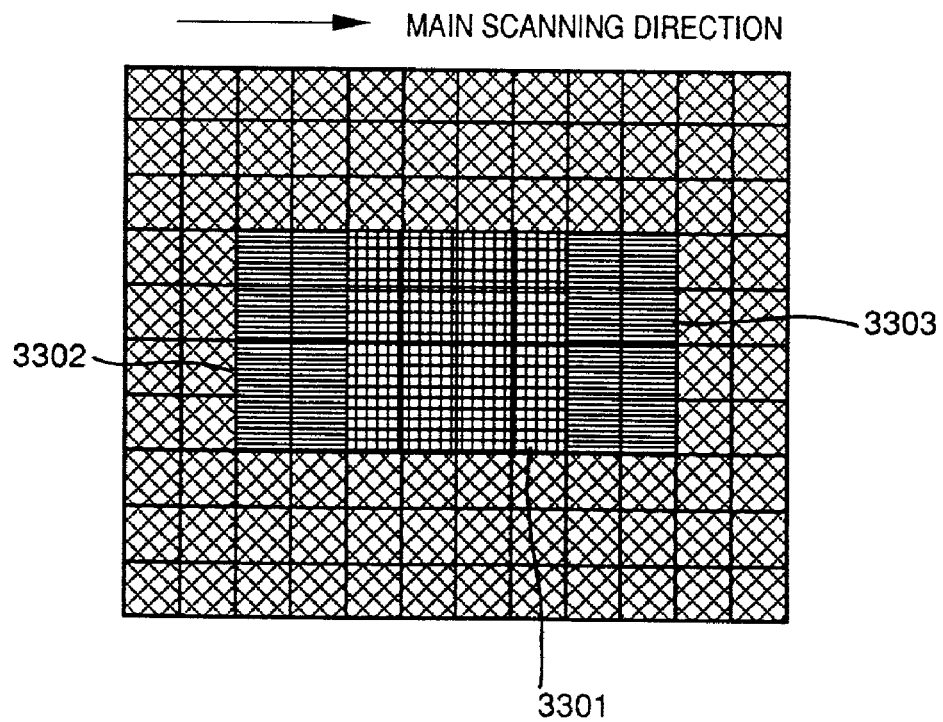
FIG. 37 is a table showing surface sequential signals CNO.
FIG. 38 is a view for explaining an additional pattern according to the third embodiment.

The CPU 3104 is a microprocessor for outputting surface sequential signals CNO shown in FIG. 37. In a laser color printer used in this embodiment, the color components are printed in an order of M (magenta), C (cyan), Y (yellow), and Bk (black). Each surface sequential signal CNO is a signal representing the currently printed color.

Figure 31:
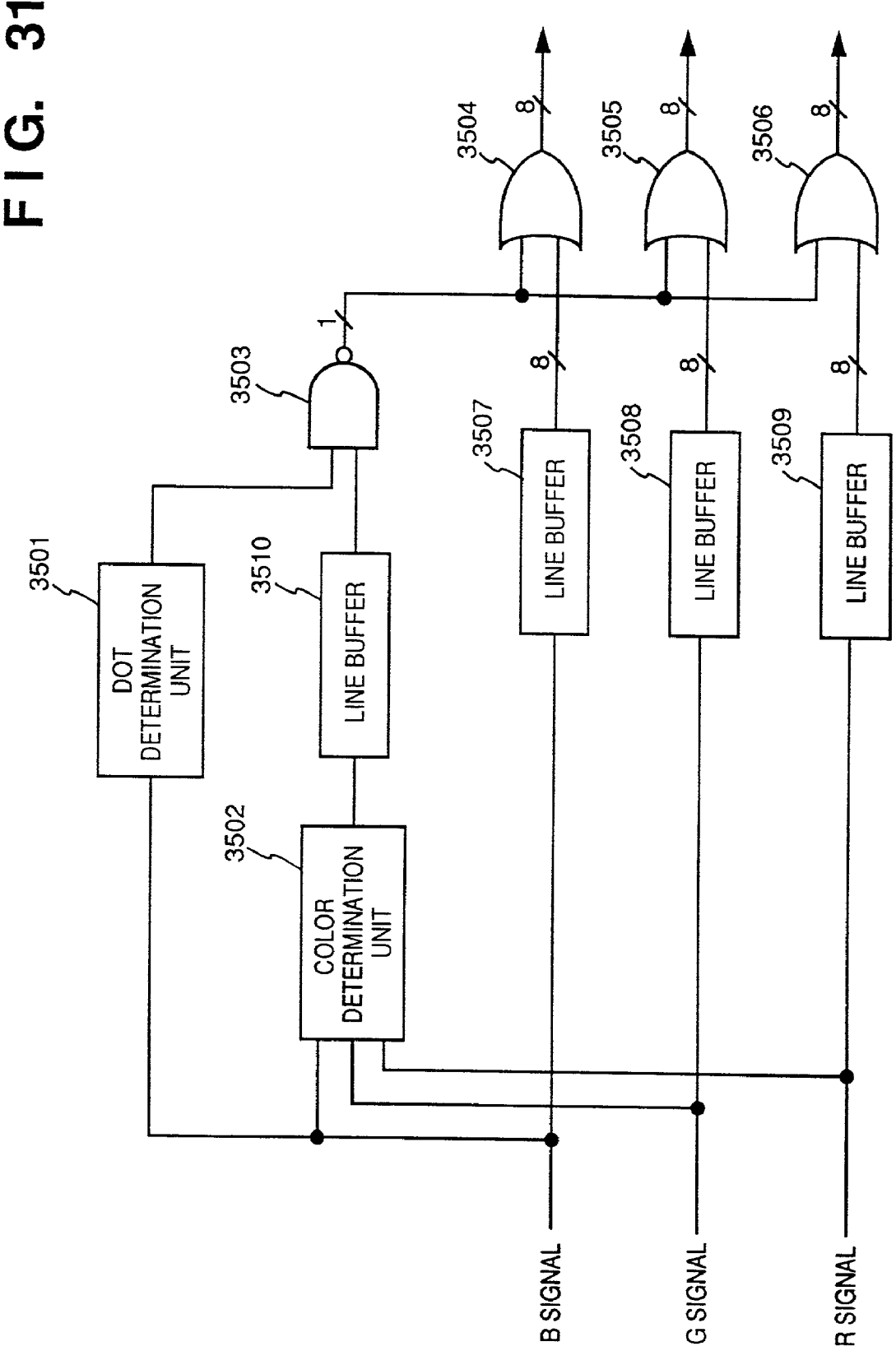
FIG. 31 is a block diagram showing the arrangement of an additional pattern image correction circuit 3101.

FIG. 31 is a block diagram showing the additional pattern image correction circuit 3101. Referring to FIG. 31, reference numeral 3501 denotes a dot determination unit; 3502 denotes a color determination unit; 3503 denotes a NAND gate; 3504 to 3506 denotes OR gates; and 3507 to 3510 denote one-line delay line buffers.

The operation of the additional pattern image correction circuit 3101 will be described below.

The dot determination unit 3501 determines whether a pixel of interest corresponds to an isolated dot form shown in FIG. 38. The color determination unit 3502 determines whether the pixel of interest represents light yellow. Outputs from the dot determination unit 3501 and the color determination unit 3502 are logically ANDed by an AND gate 3503, and an output from the AND ate 3503 is inverted. The OR gates 3504, 3505, and 3506 logically OR this determination signal and the R, G, and B color signals. If the pixel of interest is light yellow and represents a dot portion, the image signal is set to a signal corresponding to true white (R=255, G=255, B=255); otherwise, the image signal is output without any change.

Figure 32:
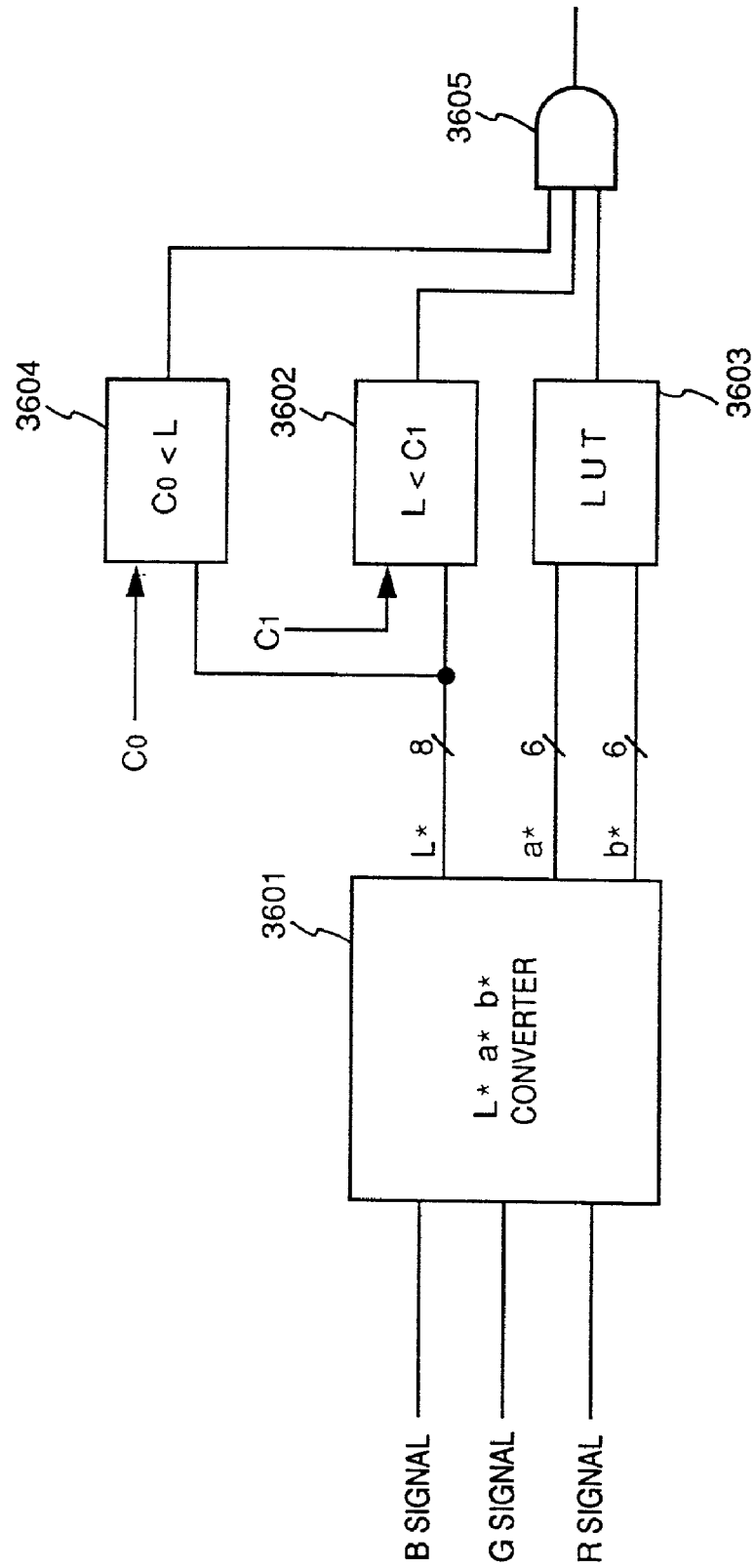
FIG. 32 is a block diagram showing the arrangement of a color determination unit 3502.

FIG. 32 is a block diagram showing the arrangement of the color determination unit 3502. Referring to FIG. 32, reference numeral 3601 denotes an L*a*b* converter; 3602 and 3604 denote comparators for comparing an L* signal with different threshold values C0 and C1, respectively; 3603 denotes a look-up table (to be referred to as an LUT hereinafter); and 3605 denotes an AND gate.

The operation of the color determination unit 3502 will be described below.

The L*a*b* converter 3601 is a 3×3 accumulator for converting input R, G, and B signals into a luminance signal L* and color component signals a* and b*. The comparators 3602 and 3604 determine whether the luminance signal L* falls within a predetermined range (C0<L*<C1).

The LUT 3603 is a ROM memory. If the color component signals a* and b* fall within the range of specific values, i.e, if they represent a yellow component, the LUT 3603 outputs a signal of logic "1"; otherwise, the LUT 3603 outputs a signal of logic "0".

Figure 33:
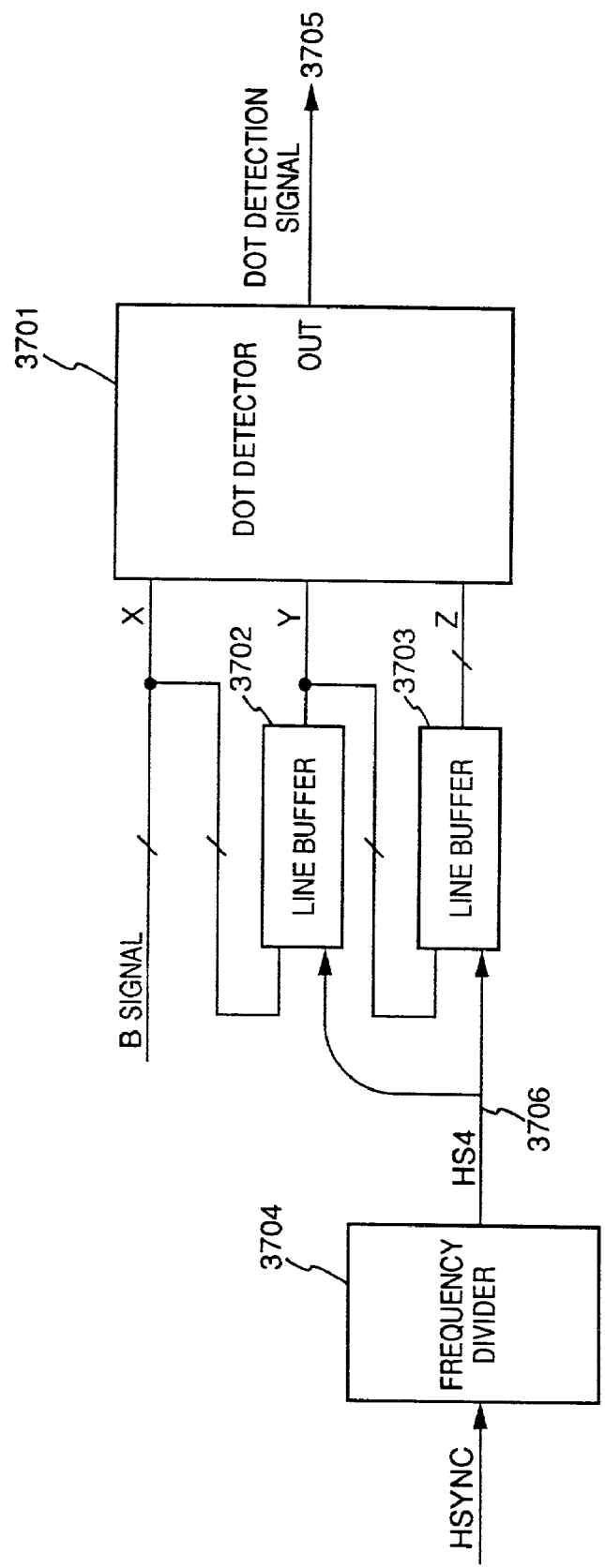
FIG. 33 is a block diagram showing the arrangement of a dot determination unit 3501.
Figure 34:
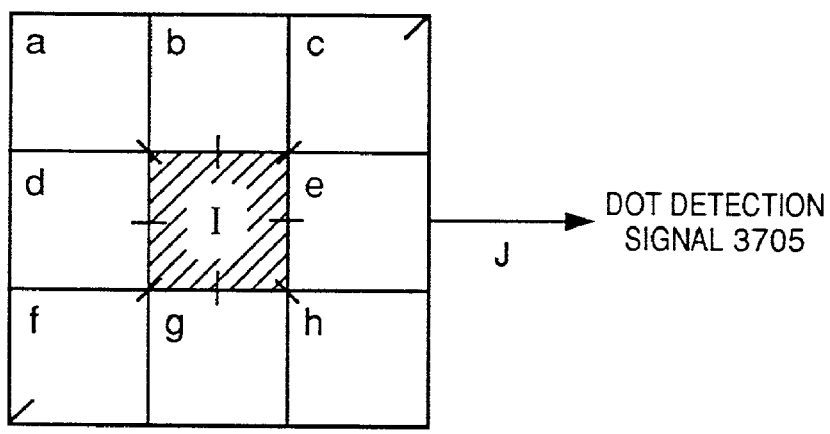
FIG. 34 is a view for explaining an operation of the dot determination unit 3501.

FIG. 33 is a block diagram showing the arrangement of the dot determination unit 3501, and FIG. 34 is a view showing a matrix for explaining the operation of the dot determination unit 3501.

Referring to FIG. 33, reference numeral 3701 denotes a dot detector; 3702 and 3703 denote line buffers for delaying a pixel and a line; 3704 denote a frequency divider for ¼-dividing the horizontal sync signal HSYNC to generate an HS4 signal. The dot determination unit 3501 performs extraction of a dot portion using the B signal having a high sensitivity to a yellow image so as to detect a yellow dot.

Figure 35:
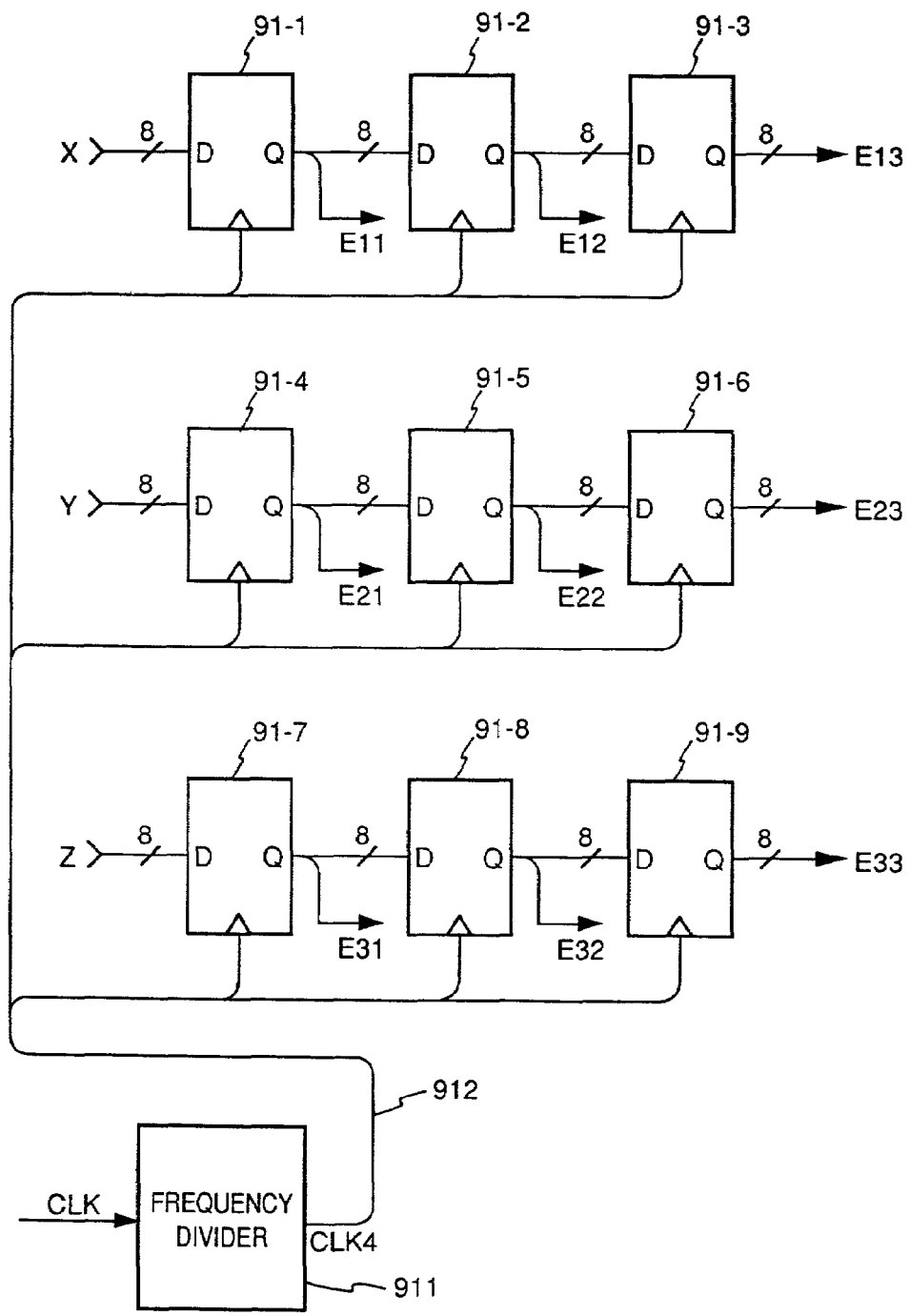
FIG. 35 is a block diagram showing the arrangement of a dot detector 3701.
Figure 36:
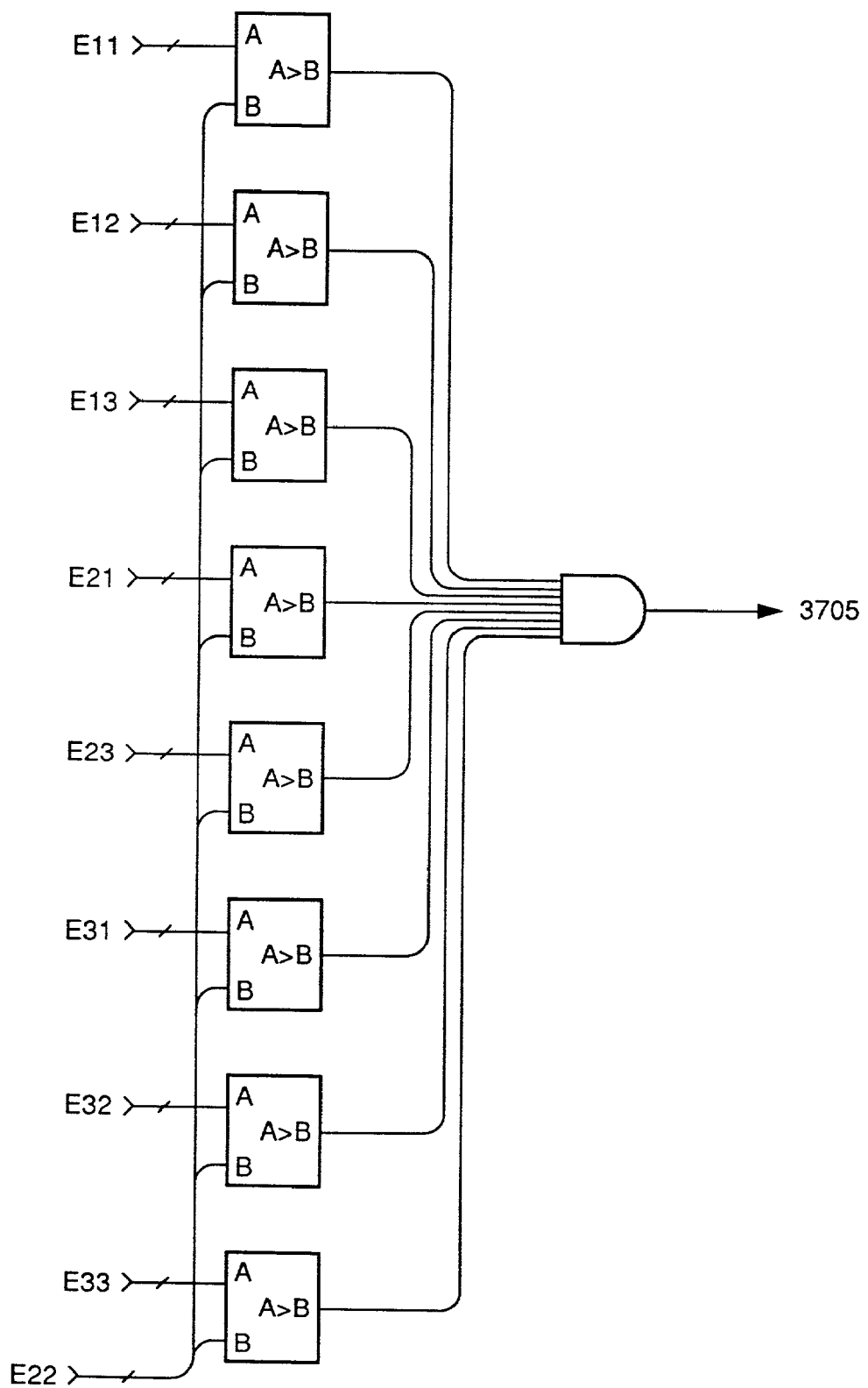
FIG. 36 is a block diagram showing the arrangement of the dot detector 3701.

FIGS. 35 and 36 are block diagrams showing the arrangement of the dot detector 3701.

The circuits in the dot determination unit 3501 are controlled in accordance with an HS4 signal 106 generated by the frequency divider 3704 and a CLK4 signal (912) generated by a frequency divider 911 shown in FIG. 35, so that an interval between a pixel I shown in FIG. 34 and its neighboring pixels in four directions is a 4-pixel interval.

Figure 39:
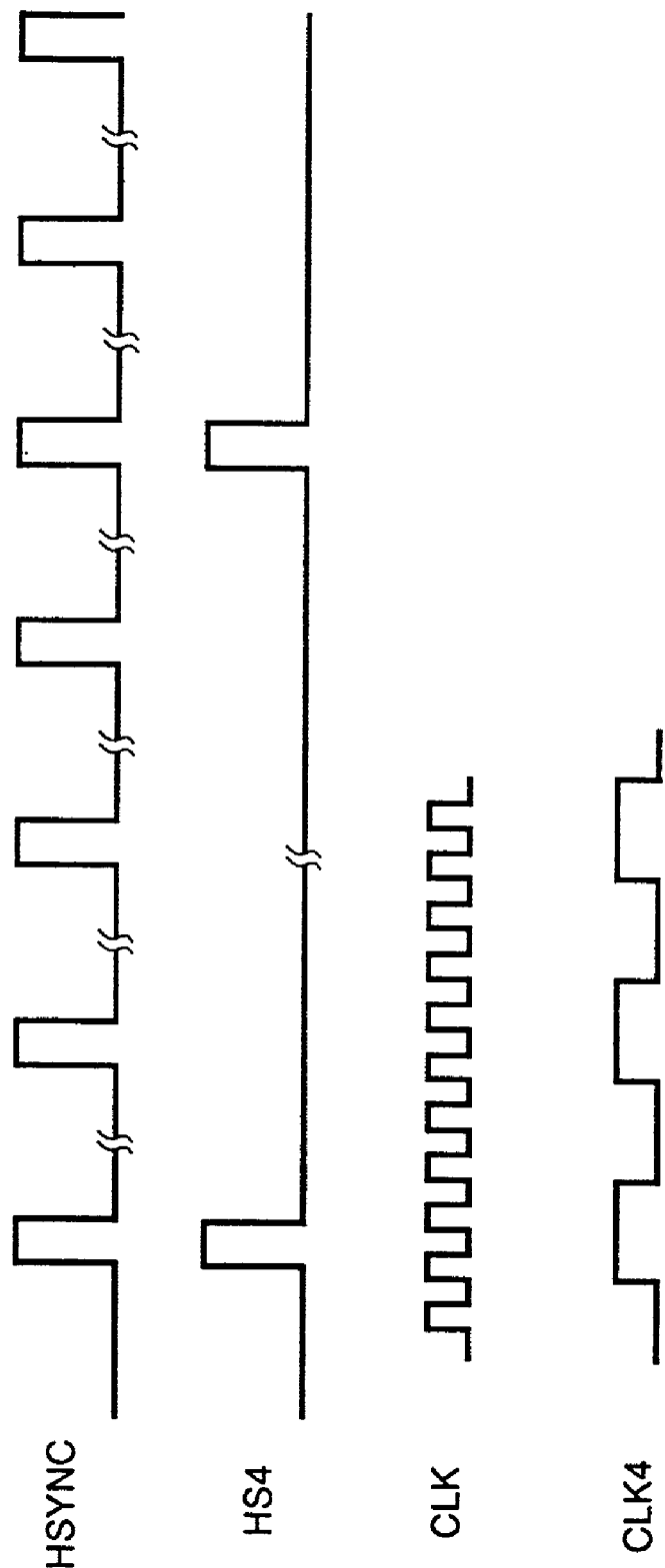
FIG. 39 is a timing chart associated with frequency dividers 911 and 3704.

FIG. 39 is a timing chart showing the relationships between HSYNC and HS4 and between CLK and CLK4, and FIG. 38 shows an additional pattern of this embodiment.

Referring to FIG. 38, the gradation level of 4×4 pixels contained in an area 3301 is modulated to +α. The gradation level of 2×4 pixels contained in each of areas 3302 and 3303 is modulated to −α. The pixels in an area except for the areas 3301 to 3303 are not modulated. 8×4 pixels contained in the areas 3301 to 3303 are defined as a unit dot for the additional pattern.

Figure 40:
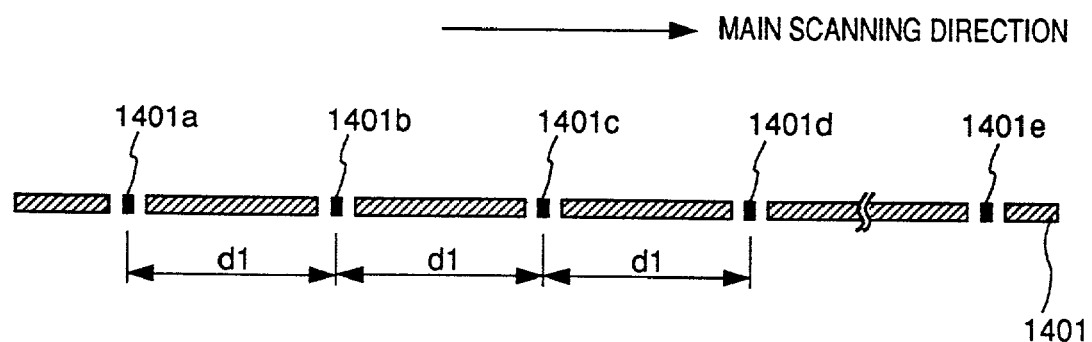
FIG. 40 is a view showing an add-on line according to the third embodiment.
Figure 41:
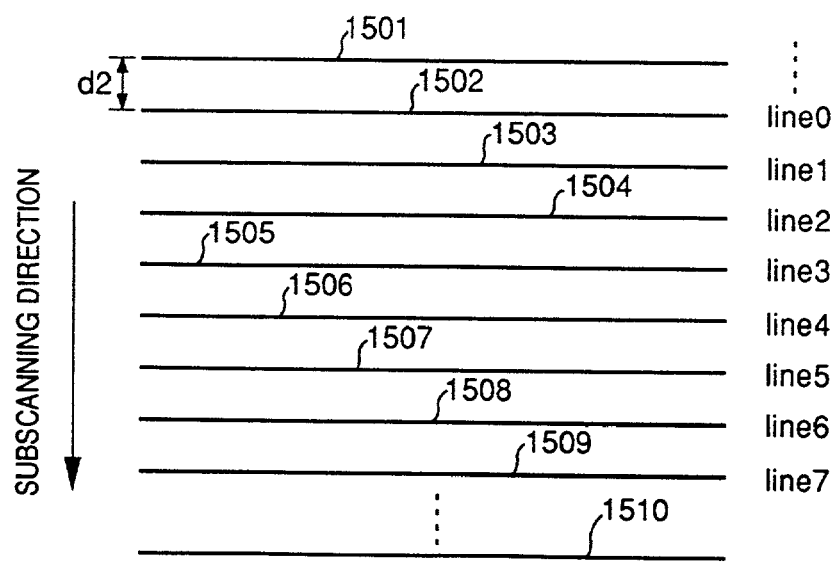
FIG. 41 is a view showing other add-on lines according to the third embodiment.

FIGS. 40 and 41 are views showing add-on lines of this embodiment.

Referring to FIG. 40, reference numeral 1401 denotes an add-on line having, e.g., a 4-pixel width. Reference numerals 1401a to 1401e denote unit dots shown in FIG. 38. Each unit dot consists of, e.g., 8×4 pixels. The unit dots 1401a to 1401e are arranged in the main scanning direction at an almost constant period d1 (e.g., 128 pixels).

Referring to FIG. 41, reference numerals 1501 to 1510 denote add-on lines having, e.g., a 4-pixel width. The add-on lines are arranged in the subscanning direction at an almost constant period d2 (e.g., 16 pixels). For example, one add-on line represents 4-bit information, as will be described later in detail. The eight add-on lines 1502 to 1509 constitute a set which can represent 32-bit additional information. Note that the add-on lines are repeatedly formed in the subscanning direction. These add-on lines represent the same information as that of the add-on lines 1501 to 1509 shown in FIG. 41.

Figure 42:
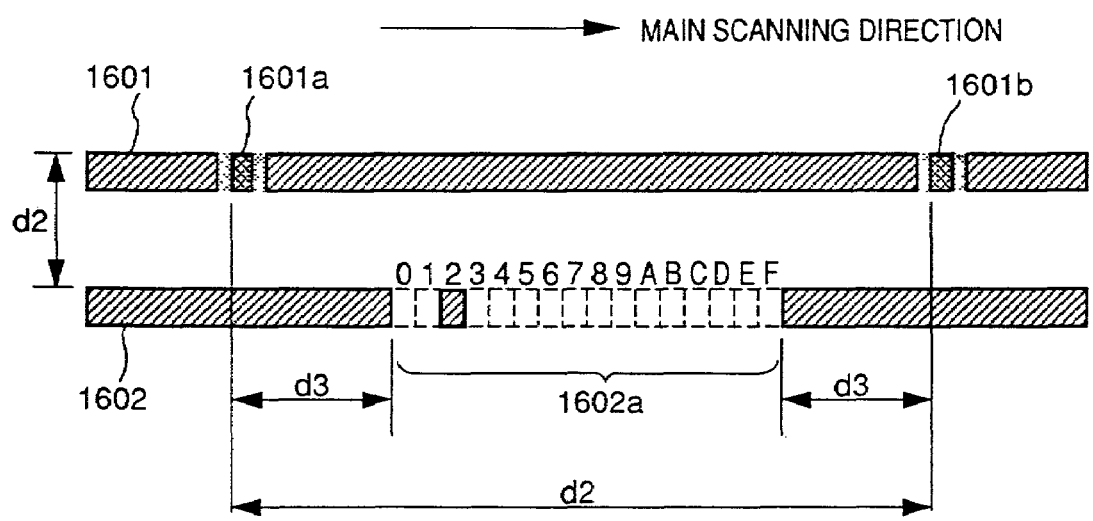
FIG. 42 is a view showing a method of expressing information using the add-on lines according to the third embodiment.

FIG. 42 and FIGS. 43A and 43B show a method of expressing information by add-on lines.

Referring to FIG. 42, reference numerals 1601 and 1602 denote add-on lines which are adjacent to each other in the subscanning direction. Reference numerals 1601a, 1601b, and 1602a denote unit dots. To prevent the unit dots of the add-on lines from being noticed with the human eye, the unit dots of the adjacent add-on lines are spaced apart from each other by an interval of at least d3 (e.g., 32 pixels) in the main scanning direction.

Data represented by the unit dot is determined by a phase difference between the unit dot 1602a and the unit dot 1601a. FIG. 42 shows that the unit dot represents 4-bit information. The unit dot 1602a represents data "2". For example, when the unit dot 1602a is located at the left end, it represents data "0". When the unit dot 1602a is located at the right end, it represents data "F".

Of all the add-on lines constituting the set representing all additional information, FIG. 43A represents a first add-on line Line0, and FIG. 43B represents a fourth add-on line Line3.

As shown in FIGS. 43A and 43B, dots 1702a to 1702d are added all to the right of the original unit dots 1701a to 1701d on the first add-on line Line0 at an interval d4 (e.g., 16 pixels). Dots 1705a to 1705d are added all to the right of the original dots 1704a to 1704d on the fourth add-on line Line3 at an interval d5 (e.g., 32 pixels). These additional dots serve as a marker for specifying an add-on line number to which they are added. Note that the markers are added to the two add-on lines, respectively, because the top and bottom in the subscanning direction can be confirmed even from an output image.

In addition, for example, a pattern to be added is added with a Y (yellow) toner because the human eye has a low identification capability for a pattern drawn with the Y toner.

A dot interval in the main scanning direction of an additional patten and a repetition interval of all additional information in the subscanning direction must be determined such that all information can be properly added in a uniform area having a sufficient width to properly identify the dots in a specific original as a target object. As a criterion for this, pitch information, at ½ or less than the width of the uniform area, can be added to the specific original as the target object so as to properly identify the dots.

[Pattern Addition Circuit]

A pattern addition circuit according to this embodiment will be described below.

Figure 44A:
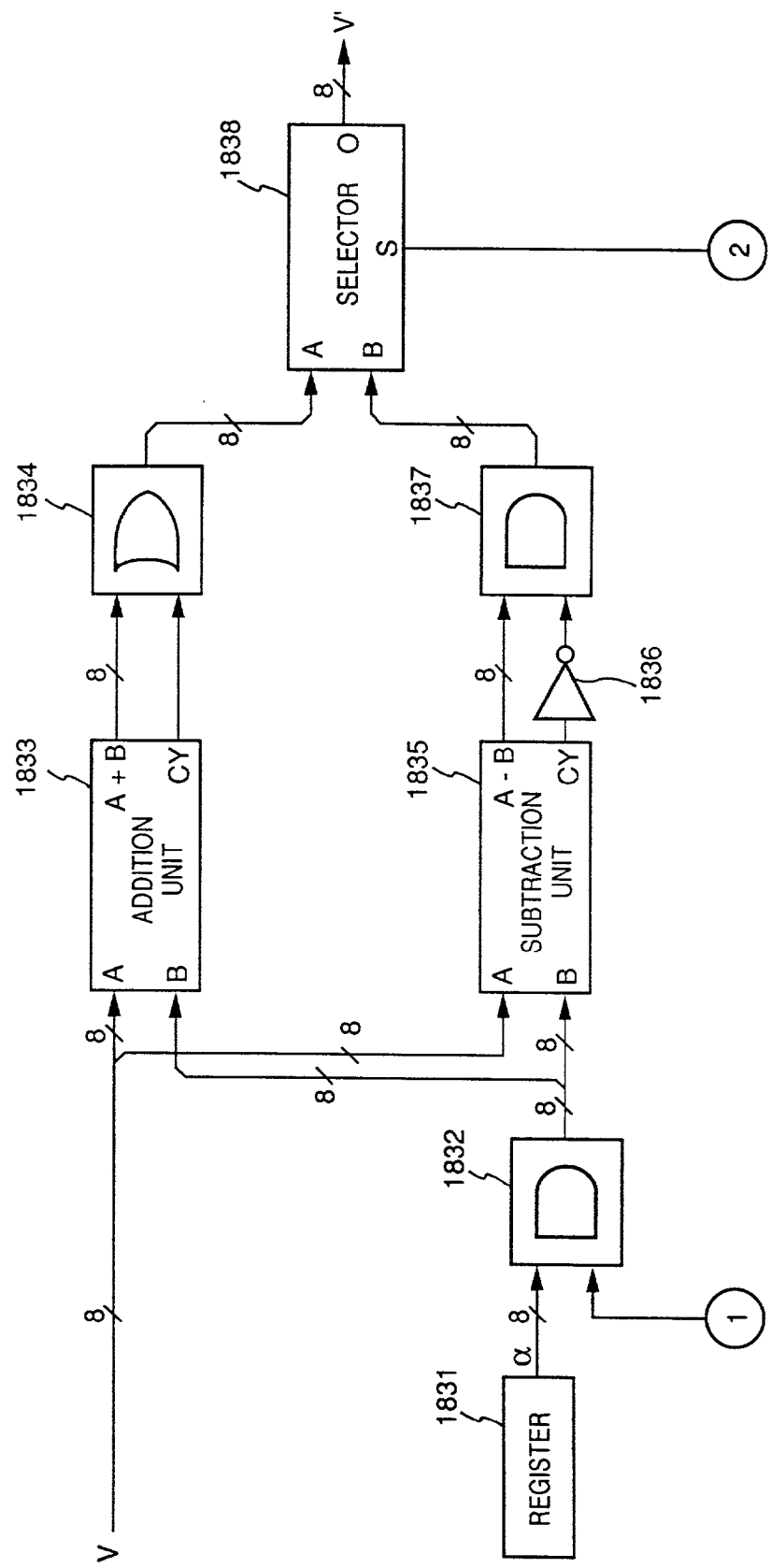
FIGS. 44A, 44B, and 44C are block diagrams showing the arrangements of a pattern addition circuit according to the third embodiment.
Figure 44B:
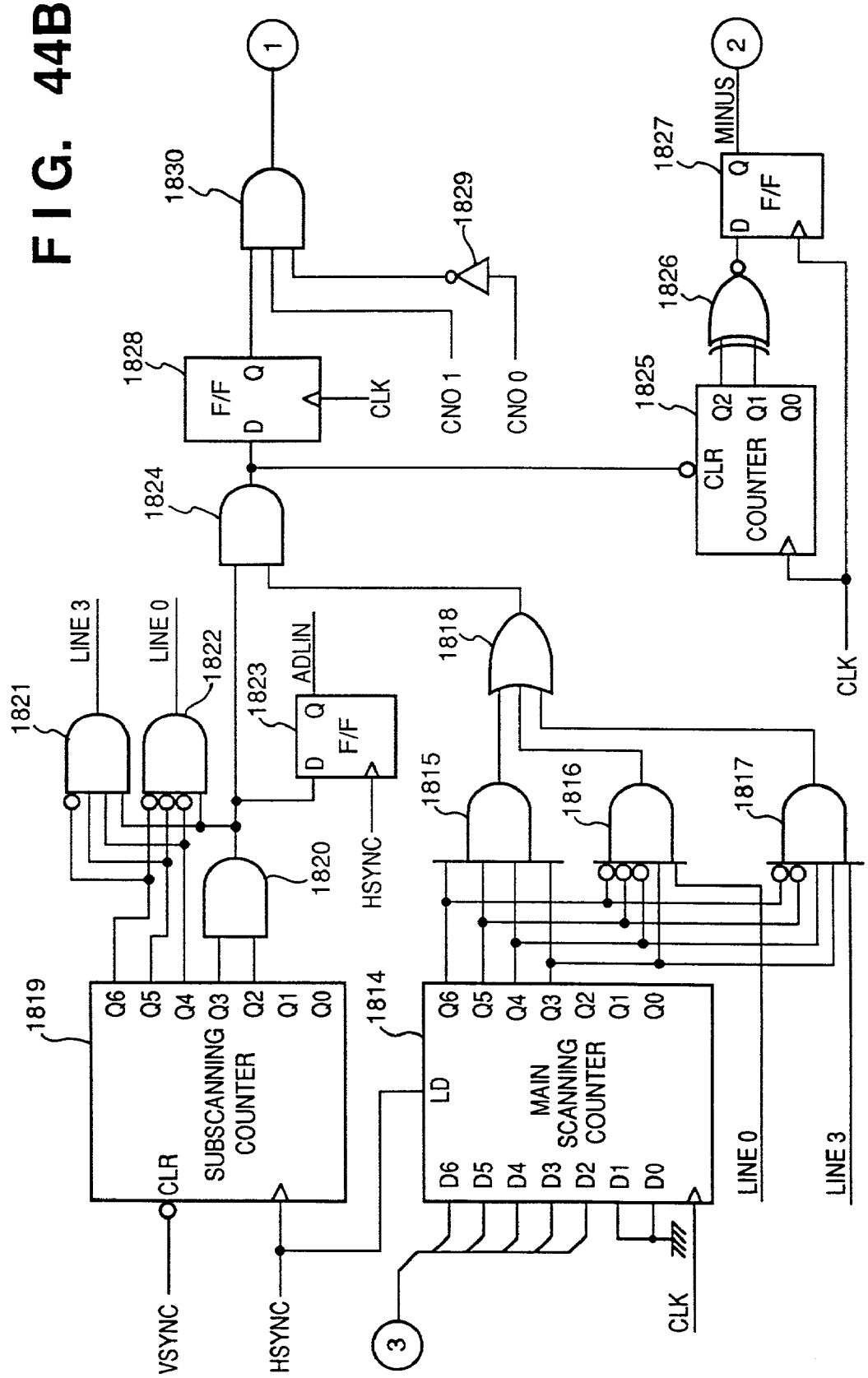
Figure 44C:
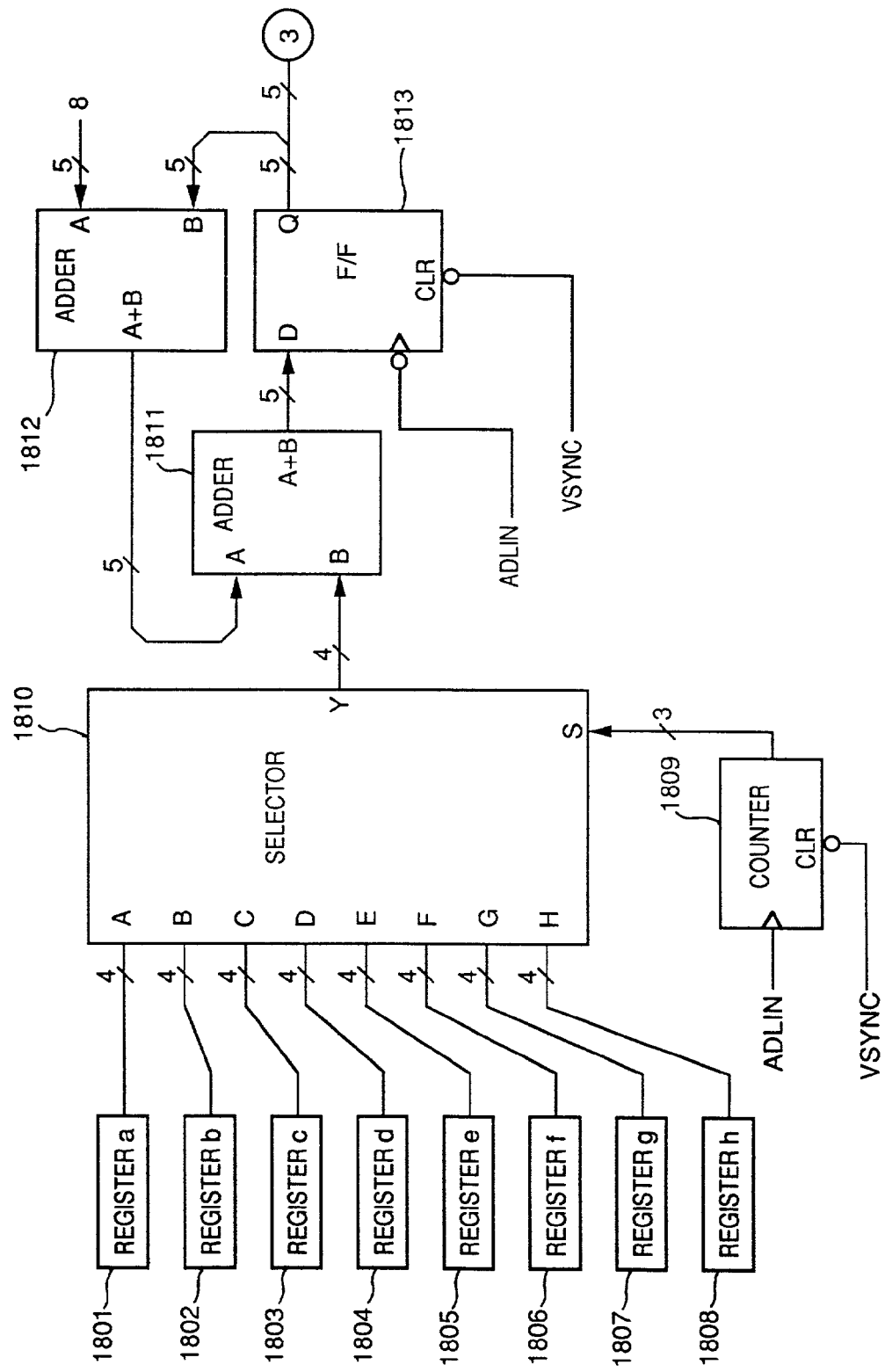

FIGS. 44A to 44C are block diagrams showing the arrangement of the pattern addition circuit 3102.

Referring to FIG. 44B, a subscanning counter 1819 and a main scanning counter 1814 count a main scanning sync signal HSYC and a pixel sync signal CLK, respectively, at a 7-bit width, i.e., at a period of 128 lines or pixels. An AND gate 1820 connected to outputs Q2 and Q3 of the subscanning counter 1819 outputs a signal of logic "H"when both bits 2 and 3 of the subscanning counter 1819 are set at logic "H". That is, an output from the AND gate 1820 goes to "H" level for a 4-line period every 16 lines in the subscanning direction. This output signal serves as an add-on line enable signal.

The output from the AND gate 1820 and the upper three bits (Q4 to Q6) of the subscanning counter 1819 are added to gates 1822 and 1821, so that the gates 1822 and 1821 generate an enable signal LINE0 for add-on line 0 and an enable signal LINE3 for add-on line 3, respectively.

On the other hand, an initial value is loaded in the main scanning counter 1814 by HSYNC, as will be described in detail later. Gates 1815 to 1817 receive upper four bits (Q3 to Q6) of the main scanning counter 1814, respectively. An output from the AND gate 1815 goes to logic "H" for an 8-pixel interval every 128 pixels and serves as a dot enable signal. The gates 1816 and 1817 receive the signal LINE0 and LINE3 in addition to the upper four bits of the main scanning counter 1814 to generate enable signals for the marks of lines 0 and 3.

All these dot and mark enable signals are input to an OR gate 1818. An output from the OR gate 1818 and the output from the AND gate 1820 are logically ANDed by an AND gate 1824. As a result, dot and mark enable signals which go to "H" level on only add-on lines are generated.

An output from the AND gate 1824 is synchronized with the pixel sync signal CLK in a flip-flop (F/F) 1828. An output from the F/F 1828 is logically ANDed with the 2-bit output color selection signal CNO by an AND gate 1830. Bit 0 of the output color selection signal CNO is inverted by an inverter 1829, and the inverted signal is input to the AND gate 1830. Bit 1 of the output color selection signal CNO is directly input to the AND gate 1830. Therefore, the signal CNO="10" is obtained. That is, the dot and mark enable signals become valid only during printing of a Y color image.

The output from the AND gate 1824 is also connected to a clear terminal CLR of a counter 1825. When the output from the AND gate 1824 is set at "H" level, i.e., only when the add-on line dot is enabled, the counter 1825 counts the pixel sync signal CLK. Bits 1 and 2 of an output from the counter 1825 are input to an Ex-NOR gate 1826. An output from the Ex-NOR gate 1826 is set at "L" level for an intermediate 4-CLK period in an add-on line dot period (8 CLKs). An output from the Ex-NOR gate 1826 is synchronized with the pixel sync signal CLK by an F/F 1827 and output as a signal MINUS. When this signal MINUS goes to "L" level, the add-on line dot is modulated to +α.

Note that the F/F 1827 is arranged to remove glitch-like noise contained in the signal MINUS and phase-lock this signal with the add-on line dot enable signal.

The signal MINUS is input to a selection terminal S of a selector 1838 in FIG. 44A.

Referring to FIG. 44A, an AND unit 1832 receives, e.g., an 8-bit modulation amount α from a register 1831 and the output from the AND gate 1830 (FIG. 44B). Since the output from the AND gate 1830 goes to the "H" level at the timing of an add-on line dot period, and the AND unit 1832 outputs the modulation amount α at the timing of the add-on line dot period. Therefore, pixels except for the add-on line dot are not modulated because the modulation amount represented by the output form the AND unit 1832 is set at 0.

Reference numeral 1833 denotes an addition unit; and 1835 denotes a subtraction unit. For example, an 8-bit image signal B is input to a terminal A of each of the addition unit 1833 and the subtraction unit 1835. The modulation amount α output form the AND unit 1832 is input to a terminal B of each of the addition unit 1833 and the subtraction 1832. An output (A+B) from the addition unit 1833 is input to an OR gate 1834, and an output (A−B) from the subtraction unit 1835 is input to an AND gate 1837.

When an addition result V+α from the addition unit 1833 overflows to output a carry signal CY, the OR gate 1834 forcibly sets the operation result to 255. When a subtraction result V−α from the subtraction unit 1835 underflows to output a carry signal CY, the AND gate 1837 forcibly sets the operation result to, e.g., 0 using a carry signal CY inverted by an inverter 1836.

The operation results V+α and V−α are input to the selector 1838 and are selectively output from the selector 1838 in response to the signal MINUS.

The above circuit arrangement performs dot modulation shown in FIG. 38.

The value loaded in the main scanning counter 1814 is generated as follows.

An F/F 1813 and a counter 1809 are reset in response to the subscanning sync signal VSYNC, and 0 is set as the initial value of the main scanning counter 1814 for the first add-on line.

A signal ADLIN input to the clock terminals of the counter 1809 and the F/F 1813 is obtained by causing an F/F 1823 to synchronize the output as an add-on line enable signal from the AND gate 1820 with the main scanning sync signal HSYNC.

In response to, e.g., a 3-bit signal input to the select terminal S of a selector 1810, the selector 1810 shown in FIG. 44C selects one of a register a 1801 to a register h 1808 for storing, e.g., 4-bit values of eight add-on lines. The selector 1810 outputs the value set in the selected register.

A select signal input to the selector 1810 is generated by the counter 1809 for counting the signal ADLIN. At the timing of the first add-on line, the counter 1809 is cleared by the subscanning sync signal VSYNC, and the select signal is set at "0". In this case, the selector 1810 selects the register a 1801. When the signal ADLIN rises, the count value of the counter 1809 is incremented by one, and the selector 1810 selects the register b 1802. Subsequently, the selector 1810 repeatedly selects the register from the register c 1803 to the register h 1808 in synchronism with the signal ADLIN.

An output from the selector 1810 is added to an output from an adder 1812 by an adder 1811. The sum from the adder 1811 is input to the F/F 1813. Input data is latched in the F/F 1813 at the trailing edge of the signal ADLIN and is input to the main scanning counter 1814 shown in FIG. 44B.

An output from the F/F 1813 is sent to the main scanning counter 1814 and is also input to a terminal B of the adder 1812. The output from the F/F 1813 is added by the adder 1812 to a predetermined value, e.g., "8" input to a terminal A of the adder 1812. The sum from the adder 1812 is sent to the adder 1811. This represents an offset value for causing the add-on line dot position to be spaced apart from the dot position of the immediately preceding add-on line in the subscanning direction.

[Copying Result]

FIG. 45 is a view showing a copying result of this embodiment. Only the arrangement of unit dots of add-on lines is illustrated in this copying result.

Referring to FIG. 45, reference numeral 1901 denotes, e.g., a specific original image. The unit dot of an add-on line is represented by a black square (■).

As described above, a yellow dot is detected by the color input image signal of an original, and the corresponding image data is changed. Identification information can be properly added to an output image using a yellow component dot.

<Modification 1>

In the third embodiment, a light yellow dot is detected in an original and is changed to white data. According to the technique in the third embodiment, it is possible to properly read a yellow dot code in a copied image. However, dot-like omissions may be formed in the copied image depending on types of input originals.

In this modification, image data of yellow dot portions in an original is smoothed and printed to reduce degradation of the quality of a copied image, thereby properly detecting an additional code in the copied image.

An arrangement for obtaining this effect will be described below.

FIG. 46 is a block diagram showing the arrangement of the additional pattern image correction circuit according to this modification. The same reference numerals as in the circuit of the third embodiment shown in FIG. 31 denote the same parts in the circuit shown in FIG. 46.

Figure 47:
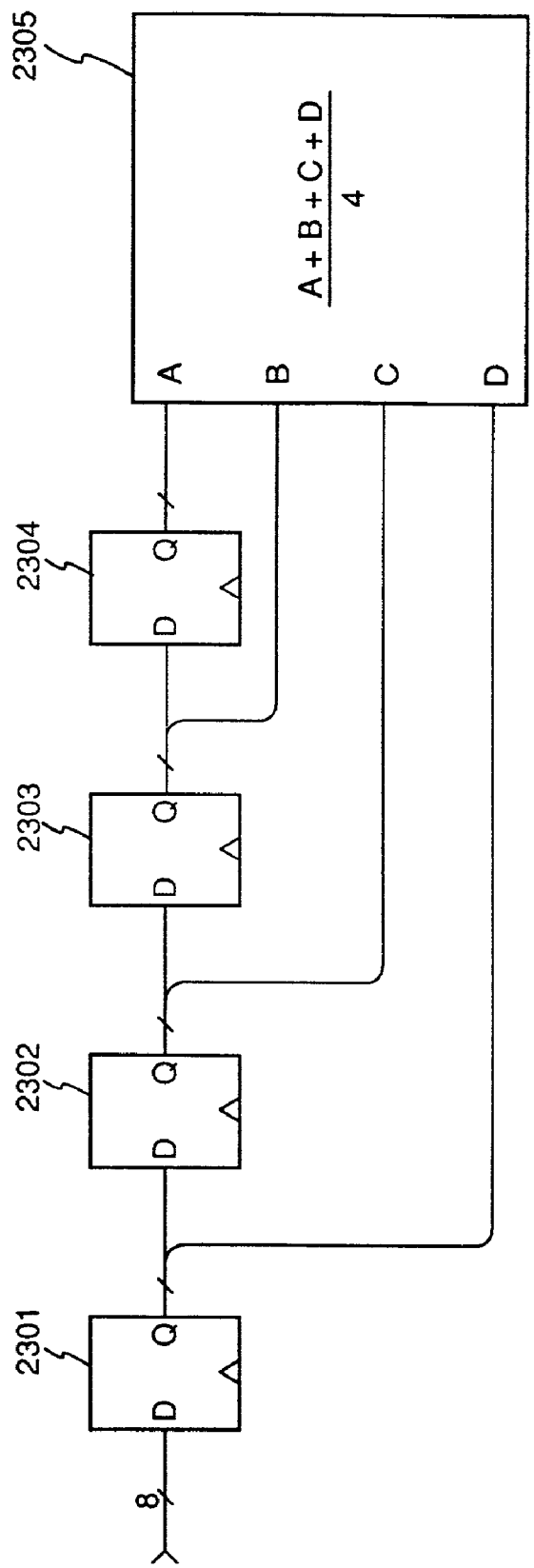
FIG. 47 is a block diagram showing the typical arrangement of smoothing circuits 2201 to 2203 according to modification 1.

Referring to FIG. 46, smoothing circuits 2201 to 2203 each having an arrangement shown in FIG. 47 smooth image data. Selectors 2208 to 2210 are controlled by a determination signal 2210a. When the determination signal 2210a is set at "0", the smoothed image data is output. However, when the determination signal 2210a is set at "1", data from delay circuits 2204 to 2206 are output. Reference numeral 2207 denotes a determination signal delay circuit.

The delay circuits 2204 to 2206 and the determination signal delay circuit 2207 constitute a delay circuit for soothing image data and phase-locking image data with a signal.

A typical arrangement of each of the smoothing circuits 2201 to 2203 is shown in FIG. 47. Each smoothing circuit comprises D flip-flops 2301 to 2304 and an arithmetic circuit 2305.

<Modification 2>

Figure 48:
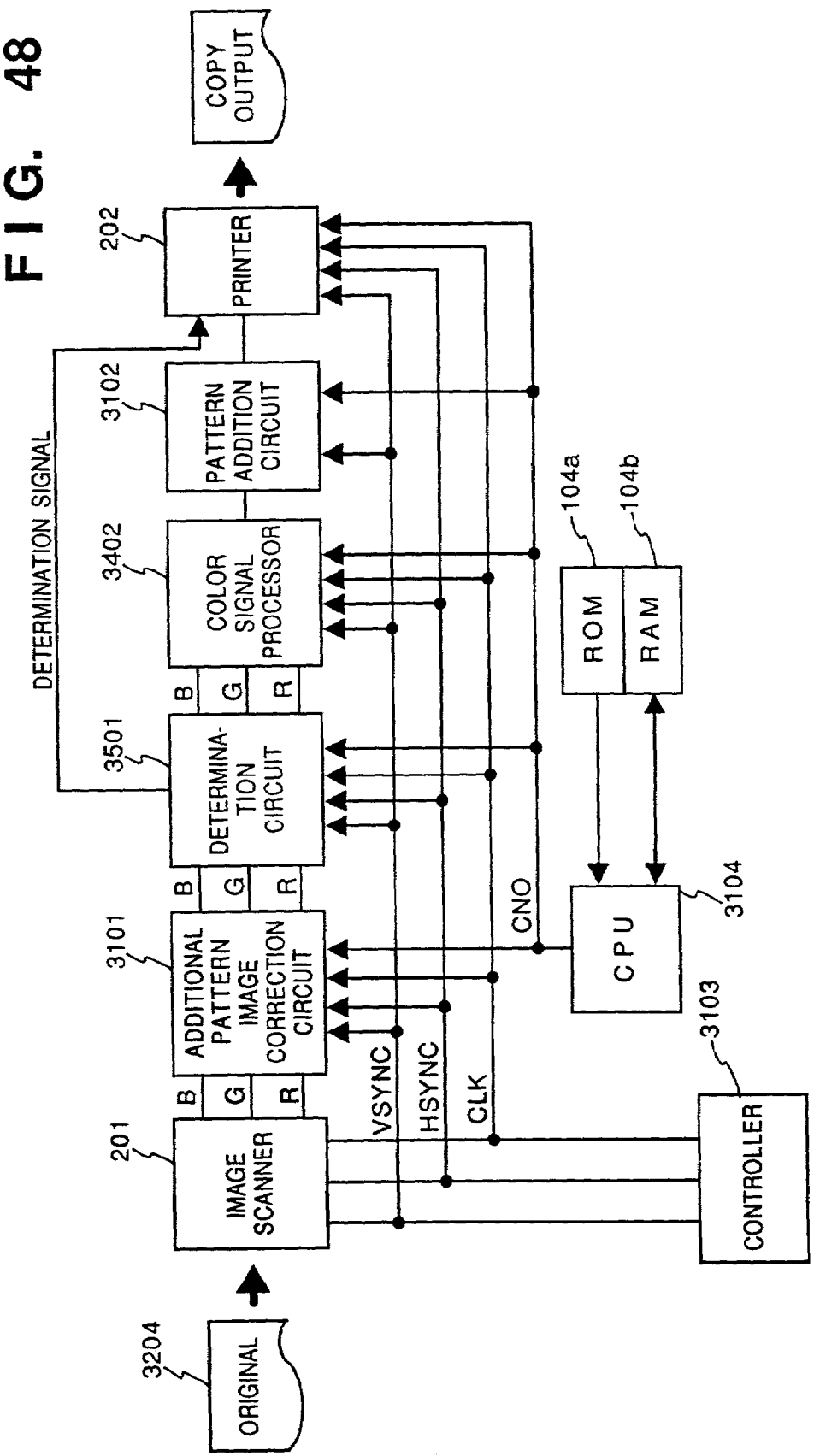
FIG. 48 is a block diagram fore explaining the arrangement of an image processing unit of modification 2 of the third embodiment.

FIG. 48 is a block diagram showing the arrangement of an image processing unit according to this modification.

In this modification, the arrangement comprises a determination circuit 3501 for determining whether an input original image represents a specific original (e.g., a banknote) in addition to a function of causing the pattern addition circuit 3102 of the third embodiment to add a yellow pattern. If the input original image is determined to represent a specific original, the determination circuit 3501 sends a determination signal to a printer 202. When a CNO signal is set at "3" (black image formation), a "solid black signal" is synthesized with the image signal.

For example, the determination circuit 3501 checks the distribution of color tones of a specific original in advance and compares this distribution of color tones with the distribution of color tones of an input image, thereby performing determination.

Any other arrangement in FIG. 48 is the same as in the image processing unit of the third embodiment.

As described above, according to this modification, when a yellow pattern is to be added, degradation of readability which is caused by mixing of original patterns and an additional pattern can be prevented, and the determination circuit 3501 performs determination on the basis of the image signal smoothed by the additional pattern image correction circuit 3101, thereby improving determination precision.

The present invention may be applied to a system constituted by a plurality of pieces of equipment or to an apparatus consisting of one piece of equipment. The present invention is also applicable to a case wherein a program is supplied to the system or apparatus to achieve the present invention.

Each embodiment described above has exemplified a laser beam printer. The present invention, however, is not limited to this. The present invention is also applicable to an ink-jet printer or a thermal transfer printer. The present invention is particularly applicable to a so-called bubble-jet printer using a head for injecting liquid droplets utilizing film boiling with thermal energy. In each embodiment described above, a color to be added is yellow. The present invention is not limited to this. The color to be added may be an unnoticeable color such as yellowish green or gray, or a color having a high lightness, such as light purple or green.

In each embodiment described above, an original image is input by an image scanner. However, the present invention is not limited to this. An image may be input using a still video camera or a video camera or may be prepared using computer graphics.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having image forming means for forming an image on a medium, comprising:
   processing means for performing a predetermined process on input image information; and
   means for superposing predetermined additional information on the image information processing by said processing means,
   wherein when the image forming means forms an image in accordance with the image information on which the additional information is superposed by said superposing means, said superposing means superposes the additional information so as to make it difficult for the human eye to identify the additional information, and
   wherein the additional information is represented by a relative positional relationship between a dot position of a line formed by equidistantly arranging dots in a first direction and a dot position of an adjacent line formed by equidistantly arranging dots in a second direction perpendicular to the first direction.

2. The apparatus according to claim 1 wherein the additional information comprises a predetermined pattern having a mark representing a position where the additional information is added to the image information.

3. The apparatus according to claim 1 wherein the additional information is at least one of apparatus identification information and apparatus operator identification information.

4. The apparatus according to claim 2 wherein at least one of the dots is obtained by modulating image information constituted by one pixel or a plurality of adjacent pixels.

5. The apparatus according to claim 1 wherein the additional information is represented by a plurality of ones of the line, which are repeated in the second direction.

6. The apparatus according to claim 5 wherein when the plurality of lines correspond to predetermined identification information, another dot different from an original dot is added to a specific line of the plurality of lines, thereby forming a division in the predetermined identification information.

7. The apparatus according to claim 6 wherein the specific line comprises two specific lines of the plurality of lines corresponding to the predetermined identification information, thereby determining the division in the identification information and an arrangement direction of the identification information.

8. The apparatus according to claim 1 wherein the additional information is superposed for a color most unnoticeable to a human eye in colors representing an image.

9. The apparatus according to claim 1 wherein the predetermined process is at least one of magnification, color conversion, MTF correction, and modulation.

10. An image processing method applied to an image processing apparatus having image forming means for forming an image on a medium, comprising:
    a processing step of performing a predetermined process on input image information; and
    a superposing step of superposing predetermined additional information on the image information processing at said processing step,
    wherein when said the image forming means forms an image in accordance with the image information on which the additional information is superposed at said superposing step, said superposing step superposes the additional information so as to make it difficult for the human eye to identify the additional information, and
    the additional information is represented by a relative positional relationship between a dot position of a line formed by equidistantly arranging dots in a first direction and a dot position of an adjacent line formed by equidistantly arranging dots in a second direction perpendicular to the first direction.

* * * * *

UNITED STATES PATENT AND TRADEMARK OFFICE
CERTIFICATE OF CORRECTION

PATENT NO. : 7,061,652 B2
APPLICATION NO. : 09/993725
DATED : June 13, 2006
INVENTOR(S) : Mitsuru Kurita et al.

It is certified that error appears in the above-identified patent and that said Letters Patent is hereby corrected as shown below:

TITLE PAGE AT ITEM [56]:
Other publications, "Mifflien" should read --Mifflin--.

TITLE PAGE AT ITEM [75]:
Inventor, "Katsuyoshi Maeshima, Yokohama-ken (JP); Masahiro Funada, Yokohama-ken (JP); Yasumichi Suzuki, Yokohama-ken (JP); Yoichi Takaragi, Yokohama-ken (JP); Akiko Kanno, Yokohama-ken (JP); Koichi Ishimoto, Yokohama-ken, (JP)" should read --Katsuyoshi Maeshima, Yokohama-ken (JP); Masahiro Funada, Yokohama-ken (JP); Yasumichi Suzuki, Yokohama-ken (JP); Yoichi Takaragi, Yokohama-ken (JP); Akiko Kanno, Yokohama-ken (JP); Koichi Ishimoto, Yokohama-ken, (JP)--.

COLUMN 2:
Line 14, "and" should be deleted.
Line 43, "human" should read --human eye--.

COLUMN 3:
Line 9, "added" ($2^{nd}$ occurrence) should read --adder--.
Line 50, "or" should read --of--; and "an a" should read --a--.

COLUMN 6:
Line 12, "fore" should read --for--.

COLUMN 8:
Line 28, "modulator 705." should read --modulator 705. ¶[Pattern Addition Circuit]--.

COLUMN 9:
Line 50, "content" should read --contents--.

COLUMN 10:
Line 23, "specifically," should read --specifically, when--.

COLUMN 18:
Line 1, "denotes" should read --denote--.
Line 43, "denote" should read --denotes--.

UNITED STATES PATENT AND TRADEMARK OFFICE
CERTIFICATE OF CORRECTION

PATENT NO. : 7,061,652 B2
APPLICATION NO. : 09/993725
DATED : June 13, 2006
INVENTOR(S) : Mitsuru Kurita et al.

It is certified that error appears in the above-identified patent and that said Letters Patent is hereby corrected as shown below:

COLUMN 19:
Line 54, "patten" should read --pattern--.

COLUMN 21:
Line 2, "form" should read --from--.
Line 5, "B" should read --V--.
Line 7, "form" should read --from--.
Line 8, "1832." should read --unit 1835.--.

COLUMN 22:
Line 21, "having" should read --has--.

COLUMN 24:
Line 41, "said the" should read --the--.

Signed and Sealed this

Second Day of January, 2007

JON W. DUDAS
*Director of the United States Patent and Trademark Office*